United States Patent [19]

Oguro et al.

[11] Patent Number: 5,926,607
[45] Date of Patent: Jul. 20, 1999

[54] CASSETTE WITH MEMORY

[75] Inventors: Masaki Oguro, Tokyo; Ken Iizuka, Kanagawa, both of Japan

[73] Assignee: Sony Corporation, Tokyo, Japan

[21] Appl. No.: 08/710,569

[22] Filed: Sep. 19, 1996

Related U.S. Application Data

[63] Continuation of application No. 08/310,106, Sep. 22, 1994, abandoned.

[30] Foreign Application Priority Data

Sep. 30, 1993 [JP] Japan .................................. 5-268054
Sep. 30, 1993 [JP] Japan .................................. 5-268056

[51] Int. Cl.⁶ .................................................. H04N 5/76
[52] U.S. Cl. .......................................... 386/95; 386/83
[58] Field of Search ........................... 386/83, 46, 77, 386/95, 60, 64, 65; 348/906; H04N 5/76

[56] References Cited

U.S. PATENT DOCUMENTS

| | | | |
|---|---|---|---|
| 4,193,120 | 3/1980 | Yello | 386/83 |
| 4,338,644 | 7/1982 | Staar | 360/132 |
| 4,383,285 | 5/1983 | Staar | 360/132 |
| 4,426,684 | 1/1984 | Sechet et al. | |
| 4,908,706 | 3/1990 | Bugg | 348/906 |
| 5,231,493 | 7/1993 | Apitz | 348/906 |
| 5,355,229 | 10/1994 | Arano et al. | 358/343 |
| 5,390,027 | 2/1995 | Henni et al. | 358/335 |
| 5,479,266 | 12/1995 | Young et al. | 386/83 |
| 5,488,409 | 1/1996 | Yuen et al. | 386/83 |
| 5,552,833 | 9/1996 | Henni et al. | 386/83 |

FOREIGN PATENT DOCUMENTS

| | | |
|---|---|---|
| A-886 249 | 3/1981 | Belgium . |
| 0393955A1 | 10/1990 | European Pat. Off. ....... H04N 5/782 |
| 0420123 | 3/1991 | European Pat. Off. ....... H04N 5/782 |
| A-0 580 434 | 1/1994 | European Pat. Off. . |
| A-0 646 914 | 4/1995 | European Pat. Off. . |
| 2043 982 | 10/1980 | United Kingdom . |
| WO-A-89 10615 | 11/1989 | WIPO . |
| WO-A-93 08571 | 4/1993 | WIPO . |
| WO-A-93 10536 | 5/1993 | WIPO . |
| WO-A-93 14501 | 7/1993 | WIPO . |

Primary Examiner—Huy T. Nguyen
Attorney, Agent, or Firm—Frommer Lawrence & Haug, LLP.; William S. Frommer

[57] ABSTRACT

A plurality of additional information are made correspond to one predetermined video image; a storing order of events is properly set and data processes in a memory in case of adding or deleting character information are easily executed. The number information indicative of the number of text events corresponding to the program event is recorded in the program event. As for memory areas of the cassette with a memory, there are provided: a main area in which tape information and the like are stored; and an optional area in which TOC information, timer recording information, character information, and the like are stored. In the case where character information regarding the events of the optional area exists, the character information is stored at the last position of the optional area.

12 Claims, 55 Drawing Sheets

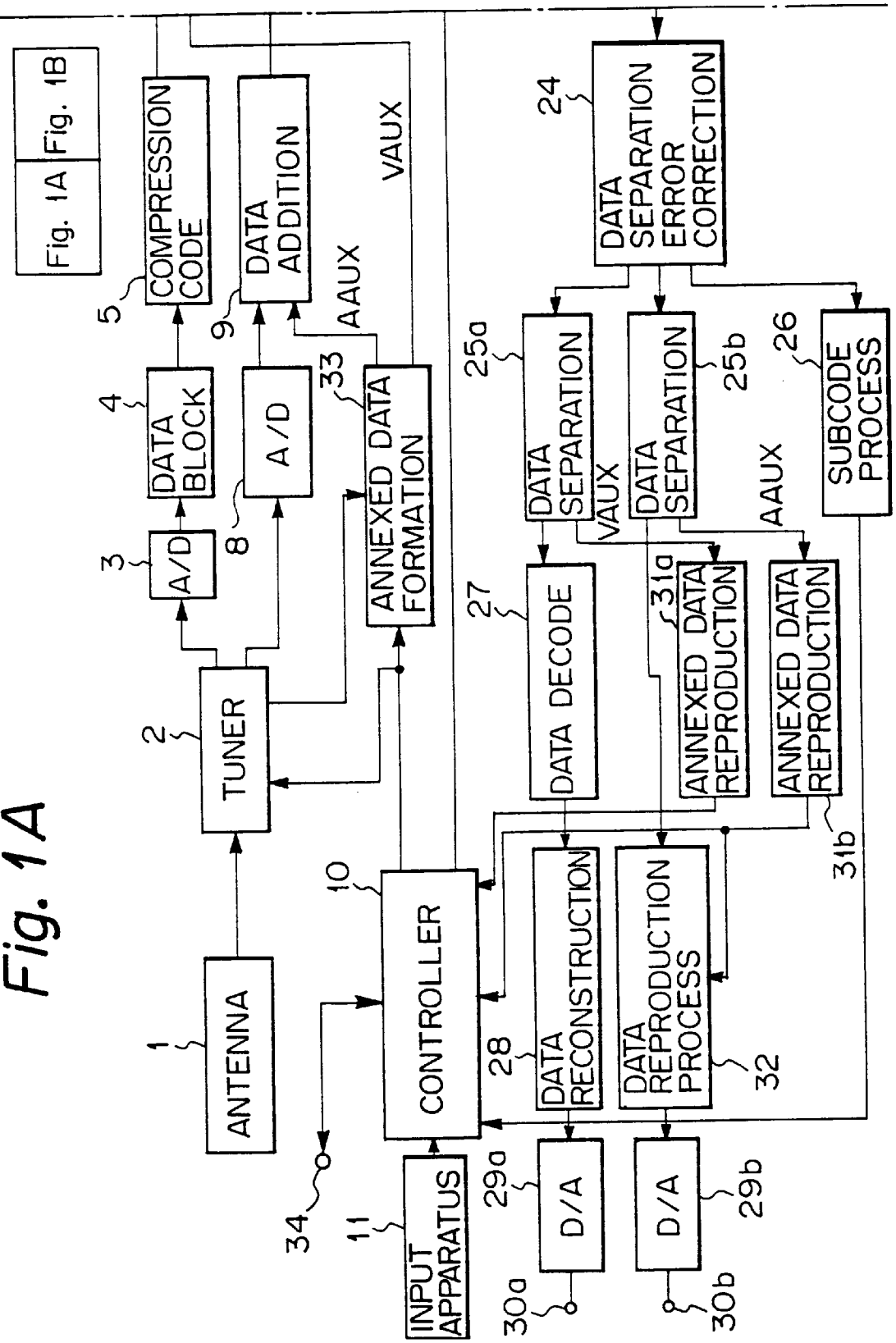

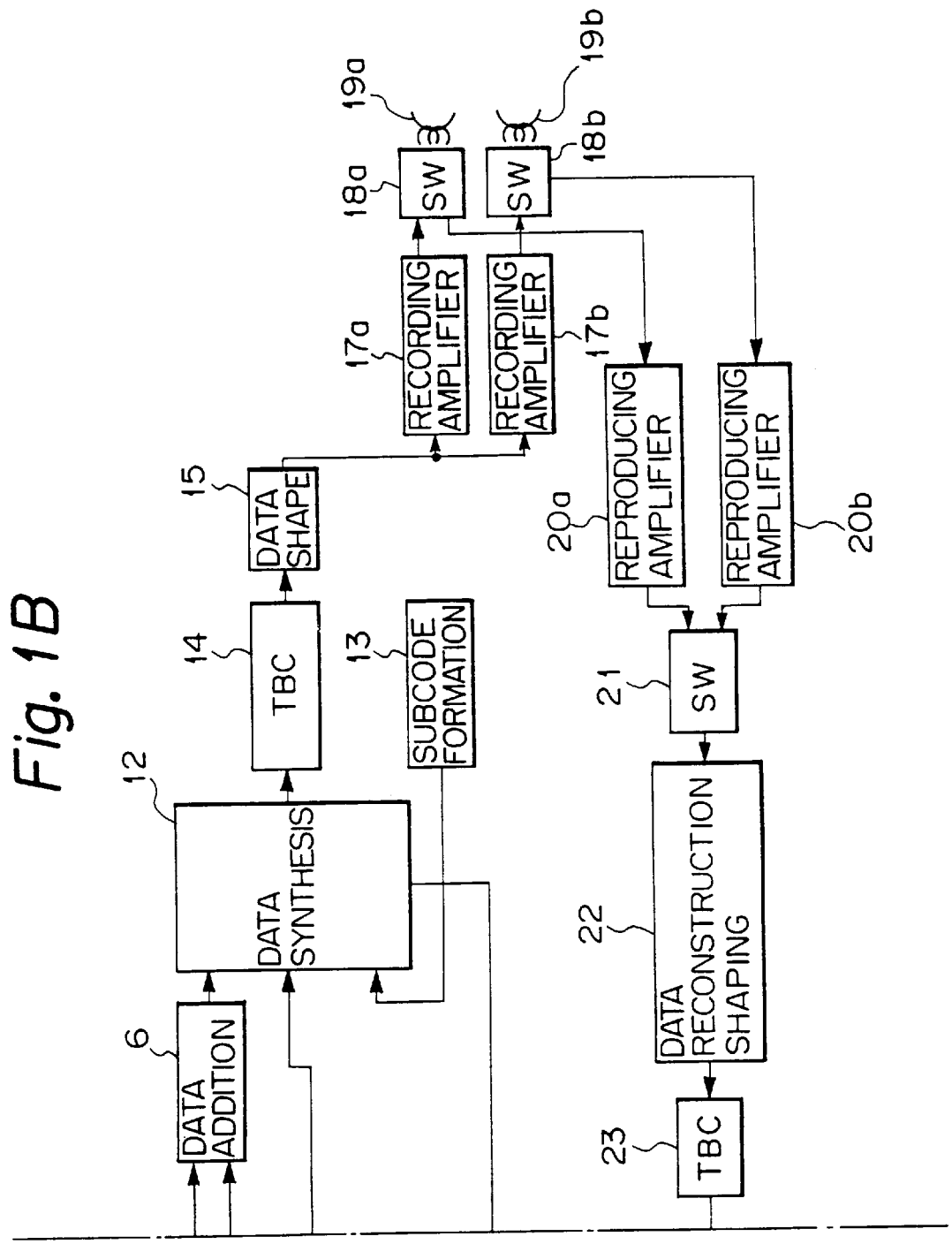

| WORD NAME | MSB | LSB |
|---|---|---|
| PC 0 | HEADER | |
| PC 1 | DATA | |
| PC 2 | | |
| PC 3 | | |
| PC 4 | | |

— UPPER HEADER

— LOWER HEADER

— LOWEST HIERARCHY BY BIT ALLOCATION

Fig. 24A

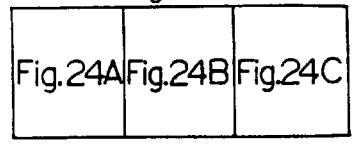

| | 0000<br>CONTROL | 0001<br>TITLE | 0010<br>CHAPTER |
|---|---|---|---|
| 0000 | CASSETTE ID | TOTAL TIME | TOTAL TIME |
| 0001 | TAPE LENGTH | REMAINING TIME | REMAINING TIME |
| 0010 | TIMER DATE RECORD | CHAPTER TITLE | CHAPTER NUMBER |
| 0011 | TIMER RECORD S/S | TIME CODE | TIME CODE |
| 0100 | RECORDING START POSITION | BINARY GROUP | BINARY GROUP |
| 0101 | RECORDING START POSITION | CASSETTE NUMBER | RESERVE |
| 0110 | INDEX PHOTO NUMBER | SOFT ID | RESERVE |
| 0111 | TP HEADER | SOFT ID | RESERVE |
| 1000 | TEXT HEADER | TEXT HEADER | TEXT HEADER |
| 1001 | TEXT | TEXT | TEXT |
| 1010 | TAG | TITLE START | CHAPTER START |
| 1011 | TAG | TITLE START | CHAPTER START |
| 1100 | RESERVE | REEL ID | RESERVE |
| 1101 | RESERVE | REEL ID | RESERVE |
| 1110 | ZONE END | TITLE END | CHAPTER END |
| 1111 | ZONE END | TITLE END | CHAPTER END |

Fig. 24B

| 0011 PART | 0100 PROGRAM | 0101 AAUX | 0110 VAUX |
|---|---|---|---|
| TOTAL TIME | TOTAL TIME | SOURCE | SOURCE |
| REMAINING TIME | REMAINING TIME | SOURCE CONTROL | SOURCE CONTROL |
| PART NUMBER | RECORDING DATE AND TIME | RECORDING DATE AND TIME | RECORDING DATE AND TIME |
| TIME CODE | TIME CODE | RECORDING DATE AND TIME | RECORDING DATE AND TIME |
| BINARY GROUP | BINARY GROUP | BINARY GROUP | BINARY GROUP |
| RESERVE | RESERVE | T.B.D. | CLOSED CAPTION |
| RESERVE | RESERVE | RESERVE | CAMERA FOR INDUSTRIAL AFFAIRS |
| RESERVE | RESERVE | RESERVE | TELETEXT |
| TEXT HEADER | TEXT HEADER | TEXT HEADER | TEXT HEADER |
| TEXT | TEXT | TEXT | TEXT |
| PART START | PROGRAM START | RESERVE | RESERVE |
| PART START | PROGRAM START | RESERVE | RESERVE |
| RESERVE | RESERVE | RESERVE | RESERVE |
| RESERVE | RESERVE | RESERVE | RESERVE |
| PART END | PROGRAM END | RESERVE | RESERVE |
| PART END | PROGRAM END | RESERVE | RESERVE |

Fig. 24C

| 0111 CAMERA FOR BUSINESS AFFAIRS | 1000 LINE | 1001 \| 1110 | 1111 SOFT MODE |
|---|---|---|---|
| LENS | LINE HEADER | | MAKER CODE |
| GAIN | Y | | OPTION |
| PEDESTAL | R-Y | | OPTION |
| GAMMA | B-Y | | OPTION |
| DETAILS | RESERVE | | OPTION |
| SHUTTER | R | | OPTION |
| KNEE | G | | OPTION |
| FLARE | B | RESERVE | OPTION |
| TEXT HEADER | TEXT HEADER | | OPTION |
| TEXT | TEXT | | OPTION |
| G LIGHT SHIELD 1 | RESERVE | | OPTION |
| G LIGHT SHIELD 2 | RESERVE | | OPTION |
| R LIGHT SHIELD 1 | RESERVE | | OPTION |
| B LIGHT SHIELD 2 | RESERVE | | OPTION |
| B LIGHT SHIELD 1 | RESERVE | | OPTION |
| B LIGHT SHIELD 2 | RESERVE | | NO INFO. |

Fig. 25

| | MSB | | | | | | | LSB |
|---|---|---|---|---|---|---|---|---|
| P C 0 | 0 | 0 | 0 | 0 | 0 | 0 | 0 | 0 |
| P C 1 | ME | 1 | 1 | MULTI BYTE | | | MEMORY TYPE | |
| P C 2 | MEMORY SIZE OF SPACE 0 | | | | MEMORY SIZE OF LAST BANK IN SPACE 11 | | | |
| P C 3 | MEMORY BANK NUMBER OF SPACE 1 | | | | | | | |
| P C 4 | THICKNESS | | | | THICKNESS 1/10 | | | |

Fig. 26

| | MSB | | | | | | | LSB |
|---|---|---|---|---|---|---|---|---|
| P C 0 | 0 | 0 | 0 | 0 | 0 | 0 | 0 | 1 |
| P C 1 | | | | | | | LSB → | 1 |
| P C 2 | ---------- TAPE LENGTH ---------- | | | | | | | |
| P C 3 | ← MSB ---------- (BINARY) ---------- | | | | | | | |
| P C 4 | 1 | 1 | 1 | 1 | 1 | 1 | 1 | 1 |

Fig. 27

| | MSB | | | | | | | LSB |
|---|---|---|---|---|---|---|---|---|
| PC 0 | 0 | 0 | 0 | 1 | 0 | 0 | 1 | 1 |
| PC 1 | S2 | S1 | DIGIT OF 10 OF FRAME | | DIGIT OF 1 OF FRAME | | | |
| PC 2 | S3 | DIGIT OF 10 OF SECOND | | | DIGIT OF 1 OF SECOND | | | |
| PC 3 | S4 | DIGIT OF 10 OF MINUTE | | | DIGIT OF 1 OF MINUTE | | | |
| PC 4 | S6 | S5 | DIGIT OF 10 OF HOUR | | DIGIT OF 1 OF HOUR | | | |

Fig. 28

| | MSB | | | | | | | LSB |
|---|---|---|---|---|---|---|---|---|
| PC 0 | 0 | 0 | 0 | 1 | 1 | 1 | 1 | 1 |
| PC 1 | ————————————————— LSB | | | | | | | BF |
| PC 2 | ——————— TRACK NUMBER ——————— | | | | | | | |
| PC 3 | MSB ——————— (BINARY) ——————— | | | | | | | |
| PC 4 | SL | RE | 1 | 1 | 1 | 1 | 1 | 1 |

Fig. 29

| | MSB | | | | | | | LSB |
|---|---|---|---|---|---|---|---|---|
| PC0 | 0 | 0 | 1 | 0 | 1 | 0 | 1 | 1 |
| PC1 | ←―――――――――――――――――― LSB | | | | | | | TT |
| PC2 | ――――――― TRACK NUMBER ―――――――― | | | | | | | |
| PC3 | ←MSB ―――――― (BINARY) ―――――――― | | | | | | | |
| PC4 | TEXT | GENRE CATEGORY | | | | | | |

Fig. 30

| | MSB | | | | | | | LSB |
|---|---|---|---|---|---|---|---|---|
| PC0 | 0 | 0 | 1 | 1 | 0 | 0 | 1 | 0 |
| PC1 | DIGIT OF 10 OF CHAPTER NUMBER | | | | DIGIT OF 1 OF CHAPTER NUMBER | | | |
| PC2 | DIGIT OF 10 OF PART NUMBER | | | | DIGIT OF 1 OF PART NUMBER | | | |
| PC3 | | | | | | | | |
| PC4 | | | | | | | | |

Fig. 31

| | MSB | | | | | | | LSB |
|---|---|---|---|---|---|---|---|---|
| PC0 | 0 | 1 | 0 | 1 | 0 | 0 | 0 | 0 |
| PC1 | LF | 1 | AF SIZE ||||||
| PC2 | CHANNEL ||| PA | AUDIO MODE ||||
| PC3 | 1 | 1 | 50/60 | S TYPE |||||
| PC4 | EF | TC | SMP ||| QU |||

Fig. 32

| | MSB | RECORDING START | | RECORDING END | | | | LSB |
|---|---|---|---|---|---|---|---|---|
| PC0 | 0 | 1 | 0 | 1 | 0 | 0 | 0 | 1 |
| PC1 | RESERVE ||||||||
| PC2 | | | RECORDING MODE || 1 | 1 | 1 | 1 |
| PC3 | DRF | SPEED |||||||
| PC4 | 1 | GENRE CATEGORY |||||||

Fig. 33

| | MSB | | | | | | | LSB |
|---|---|---|---|---|---|---|---|---|
| P C 0 | 0 | 1 | 0 | 1 | 0 | 0 | 1 | 0 |
| P C 1 | DS | TM | TIME ZONE | | | | | |
| P C 2 | 1 | 1 | DAY | | | | | |
| P C 3 | WEEK | | | MONTH | | | | |
| P C 4 | YEAR | | | | | | | |

Fig. 34

| | MSB | | | | | | | LSB |
|---|---|---|---|---|---|---|---|---|
| P C 0 | 0 | 1 | 0 | 1 | 0 | 0 | 1 | 1 |
| P C 1 | S2 | S1 | DIGIT OF 10 OF FRAME | | DIGIT OF 1 OF FRAME | | | |
| P C 2 | S3 | DIGIT OF 10 OF SECOND | | | DIGIT OF 1 OF SECOND | | | |
| P C 3 | S4 | DIGIT OF 10 OF MINUTE | | | DIGIT OF 1 OF MINUTE | | | |
| P C 4 | S6 | S5 | DIGIT OF 10 OF HOUR | | DIGIT OF 1 OF HOUR | | | |

Fig. 35

| MSB | | LSB |
|---|---|---|
| PC 0 | 0 1 0 1 | 0 1 0 0 |
| PC 1 | BINARY GROUP 2 | BINARY GROUP 1 |
| PC 2 | BINARY GROUP 4 | BINARY GROUP 3 |
| PC 3 | BINARY GROUP 6 | BINARY GROUP 5 |
| PC 4 | BINARY GROUP 8 | BINARY GROUP 7 |

Fig. 36

| MSB | LSB |
|---|---|
| PC 0 | 0 1 0 1 0 1 0 0 |
| PC 1 | |
| PC 2 | T. B. D. |
| PC 3 | |
| PC 4 | |

Fig. 37

| | MSB | | | | | | | LSB |
|---|---|---|---|---|---|---|---|---|
| PC0 | 0 | 1 | 1 | 0 | 0 | 0 | 0 | 0 |
| PC1 | DIGIT OF 10 OF TELEVISION CHANNEL | | | | DIGIT OF 1 OF TELEVISION CHANNEL | | | |
| PC2 | B/W | EN | CLF | | DIGIT OF 100 OF TELEVISION CHANNEL | | | |
| PC3 | SOURCE CODE | | 50/60 | | S TYPE | | | |
| PC4 | TUNER CATEGARY | | | | | | | |

Fig. 38

| | MSB | RECORDING START | | | | | | LSB |
|---|---|---|---|---|---|---|---|---|
| PC0 | 0 | 1 | 1 | 0 | 0 | 0 | 0 | 1 |
| PC1 | RESERVE | | | | | | | |
| PC2 | | 1 | RECORDING MODE | | 1 | DISPLAY | | |
| PC3 | FF | FS | FC | IL | ST | SC | BCSYS | |
| PC4 | 1 | GENRE CATEGORY | | | | | | |

Fig. 39

| | MSB | | | | | | | LSB |
|---|---|---|---|---|---|---|---|---|
| PC0 | 0 | 1 | 1 | 0 | 0 | 0 | 1 | 0 |
| PC1 | DS | TM | \multicolumn{6}{c|}{TIME ZONE} |
| PC2 | 1 | 1 | \multicolumn{6}{c|}{DAY} |
| PC3 | \multicolumn{3}{c|}{WEEK} | \multicolumn{5}{c|}{MONTH} |
| PC4 | \multicolumn{8}{c|}{YEAR} |

Fig. 40

| | MSB | | | | | | | LSB |
|---|---|---|---|---|---|---|---|---|
| PC0 | 0 | 1 | 1 | 0 | 0 | 0 | 1 | 1 |
| PC1 | S2 | S1 | \multicolumn{3}{c|}{DIGIT OF 10 OF FRAME} | \multicolumn{3}{c|}{DIGIT OF 1 OF FRAME} |
| PC2 | S3 | \multicolumn{4}{c|}{DIGIT OF 10 OF SECOND} | \multicolumn{3}{c|}{DIGIT OF 1 OF SECOND} |
| PC3 | S4 | \multicolumn{4}{c|}{DIGIT OF 10 OF MINUTE} | \multicolumn{3}{c|}{DIGIT OF 1 OF MINUTE} |
| PC4 | S6 | S5 | \multicolumn{3}{c|}{DIGIT OF 10 OF HOUR} | \multicolumn{3}{c|}{DIGIT OF 1 OF HOUR} |

Fig. 41

| | MSB | | | | | | | LSB |
|---|---|---|---|---|---|---|---|---|
| PC0 | 0 | 1 | 1 | 0 | 0 | 1 | 0 | 0 |
| PC1 | BINARY GROUP 2 | | | | BINARY GROUP 1 | | | |
| PC2 | BINARY GROUP 4 | | | | BINARY GROUP 3 | | | |
| PC3 | BINARY GROUP 6 | | | | BINARY GROUP 5 | | | |
| PC4 | BINARY GROUP 8 | | | | BINARY GROUP 7 | | | |

Fig. 42

| | MSB | | | | | | | LSB |
|---|---|---|---|---|---|---|---|---|
| PC0 | 0 | 1 | 1 | 0 | 0 | 1 | 0 | 1 |
| PC1 | 1ST FIELD LINE 21 UPPER BYTES | | | | | | | |
| PC2 | 1ST FIELD LINE 21 LOWER BYTES | | | | | | | |
| PC3 | 2ND FIELD LINE 21 UPPER BYTES | | | | | | | |
| PC4 | 2ND FIELD LINE 21 LOWER BYTES | | | | | | | |

Fig. 44

|   | 1 | 2 | 3 | 4 | 5 | 6 | 7 | 8 | 9 | 10 |
|---|---|---|---|---|---|---|---|---|---|----|
| 8 | 55 | f | 55 |   | 55 |   | 55 |   | 55 |   |
| 7 | 54 | e | 54 |   | 54 |   | 54 |   | 54 |   |
| 6 | 53 | d | 53 |   | 53 |   | 53 |   | 53 |   |
| 5 | 52 | 55 | 52 | 55 | 52 | 55 | 52 | 55 | 52 | 55 |
| 4 | 51 | 54 | 51 | 54 | 51 | 54 | 51 | 54 | 51 | 54 |
| 3 | 50 | 53 | 50 | 53 | 50 | 53 | 50 | 53 | 50 | 53 |
| 2 | c | 52 |   | 52 |   | 52 |   | 52 |   | 52 |
| 1 | b | 51 | h | 51 |   | 51 |   | 51 |   | 51 |
| 0 | a | 50 | g | 50 |   | 50 |   | 50 |   | 50 |

Fig. 47A

```
MSB ┌─────────┬───────┐
    │ APPL12  │ SYNC7 │
    │ APPL11  │ SYNC6 │
    │ APPL10  │ SYNC5 │
    │ SEQ0    │ SYNC4 │
    │ TRACK3  │ SYNC3 │
    │ TRACK2  │ SYNC2 │
    │ TRACK1  │ SYNC1 │
    │ TRACK0  │ SYNC0 │
LSB └─────────┴───────┘
```

Fig. 47B

```
MSB ┌─────────┬───────┐
    │ SEQ3    │ SYNC7 │
    │ SEQ2    │ SYNC6 │
    │ SEQ1    │ SYNC5 │
    │ SEQ0    │ SYNC4 │
    │ TRACK3  │ SYNC3 │
    │ TRACK2  │ SYNC2 │
    │ TRACK1  │ SYNC1 │
    │ TRACK0  │ SYNC0 │
LSB └─────────┴───────┘
```

Fig. 48

|    | 1 | 2 | 3 | 4 | 5 | 6 | 7 | 8 | 9 | 10 |
|----|---|---|---|---|---|---|---|---|---|----|
|    | C | C | C | C | C | E | E | E | E | E  |
| 10 | B | B | B | B | B | D | D | D | D | D  |
|    | A | A | A | A | A | A | A | A | A | A  |
|    | f | c | f | c | f | l | i | l | i | l  |
|    | e | b | e | b | e | k | h | k | h | k  |
|    | d | a | d | a | d | j | g | j | g | j  |
|    | C | C | C | C | C | E | E | E | E | E  |
| 5  | B | B | B | B | B | D | D | D | D | D  |
|    | A | A | A | A | A | A | A | A | A | A  |
|    | c | f | c | f | c | i | l | i | l | i  |
|    | b | e | b | e | b | h | k | h | k | h  |
| 0  | a | d | a | d | a | g | j | g | j | g  |

Fig. 55

| Byte | Contents | Pack |
|---|---|---|
| 0 | 1,1,1, BCID | APPLICATION ID / BASIC CASSETTE ID |
| 1 | 00h | CASSETTE ID PACK |
| 2 | CASSETTE ID | |
| 3 | CASSETTE ID | |
| 4 | CASSETTE ID | |
| 5 | | |
| 6 | 01h | TAPE LENGTH PACK |
| 7 | | |
| 8 | TAPE LENGTH | |
| 9 | | |
| 10 | FFh | |
| 11 | 1Fh | TITLE END PACK |
| 12 | FFh | |
| 13 | FFh | |
| 14 | FFh | |
| 15 | FFh | |
| 16 | FFh | |
| 17 | FFh | |
| 18 | FFh | |
| 19 | ⋮ | |

Fig. 56

| Byte | Contents |
|---|---|
| 0 | 1,1,1, BCID — APPLICATION ID / BASIC CASSETTE ID |
| 1 | 00h |
| 2 | |
| 3 | |
| 4 | |
| 5 | |
| 6 | |

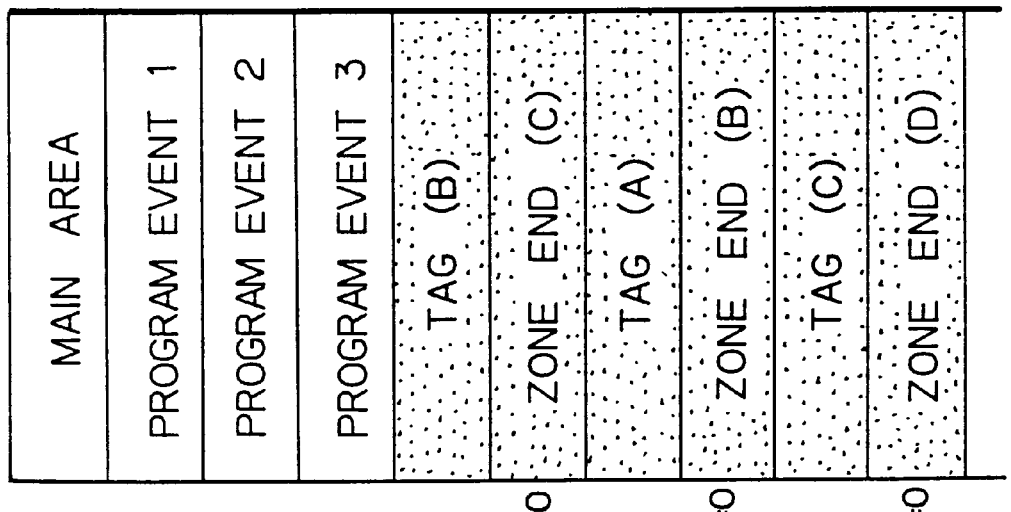
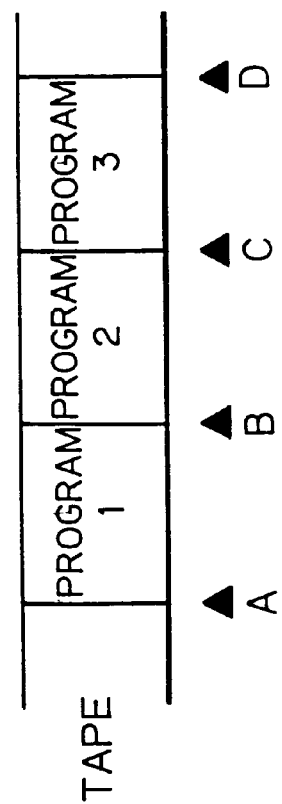

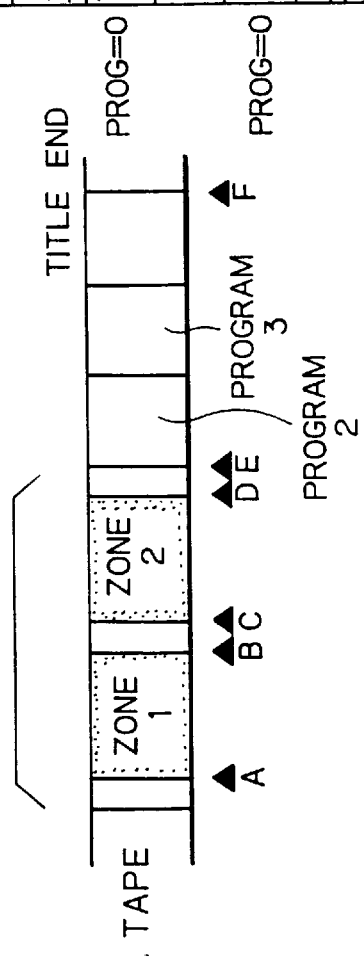

Fig. 65

| EVENT | EVENT HEADER PACK | PACK HEADER |
|---|---|---|
| TAG | TAG | 0Bh |
| ZONE | TAG | 0Bh |
| TITLE | TITLE START | 1Bh |
| CHAPTER | CHAPTER START | 2Bh |
| PART | PART START | 3Bh |
| PROGRAM | PROGRAM START | 4Bh |
| RESERVE | — | XBh |
| TIMER RESERVATION | TIMER DATE RECORD | 02h |
| TEXT | TEXT HEADER | X8h |
| MAKER'S OPTIONAL | MAKER CODE | F0h |

Fig. 73

| | |
|---|---|
| 48h | |
| 0Eh | ⟶ TDP = 14 |
| 00h | ⟶ TEXT TYPE = NAME, OPEN = 0 |
| 46h | ⟶ TEXT CODE = 46h |
| 57h | ⟶ W |
| 65h | ⟶ e |
| 61h | ⟶ a |
| 74h | ⟶ t |
| 68h | ⟶ h |
| 65h | ⟶ e |
| 72h | ⟶ r |
| 20h | ⟶ ␣ |
| 52h | ⟶ R |
| 65h | ⟶ e |
| 70h | ⟶ p |
| 6Fh | ⟶ o |
| 72h | ⟶ r |
| 74h | ⟶ t |
| 48h | |
| 03h | ⟶ TDP = 3 |
| 20h | ⟶ TEXT TYPE = STATION, OPEN = 0 |
| 46h | ⟶ TEXT CODE = 46h |
| 43h | ⟶ C |
| 4Eh | ⟶ N |
| 4Eh | ⟶ N |

Fig. 74

| PC0 | 0 1 0 0 1 0 0 0 |  |
|---|---|---|
| PC1 | ---------- TDP BINARY ---------→ LSB | |
| PC2 | TEXT TYPE | O P N ←---- MSB |
| PC2 | TEXT CODE | |
| PC2 | TEXT DATA 1 | |
| PC2 | TEXT DATA 2 | |
| ⋮ | ⋮ | |
| PC (n+2) | TEXT DATA n−1 | |
| PC (n+3) | TEXT DATA n | |

CASSETTE WITH MEMORY

This application is a continuation of application Ser. No. 08/310,106, filed Sep. 22, 1994, abandoned

BACKGROUND OF THE INVENTION

1. Field of the Invention

The invention relates to a cassette with a memory which is used for a digital VCR which can add a plurality of character information to a video image, and relates to a data arrangement in a memory area of a memory in a cassette with a memory for recording digital data.

2. Description of the Related Art

A digital VCR for digitizing video data and recording onto a magnetic tape is being developed. Since a transmission band of digital video data is very wide, for example, a DCT transformation or the like is performed to the digital video data and, after that, the video data is recorded onto the magnetic tape.

A digital VCR into which a cassette package having therein a memory or the like can be loaded has also been proposed. There has also been proposed an apparatus in which by loading such a cassette package, signals can be input and output to/from the digital VCR and a representative still image of a program recorded on the cassette tape and a tape address and TOC (Table Of Contents) from which the program is started are stored into a memory, thereby simplifying the access and realizing a high speed.

The memory provided in the above cassette package comprises a main area, an optional area, and an unused area. Its data structure is divided into a main area and an optional area. The main area is the area in which data (main event) such as tape information or the like is recorded. The optional area is the area in which data (optional event) such as index information, TOC, and the like is recorded.

In U.S. Pat. Nos. 4,338,644 and 4,383,285 are disclosed that a memory loaded in a recording medium cassette of a VCR stores reacording data, and in Japanese Patent Application number H04-217503 and corresponding to EP Application number 0,580,434, are disclosed such recording medium cassette. Each of the above application are owned by the assignee of the present invention and are hereby incorporated by reference.

The character information regarding the recorded video image is recorded into a text event existing in the memory. In the case where there is the character information, a text flag provided in the memory is set to "0". In the case where there is no character information, the text flag is set to "1". The character information and the text event correspond in a one-to-one relation.

Even in the case where there are a plurality of character information, the text flag is set to "0". However, since there is the one-to-one corresponding relation between the character information and the text event, a plurality of character information cannot be made correspond to one text event. Therefore, a plurality of character information cannot be added to the recorded video image.

In the case where the above-mentioned event is accompanied with character information or the like, a text event is recorded. In case of recording the text event, if the recording order with the other events is not properly set, when the character information is added or deleted, data processes in the memory are complicated.

It is, therefore, an object of the invention to provide a cassette with a memory in which by making a plurality of character information correspond to a plurality of text events, the plurality of character information can be added to a recording video image.

It is another object of the invention to provide a cassette with a memory in which the recording order of a text event and the other events is properly set and data processes in the memory in case of adding or deleting character information can be easily executed.

SUMMARY OF THE INVENTION

The present invention is provided a cassette with a memory in which video data and audio data are digitally recorded, characterized in that number information indicative of the number of additional information regarding predetermined information in the memory is recorded into the predetermined information, thereby making the plurality of additional information correspond to the predetermined information.

The number information indicative of the number of text events corresponding to the program events is recorded into the program events. Due to this, a plurality of text events can be made correspond to one program event.

The present invention is provided a cassette with a memory for recording digital data, wherein as for memory areas in the memory, there are a main area in which tape information or the like is stored and an optional area in which TOC information, timer recording information, character information, etc. are stored, and in the case where there is character information regarding events of an optional area, the character information is recorded at the last position of the optional area.

In the case where there is character information regarding the events of the optional area, the character information is recorded to the last position of the optional area. Due to this, data processes in the memory can be easily performed.

The above, and other, objects, features and advantage of the present invention will become readily apparent from the following detailed description thereof which is to be read in connection with the accompanying drawings.

BRIEF DESCRIPTION OF THE DRAWINGS

FIGS. 1A and 1B are block diagrams of a digital VCR corresponding to a cassette with a memory according to the invention;

FIGS. 24A to 24C are pack header tables;

FIG. 25 is a diagram which is used for explanation of a cassette ID packs for the main area of MIC;

FIG. 26 is a diagram which is used for explanation of a tape length pack for the main area of MIC;

FIG. 27 is a diagram which is used for explanation of a time code pack for the main area of the subcode;

FIG. 28 is diagram which is used for explanation of a title end pack for the main area of the subcode;

FIG. 29 is a diagram which is used for explanation of a chapter start pack for the main area of the subcode;

FIG. 30 is a diagram which is used for explanation of a part number pack for the main area of the subcode;

FIG. 31 is a diagram which is used for explanation of a source pack for the main area of the AAUX data;

FIG. 32 is a diagram which is used for explanation of a source control pack for the main area of the AAUX data;

FIG. 33 is a diagram which is used for explanation of a time and date record pack for the main area of the AAUX data;

FIG. 34 is a diagram which is used for explanation of a time record pack for the main area of the AAUX data;

FIG. 35 is a diagram which is used for explanation of a binary group pack for the main area of the AAUX data;

FIG. 36 is a diagram which is used for explanation of a TBD pack for the main area of the AAUX data;

FIG. 37 is a diagram which is used for explanation of a source pack for the main area of the VAUX data;

FIG. 38 is a diagram which is used for explanation of a source control pack for the main area of the VAUX data;

FIG. 39 is a diagram which is used for explanation of a time and date record pack for the main area of the VAUX data;

FIG. 40 is a diagram which is used for explanation of a time record pack for the main area of the VAUX data;

FIG. 41 is a diagram which is used for explanation of a binary group pack for the main area of the VAUX data;

FIG. 42 is a diagram which is used for explanation of a closed caption pack for the main area of the VAUX data;

FIG. 44 is a diagram showing a state in which the AAUX data of nine packs is extracted and written in the track direction;

FIGS. 47A and 47B are diagrams showing data which is recorded in an ID portion;

FIG. 48 is a diagram showing a data portion of the subcode;

FIG. 55 is a diagram showing the contents of MIC for the VCR in a new cassette tape;

FIG. 56 is a diagram showing the contents of MIC other than those for the VCR in the new cassette tape;

FIGS. 63A and 63B are diagrams which is used for explanation of the zone event;

FIGS. 64A and 64B are diagrams which is used for explanation of the zone event;

FIG. 65 is a diagram showing the details of an event header;

FIG. 73 is a diagram showing a data array of variable length text packs;

FIG. 74 is a diagram showing a program text header pack construction in the case where there are (n) character information;

DETAILED DESCRIPTION OF THE PREFERRED EMBODIMENTS

Figure 2:
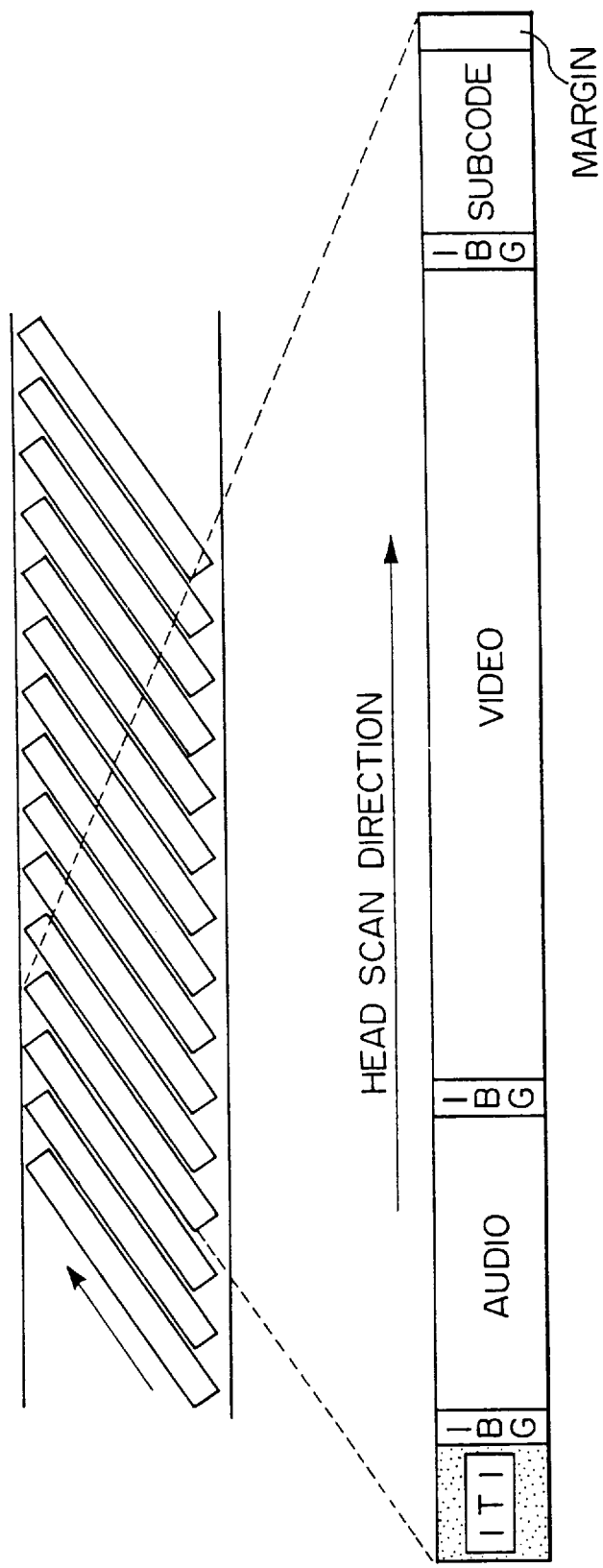
FIG. 2 is a diagram which is used for explanation of a track format.

An embodiment of the invention will be explained hereinbelow with reference to the drawings. Explanation will now be sequentially made for easy understanding in accordance with the following order.

(A) with respect to a digital VCR according to the invention
(B) with respect to a track format
(C) with respect to an application ID
(D) with respect to a pack construction
(E) with respect to the recording of AAUX data and VAUX data
(F) with respect to an ID
(G) with respect to a structure of the cassette with a memory
(H) with respect to a data structure of an MIC
(I) with respect to a discrimination of cassette
(J) with respect to events
(K) with respect to the generation and erasure of events
(L) with respect to the case of recording a plurality of text events
(M) with respect to a tag recording (A) With respect to a digital VCR according to the invention FIGS. 1A and 1B are block diagrams of a digital VCR according to the invention. In the digital VCR to which the invention is applied, a video signal is digitized and is compressed by a DCT transformation and the signal is recorded onto a magnetic tape by a rotary head.

First, the recording mode will be explained. In FIG. 1, a television broadcasting is received by an antenna 1. A reception signal of the antenna 1 is supplied to a tuner section 2. A channel setting signal is supplied from a controller 10 to the tuner section 2. A channel setting input is given to the controller 10 from an input apparatus 11. On the basis of the channel setting signal, a reception signal of a desired channel is selected by the tuner section 2 from the received television broadcasting. A video signal and an audio signal of the selected television broadcasting are demodulated by the tuner section 2.

A component video signal comprising, for example, a luminance signal Y and color difference signals (R-Y) and (B-Y) is output from the tuner section 2. The video signal is supplied to an A/D converting section 3. The video signal is converted to the digital signal by the A/D converting section 3. An output of the A/D converting section 3 is supplied to a data block forming section 4. In the data block forming section 4, the video signal is shuffled and divided into, for example, (8×8) blocks. An output of the data block forming section 4 is supplied to a compression coding section 5.

The compression coding section 5 DCT transforms the blocked video signal and quantizes the signal so that a code amount of a predetermined buffer unit is equal to or less than a predetermined amount. The quantized output is variable length coded by using, for example, a 2-dimensional Huffman code. An output of the compression coding section 5 is supplied to a data adding section 6.

Video auxiliary (VAUX) data is supplied from an annexed data forming circuit 33 to the data adding section 6. The VAUX data is spare data such as channel number, monochrome/color, source code, channel category, recording time, recording year/month/date, and the like. In order to form such spare VAUX data, various kinds of data is supplied from the controller 10 to the annexed data forming circuit 33. The VAUX data is added to the video data generated from the compression coding section 5 by the data adding section 6. A parity for error correction is added in the horizontal and vertical directions. The video data to which the VAUX data was added as mentioned is supplied to a data synthesizing section 12.

Audio data is also generated from the tuner section 2. The audio data is supplied to an A/D converting section 8. The audio data is converted to the digital data by the A/D converting section 8. An output of the A/D converting section 8 is supplied to a data adding section 9. Audio auxiliary (AAUX) data is supplied from the annexed data forming circuit 33 to the data adding section 9. The AAUX data is spare data such as 2-channel/4-channel, sampling frequency, presence/absence of emphasis, recording time, recording year/month/date, and the like. The AAUX data is added to the audio data by the data adding section 9. The audio data added with the AAUX data is supplied to the data synthesizing section 12.

Further, a subcode forming section 13 is provided. The subcode is data for searching such as time code, track number, and the like. The subcode from the subcode forming section 13 is supplied to the data synthesizing section 12.

The video data from the data adding section 6, the audio data from the data adding section 9, and the subcode data from the subcode forming section 13 are synthesized by the data synthesizing section 12.

An output of the data synthesizing section 12 is supplied to a time base corrector (TBC) 14. The recording data is time base corrected by the TBC 14. An output of the TBC 14 is supplied to a data shaping section 15. The recording data is subjected to a 24–25 modulation (modulating method of converting 24-bit data to 25-bit data and recording) by the data shaping section 15.

An output of the data shaping section 15 is supplied to heads 19a and 19b through recording amplifiers 17a and 17b and switches 18a and 18b. The switches 18a and 18b can be switched in the recording mode and the reproducing mode. The compressed video data, audio data, and subcode data are recorded onto a magnetic tape (not shown) by the heads 19a and 19b.

Subsequently, the reproducing mode will now be explained. The recording data of the tape is reproduced by the heads 19a and 19b and is supplied to reproducing amplifiers 20a and 20b through the switches 18a and 18b. Outputs of the reproducing amplifiers 20a and 20b are supplied to a switch 21. A head switching signal is supplied to the switch 21. An output of the switch 21 is supplied to a data reconstruction shaping section 22. The reproduction data is demodulated by the data reconstruction shaping section 22. An output of the data reconstruction shaping section 22 is supplied to a TBC 23. A time base of the reproducing data is corrected by the TBC 23. An output of the TBC 23 is supplied to a data separation and error correcting section 24.

The data separation and error correcting section 24 separates the reproduction data into the video data, audio data, and subcode data. An error correcting process of the reproduced video data, audio data, and subcode data is executed by the data separation and error correcting section 24.

The video data from the data separation and error correcting section 24 is supplied to a data separating section 25a. The VAUX data has been added in the video data supplied to the data separating section 25a. The VAUX data is separated by the data separating section 25a. The video data is supplied to a data decoding section 27. The separated VAUX data is supplied to an annexed data reproducing section 31a. The VAUX data is reproduced by the annexed data reproducing section 31a. The reproduced VAUX data is supplied to the controller 10.

The data decoding section 27 executes an expanding process of the compressed video data by performing a decoding of the 2-dimensional Huffman code, inverse quantization, and inverse DCT to the reproduction data. An output of the data decoding section 27 is supplied to a data reconstructing section 28. A block combining process is executed in the data reconstructing section 28. Digital component video data comprising the luminance signal Y and the color difference signals (R-Y) and (B-Y) is generated from the data reconstructing section 28. The digital component video data is supplied to a D/A converting section 29a. The digital component video data is converted into the analog component video data by the D/A converting section 29a. The analog component video data is generated from an output terminal 30a.

The audio data from the data separation and error correcting section 24 is supplied to a data separating section 25b. The AAUX data has been added in the audio data supplied from the data separating section 25b. The AUX data is separated by the data separating section 25b. The audio data is supplied to a data reproduction processing section 32. The separated AAUX data is supplied to an annexed data reproducing section 31b. The AAUX data is reproduced by the annexed data reproducing section 31b. The AAUX data is supplied to the controller 10 and the data reproduction processing section 32.

The data reproduction processing section 32 executed a reproducing process of the audio data. The AAUX data reproduced by the annexed data reproducing section 31b is used as control data for the reproducing process of the audio data. Digital audio data is output from the audio reproduction processing section 32. The digital audio data is supplied to a D/A converting section 29b. In the D/A converting section 29b, the digital audio data is converted into the analog audio data. The analog audio data is output from an output terminal 30b.

In the digital VCR to which the invention is applied, as mentioned above, the VAUX data as addition data is added to the video data and the AAUX data as addition data is added to the audio data. The control information and the information of the recording time and recording year/month/data can be obtained from the VAUX data and AAUX data. The information of the time code and the absolute number of the track can be obtained from the subcode information.

Further, among the cassettes into which tapes are enclosed, there is a cassette with a memory. Together with the information of the tape itself such as tape length, tape thickness, kind of tape, and the like, table of contents (TOC) information, index information, character information, reproduction control information, timer recording information, and the like can be stored in the memory [referred to as an MIC (memory in cassette)]. The memory in the cassette is connected to the controller 10 though a terminal 34. By using the memory in the cassette, it is possible to skip to a predetermined program, set the reproducing order of the programs, and designate a scene of a predetermined program and reproduce a still image (photo) and timer record.

(B) With respect to a track format

A track format will now be explained hereinbelow with reference to FIGS. 2 to 18. In the NTSC system, one frame is constructed by 10 tracks. In the PAL system, one frame is constructed by 12 tracks. As shown in FIG. 2, in a tape for the digital VCR, one track is constructed by an ITI area, an audio sector, a video sector, and a subcode sector in accordance with this order from the entrance side of the track. Inner block gaps (IBG) are provided among the sectors and a margin is provided after the subcode.

Explaining in detail, the ITI area as a timing block to certainly execute an after-recording is provided at the entrance end of the track. Generally, on the entrance side of the track, it is difficult to obtain a good contacting state of the head because of causes of a mechanical accuracy and the like, so that it is unstable. Therefore, a number of sync blocks each having a short sync length are recorded in the ITI area. Sync numbers are sequentially allocated to the sync blocks in accordance with the order from the end of the track entrance. The case of after-recording is considered now. When an arbitrary one of the sync blocks recorded in the ITI area is detected, the position on the present track is accurately detected from the number recorded there. On the basis of the detection, the after-recording area can be decided.

Figure 3:
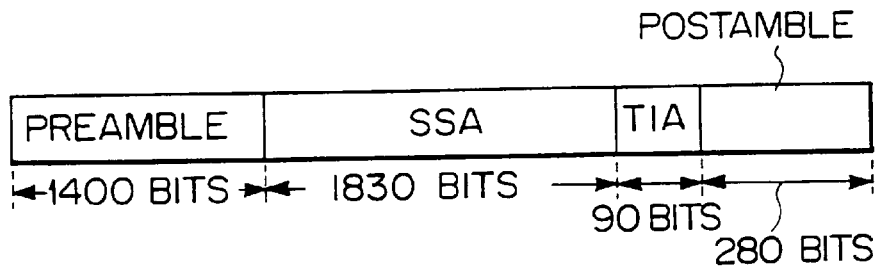
FIG. 3 is a d diagram which is used for explanation of a track format.

FIG. 3 is an enlarged diagram of the ITI area. In FIG. 3, the ITI area is constructed by: a preamble consisting of 1,400 bits for the pull-in of the PLL of the digital data reproduction or the like; an SSA (start sync block area) consisting of 1,830 bits (61 blocks) to decide the after-recording area; a TIA (track information area) consisting of 90 bits (3 blocks) to store information regarding the whole track; and a postamble consisting of 280 bits which is provided for a margin.

Figure 4:
FIG. 4 is a diagram which is used for explanation of a track format.

FIG. 4 is an enlarged diagram of the TIA area. In FIG. 4, the TIA area comprises an APT (application ID of a track) of 3 bits, an SP/LP of 1 bit, an RSV (reserve) of 1 bit, and a PF (Pilot Frame) of 1 bit. The APT is an application ID existing in a track and specifies the data structure. Namely, by the APT value, the track is divided into several sectors and a position on the track, a sync block structure, and an ECC construction are set. As will be explained hereinlater, by setting AP1 to APn under the APT, the data construction on the track can be set to a hierarchy structure. The SP/LP indicates track pitches. Namely, the SP denotes the track pitch which is used in the recording mode of the standard time and the LP indicates the track pitch which is used in a long time mode. The PF indicates a reference frame of a servo system.

Figure 5:
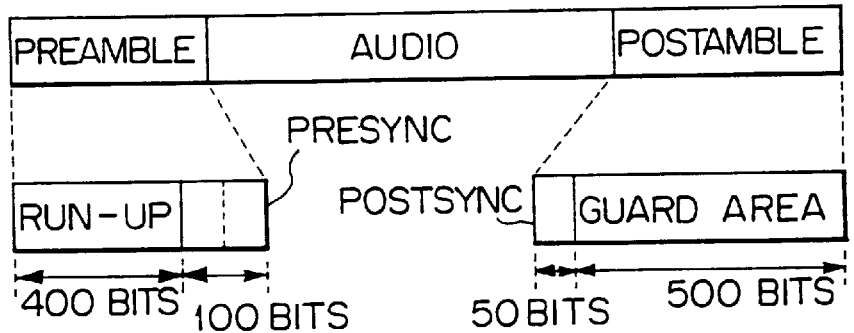
FIG. 5 is a diagram which is used for explanation of a track format.

FIG. 5 shows a structure of the audio sector. The audio sector is constructed by 14 sync blocks per track. Data is 24–25 converted and, after that, it is recorded. Therefore, the total bit length is equal to $$90 \times 14 \times 8 \times 25 \div 24 = 10{,}500 \text{ bits}$$

Each sync block comprises a preamble of 500 bits, an audio data area, and a postamble of 550 bits. The preamble comprises a run-up of 400 bits and a presync of 100 bits (2 sync blocks). The run-up is used for the pull-in of a PLL (Phase Locked Loop) and the presync is used for a predetection of an audio sync block. The postamble comprises a postsync of 50 bits (1 sync block) and a guard area of 500 bits. The postsync is used to confirm the end of the audio sector by the sync number of the ID. The guard area is used to guard so that its data is not multiplexed to the audio sector when the after-recording of the video sector is performed.

Figure 6:
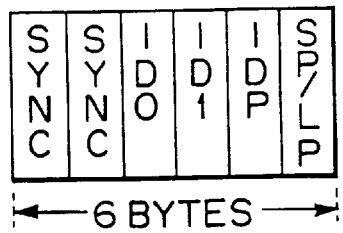
FIG. 6 is a diagram which is used for explanation of a track format.

FIG. 6 is an enlarged diagram of the presync in the audio sector shown in FIG. 5. The presync comprises 6 bytes of two sync bytes, ID0, ID1, IDP (ID parity), and SP/LP. As for the value of the SP/LP, SP is indicated by FFh and LP is indicated by 00h. The ID byte of the SP/LP shown in FIG. 6 is the data for protection and is the spare data of the SP/LP which also exists in the above-mentioned TIA sector. That is, in the case where the value of the SP/LP in the TIA sector cannot be read, the SP/LP in the presync is read out.

Figure 7:
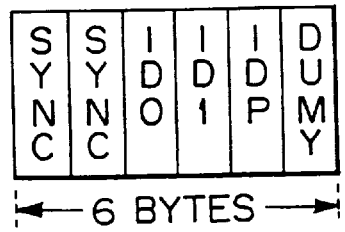
FIG. 7 is a diagram which is used for explanation of a track format.

FIG. 7 is an enlarged diagram of the postsync shown in FIG. 5. The postsync comprises 6 bytes of two sync bytes, ID0, ID1, IDP, and DUMY. The DUMY stores FFh as dummy data.

After the data of six bytes in each of the presync and the postsync was subjected to the 24–25 conversion, it is recorded. Therefore, the total bit length is as follows.

presync: 6×2×8×25÷24=100 bits
postsync: 6×1×8×25÷24=50 bits

Figure 8:
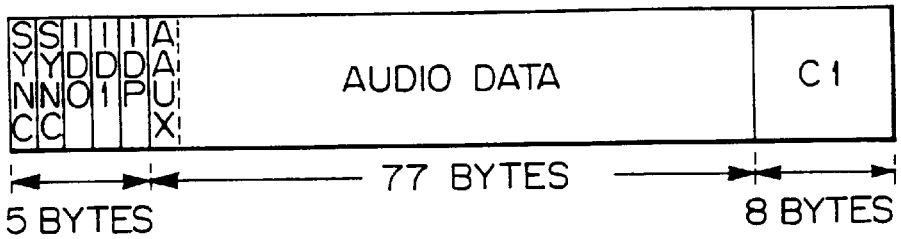
FIG. 8 is a diagram which is used for explanation of a track format.

FIG. 8 shows a sync block structure from the first sync to the ninth sync of the audio sector. One sync block comprises 90 bytes. Five bytes in the former half portion of one sync block have a structure similar to that of each of the above-mentioned presync and postsync. Five bytes in the former half portion in the audio data area comprising 77 bytes are used for the AAUX (Audio Auxiliary) data. The AAUX data is the spare data of the audio signal which is recorded in the audio sector of the track. As such data, there are the following data: namely, source data indicative of 2-channel/4-channel, a sampling frequency, a source code, the presence/absence of the emphasis, and the like; recording time data indicative of the recording time (hour, minute, second, and the like) of the audio data and the frame number; source control data indicative of the start and end of the recording of the audio data; binary group data which is recorded in the main area; and T.B.D. (this is an abbreviation of "To Be Defined" and is specified for the definition hereinlater) data. After the AAUX data of five bytes, an audio data area of 77 bytes is provided. After the audio data area, a horizontal parity C1 of eight bytes is provided.

Figure 9:
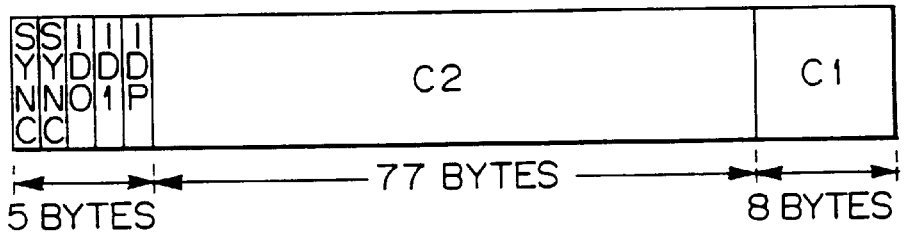
FIG. 9 is a diagram which is used for explanation of a track format.

FIG. 9 is a diagram showing a sync block structure of the parity C1 in a range from the 10th sync to the 14th sync in the audio sector. As will be also obviously understood from FIG. 9, it is assumed that the first five bytes are similar to those of the sync structure shown in FIG. 8. Subsequently, a vertical parity C2 of 77 bytes is provided and the horizontal parity C1 is finally provided.

Figure 10:
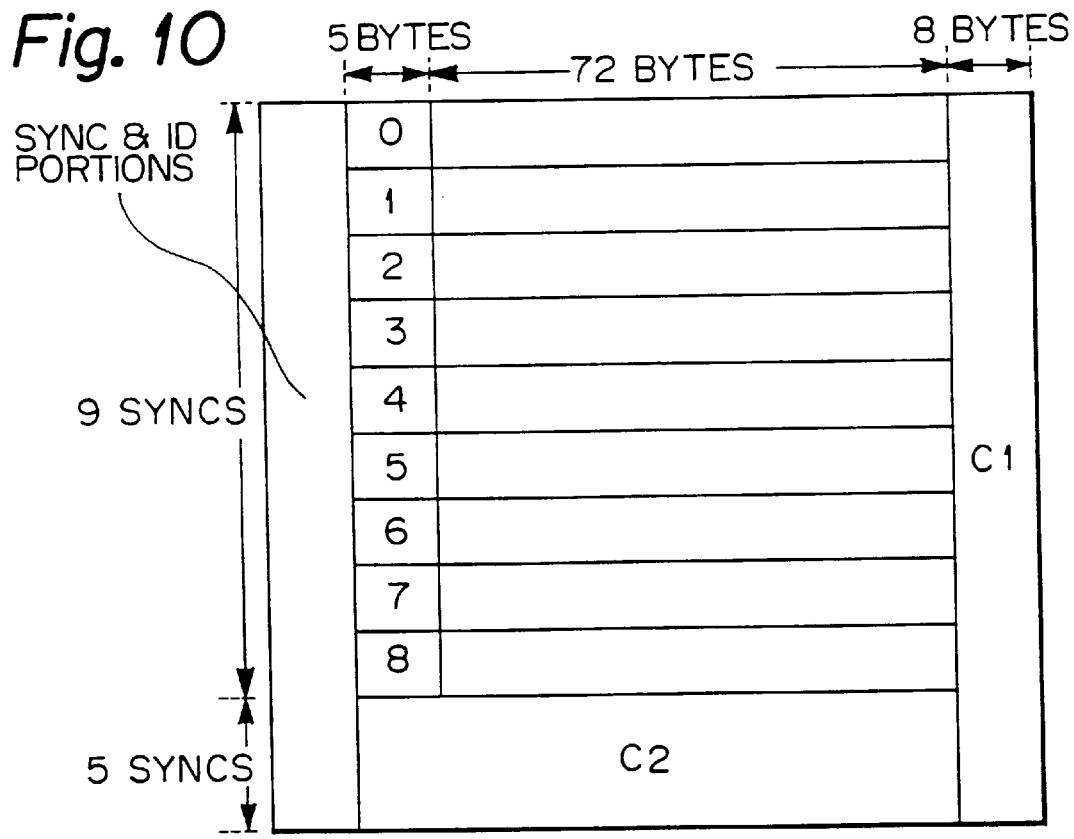
FIG. 10 is a diagram which is used for explanation of a track format.

FIG. 10 is a diagram showing a state in which 14 sync blocks provided in the audio sector of one track are arranged in the vertical direction. After the nine sync blocks shown in FIG. 8, five sync blocks shown in FIG. 9 are sequentially arranged.

Figure 11:
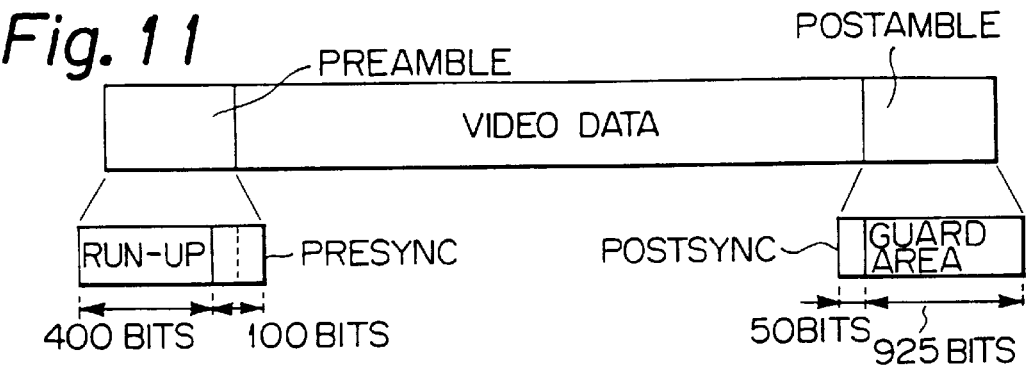
FIG. 11 is a diagram which is used for explanation of a track format.

FIG. 11 shows a structure of the video sector. The video sector is constructed by 149 sync blocks per track. The video sector comprises a preamble of 500 bits, a video data area of 111,750 bits (135 sync blocks), and a postamble of 975 bits. The preamble comprises a run-up of 400 bits and a presync of 100 bits (2 sync blocks). The run-up is used for the pull-in of the PLL and the presync is used for the predetection of a video sync block. The postamble comprises a postsync block of 50 bits (1 sync block) and a guard area of 925 bits. The number of bytes of the guard area is larger than that of the guard area in the postamble provided in the audio sector.

Figure 12:
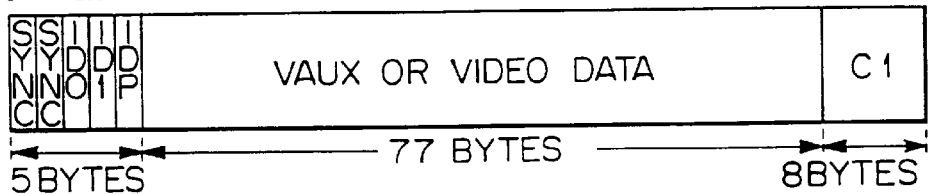
FIG. 12 is a diagram which is used for explanation of a track format.

FIG. 12 shows a structure of one sync block in the video sector. One sync block among the video sector comprises 90 bytes. First five bytes in the 90 bytes have a structure similar to that in the presync and postsync of the audio sector. The following 77 bytes relate to a data area to which video data or VAUX (Video Auxiliary) data is recorded. The video data is recorded as video data of one buffer unit. The VAUX data is the spare data for the video data. As such data, there are the following data: source data indicative of a channel number, monochrome, a source code, a tuner category, and the like; recording time data indicative of the recording time (hour, minute, second, and the like) and a frame number of the video data; source control data indicative of the start and end of the recording of the video data; binary group data which is recorded in the main area, which will be explained hereinlater; recording year/month/date data indicative of the recording year/month/date of the video data; and a closed caption for a title. After the data area, the horizontal parity C1 is provided.

Figure 13:
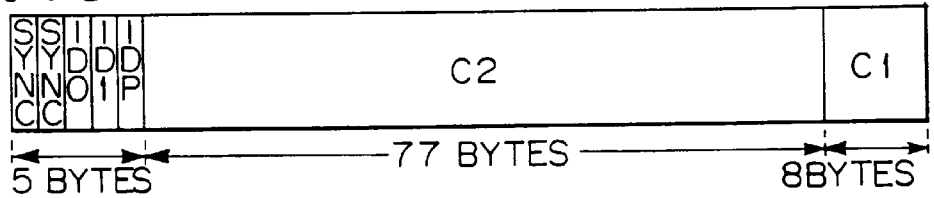
FIG. 13 is a diagram which is used for explanation of a track format.

FIG. 13 shows a structure of 11 sync blocks in the latter half portion of the video sector. In FIG. 13, first five bytes are similar to those shown in FIG. 12. Subsequent to the five bytes, the vertical parity C2 of 77 bytes is added and, further, the horizontal parity C1 of eight bytes is added after the vertical parity C2. The same number of bytes as that of the horizontal parity C1 shown in FIG. 12 is allocated to the horizontal parity C1. [0041]

Figure 14:
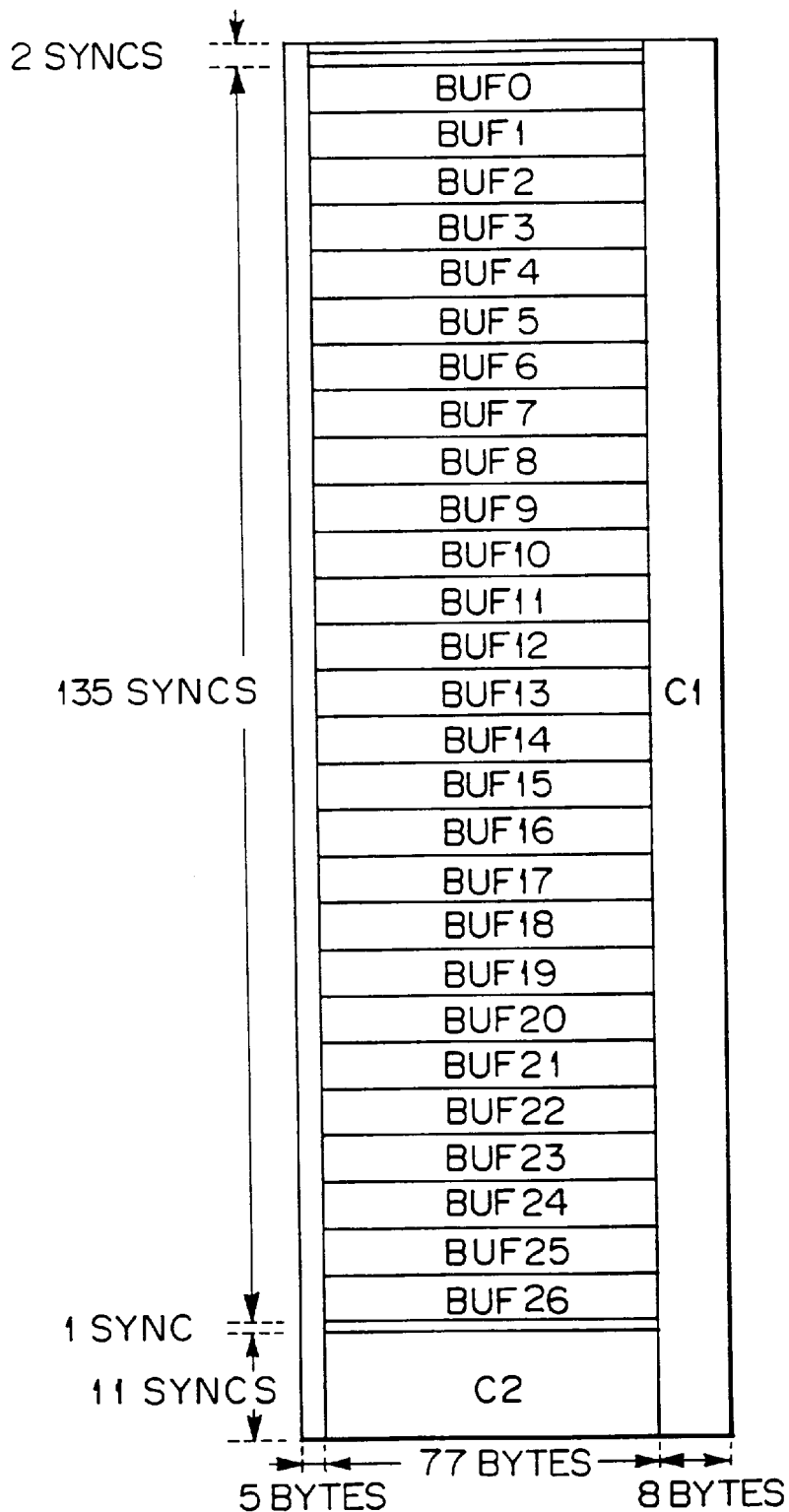
FIG. 14 is a diagram which is used for explanation of a track format.

FIG. 14 is a diagram in which each sync block of one video sector is arranged in the vertical direction. In one video sector shown in FIG. 14, first 2 sync blocks and one sync block just before the vertical parity C2 are exclusively used for the VAUX data. In the portions other than the VAUX data, horizontal parity C1, and vertical parity C2, the video data compressed by using the DCT (discrete cosine transformation) is stored. In details, 135 sync blocks shown in FIG. 14 are used as a storage area of the video data. In the diagram, reference numerals of BUF (buffer) 0 to BUF 26 are written. The BUF indicates one buffering block.

Figure 15:
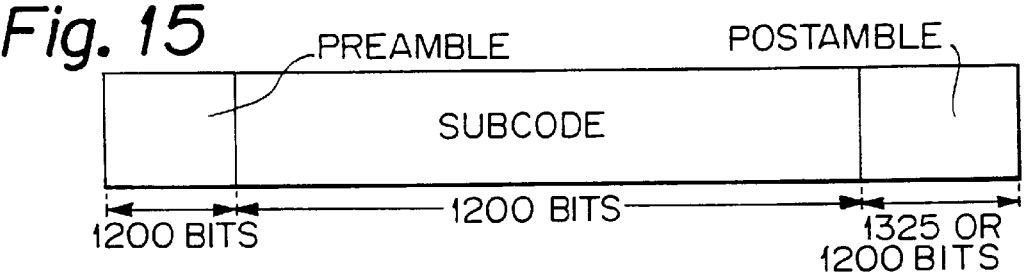
FIG. 15 is a diagram which is used for explanation of a track format.

FIG. 15 is an enlarged diagram of the subcode sector. The subcode sector comprises a preamble of 1,200 bits, a subcode area of 1,200 bits (12 sync blocks), and a postamble of 1,325 bits (or 1,200 bits). The preamble is a run-up for the pull-in of the PLL. The postamble is a guard area.

Figure 16:
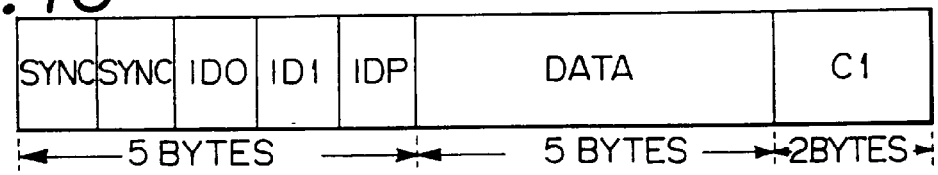
FIG. 16 is a diagram which is used for explanation of a track format.

FIG. 16 shows a structure of the subcode of one sync block. One sync block is constructed by 12 bytes. First five bytes have a structure similar to that of the first five bytes in the audio sync and video sync. Subcode data is recorded in the next five bytes. The horizontal parity C1 is provided to the remaining two bytes.

The subcode sector doesn't have a product code structure like an audio sector or video sector. Namely, different from the audio sector and video sector, the vertical parity C2 is not added. The subcode is mainly used for a high speed search. Since the vertical parity C2 cannot be read out together with the horizontal parity C1 in the limited envelope, the vertical parity C2 is not provided. In order to enable the high speed search of about 200 times to be performed, the sync length is also set to a short length of 12 bytes. Further, the preamble is longer than those of the other sectors. This is because the subcode sector is used in an application like a writing of indices such that it is frequently rewritten or the like and the subcode sector exists in the last portion of the track, an adverse influence is exerted in a form such that all of the deviations in the former half portion of the track are added.

Figure 17:
FIG. 17 is a diagram which is used for explanation of a track format.
Figure 18:
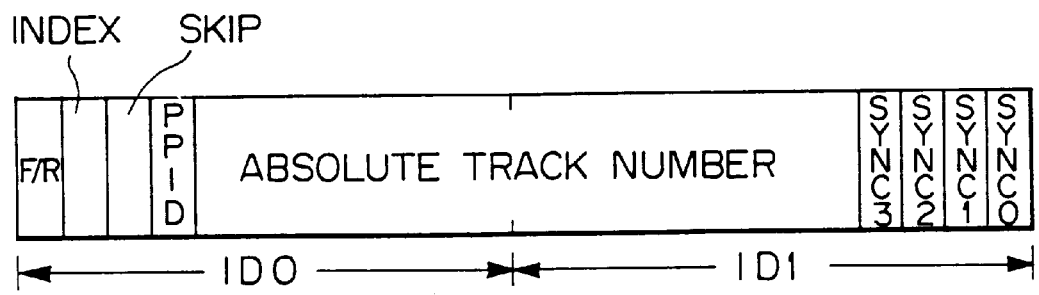
FIG. 18 is a diagram which is used for explanation of a track format.

FIGS. 17 and 18 show structures of ID0 and ID1 in the sync block of the subcode. FIG. 17 shows the structures of the 0th sync block and the 6th sync block. FIG. 18 shows the structures of the sync blocks other than the 0th and 6th sync blocks. The contents of the data sections of the former half portion of five tracks (525 lines/60 Hz) or six tracks (625 lines/50 Hz) of the subcode sector are different from those in the latter half portion.

In FIG. 17, an F/R flag indicative of the discrimination about whether the data relates to the former half portion or the latter half portion is provided for the most significant bit in the variable speed reproducing mode or the high speed searching mode. AP33, AP32 and AP31 as application IDs are provided for the three bits subsequent to the F/R flag. The absolute track numbers are provided for both of the latter four bits of ID0 and the first four bits of ID1. The absolute track numbers are sequentially recorded from the head of the tape. On the basis of the numbers, the MIC, which will be described hereinlater, executes a TOC (Table of Contents) search or the like. Sync numbers 3, 2, 1, and 0 are sequentially allocated to the latter four bits of ID1. They indicate the sync numbers in the track.

As shown in FIG. 18, the F/R flag is provided for the most significant bit. An index ID, a skip ID and a PPID (Photo Picture ID) are sequentially stored to the next three bits in accordance with the order from the upper bit. The index ID is the conventional ID which is used for an index search. The skip ID is the ID for cutting an unnecessary scene such as a commercial scene. The PPID is used for a photo (still image) search. The absolute track numbers are provided for both of the latter four bits of ID0 to the first four bits of ID1. Sync numbers 3, 2, 1, and 0 are sequentially allocated to the lower four bits of ID1. They indicate the sync numbers in the track.

(C) with respect to an application ID

Figure 19:
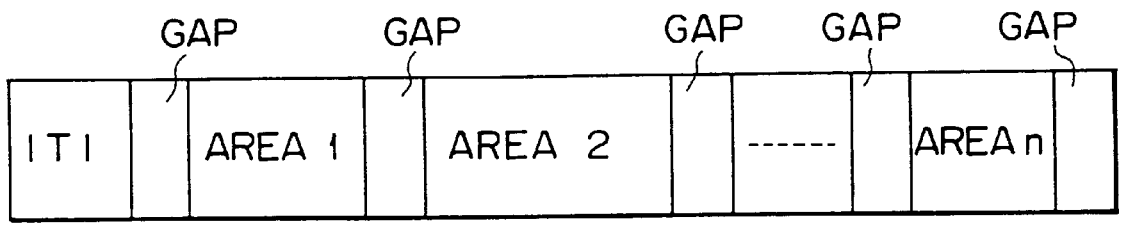
FIG. 19 is a diagram which is used for explanation of APT.
Figure 20:
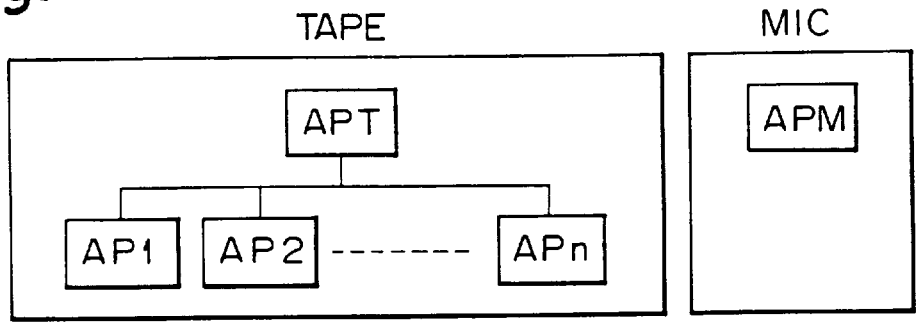
FIG. 20 is a diagram which is used for explanation of the APT.

As mentioned above, one track is divided into several sectors and their positions on the track, a sync block structure, and the like are specified by the APT. The details of the APT (Application of a Track) will now be explained hereinbelow by using FIGS. 19 to 21. FIG. 19 shows a data structure of the track specified by the APT. As will be obviously understood from FIG. 19, data on the track is divided into areas 1 to (n) by the APT values in the ITI area as a data structure. Gaps are provided among the areas. The APT has a hierarchy structure as shown in FIG. 20. That is, the areas on the track are specified by the APT as a base and, further, AP1 to APn are specified for the respective areas. The number of areas on the track is specified by the APT. In FIG. 20, the APT has a double hierarchy structure. It is also possible to increase the number of hierarchies.

Figure 21A:
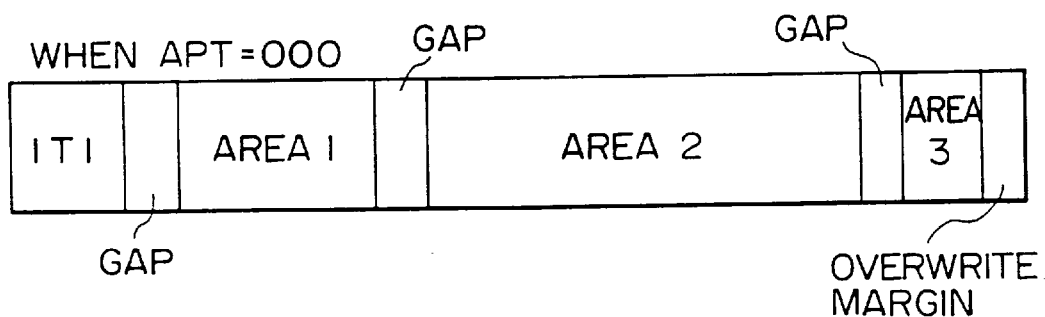
FIGS. 21A and 21B are diagrams which is used for explanation of the APT.

A state in the case where the value of the APT is equal to, for example, "000" is shown in FIG. 21A. In this instance, area 1, area 2, and area 3 are specified on the track. Their positions on the track, a sync block structure, an ECC construction to protect the data from errors, gaps to compensate each area, and an overwrite margin to compensate the overwriting are set. APn to decide the data structure of the area exists in each area. APn simply has the following meanings.

AP1 . . . to set the data structure of the area 1
AP2 . . . to set the data structure of the area 2
AP3 . . . to set the data structure of the area 3
APn of each area, namely, AP1, AP2, and AP3 are defined as follows when each of them is equal to "000".
AP1=000 . . . the data structure of the AAUX data in the audio data of the VCR is used.
AP2=000 . . . the data structure of the VAUX data in the video data of the VCR is used.
AP3=000 . . . the ID data structure of the subcode of the VCR is used.

Figure 21B:
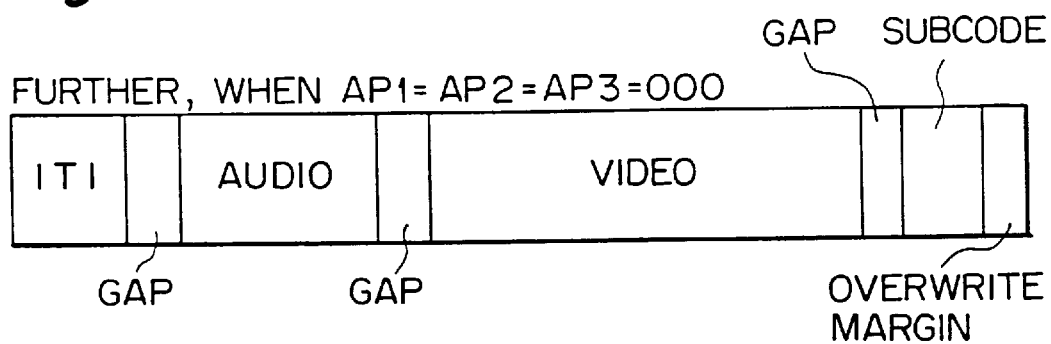

In case of realizing the VCR, therefore, the value of APT is set as follows as shown in FIG. 21B.

AP1=AP2=AP3=000

The cassette can be also used for the recording of data other than the digital video data like a data streamer. The track structure can be also set by using the application ID in this case.

(D) With respect to a pack structure

Figures 22, 23:
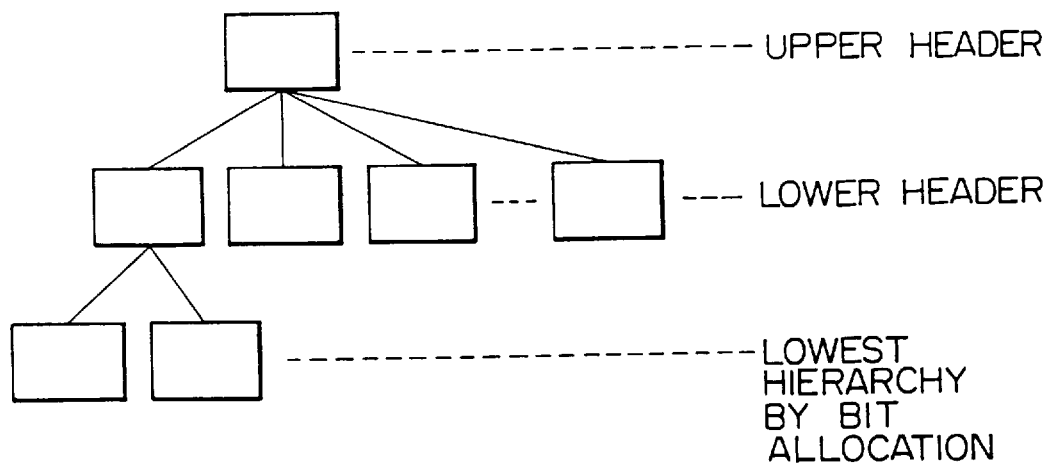
FIG. 22 is a diagram which is used for explanation of a fundamental construction of packs.
FIG. 23 is a diagram which is used for explanation of a hierarchy structure of headers.

As mentioned above, the AAUX data is recorded in five bytes in the former half portion of the audio data in the audio sector. The VAUX data is recorded in two sync blocks in the former half portion and one sync block just before C2 in the video sector. The AAUX data and the VAUX data are constructed on a "pack" unit basis as a fixed length block of five bytes. Further, the subcode and the data of MIC are constructed on the "pack" unit basis. A pack denotes a minimum unit of a data group and one pack is constructed by collecting associated data. The text of the MIC exceptionally has a variable length. A basic construction of the pack is shown in FIG. 22. The first byte (PC0) is a header indicative of the contents of the data. A portion between the second byte (PC1) and the fifth byte (PC4) indicates data.

FIG. 23 shows a hierarchy structure of the header. Eight bits of the header are divided into upper four bits and lower four bits. The upper four bits are set to the upper header and the lower four bits are set to the lower header, thereby forming a double hierarchy structure. The double hierarchy structure can be expanded to a lower hierarchy than the lower header by assigning the bits of the data as necessary. The contents of the pack are clearly systematized by forming a hierarchy structure as mentioned above and can be also easily expanded. The 256 spaces by the upper and lower headers are prepared as a pack header table together with the contents of each pack.

FIG. 24 is a pack header table. As mentioned above, the pack header table consists of 256 spaces. The pack structure corresponding to each header value are shown in FIGS. 25 to 42.

FIG. 25 shows a pack construction for a main area of MIC, which will be explained hereinlater. It is called a "cassette ID". When the header is equal to "all 0", such a pack construction is formed. An ME (MIC ERROR), a multi byte, and a memory type are written in PC1. The multi byte shows the maximum number of words which can be written in a single multi byte writing cycle. Four bytes can be written when the multi byte is equal to "0". Eight bytes can be written when it is equal to "1". 16 bytes can be written when it is equal to "2". When the multi byte is equal to "other number", it is reserved (the reserve value is specified as a multiplier of two bytes). The memory type shows the EEPROM when "00". The memory type indicates the reserve when "others". The memory size of the space 0 is written in the upper four bits of PC2. The memory size of the last bank in the space 1 is written in the lower four bits of PC2. The memory size of the space 0 and the memory size of the last bank of the space 1 are set to: 256 bytes when "0", 512 bytes when "1", 1K bytes when "2", 2K bytes when "3", 4K bytes when "4", 8K bytes when "5", 16K bytes when "6", 32K bytes when "7", 64K bytes when "8", and reserve when "others". The memory bank number of the space 1, namely, the total number of memory banks in the space 1 is written in PC3. A tape thickness is written in PC4. The digit of 1 of the tape thickness is defined in "THICK1". The numeral of the first decimal place of the tape thickness is defined in "THICK1/10".

FIG. 26 shows a pack construction for the main area of the MIC. It is called a "tape length". When the header is equal to "00000001", such a pack construction is formed. The last absolute track number of the tape is written in this pack.

FIG. 27 shows a pack construction for the main area of the subcode. It is called a "time code". When the header is equal to "00010011", such a pack construction is formed. An S2 flag, an S1 flag, the digit of 10 of the frame, and the digit of 1 of the frame are written in PC1. An S3 flag, the digit of 10 of the second, and the digit of 1 of the second are written in PC2. An S4 flag, the digit of 10 of the minute, and the digit of 1 of the minute are written in PC3. An S6 flag, an S5 flag, the digit of 10 of the hour, and the digit of 1 of the hour are written in PC4. The pack includes a time code indicative of the elapsed time in the title.

FIG. 28 shows a pack construction for the main area of the subcode. It is called a "title end". When the header is equal to "00011111", the pack construction is formed. Track number data indicative of the end of the tape position of the title is shown in the pack. A blank flag BF is written in the LSB of PC1. A mode flag SL and a flag RE (Recording proofed events Exist) which is effective only to the MIC are written in PC4. When the mode flag is equal to 0, the reserve for the LP mode is set and when the mode flag is equal to 1, an SP mode is set. When the RE is equal to 0, it indicates that a recording protection event exists and when the RE is equal to 1, it indicates that no recording protection event exists. The RE is set to "1" in the subcode, AAUX data, and VAUX data.

FIG. 29 shows a pack construction for the main area of the subcode. It is called a "chapter start". When the header is equal to "00101011", such a pack construction is formed. The pack indicates the start position of the tape of the chapter. A temporary true flag TT is written in the LSB of PC1. The flag is effective only for the MIC. When the flag is equal to "0", it indicates that no event data exists in the MIC and when the flag is equal to "1", it indicates that event data exists. The event denotes an information unit of the MIC and it indicates, for example, text information, a tag event, a program event, index information, and the like. A text flag and a genre category are written in PC4. The text flag is also effective only for the MIC. When the text flag is equal to "0", it indicates that text information exists and when the text flag is equal to "1", it indicates that no text information exists. The genre category denotes, for example, the genre in the source control pack of the subcode.

FIG. 30 shows a pack construction for the main area of the subcode. It is called a "part number". When the header is equal to "00110010", such a pack construction is formed. The pack includes a chapter number and a part number. The digit of 10 of the chapter number is written to the upper four bits of PC1 and the digit of one of the chapter number is written to the lower four bits of PC1. The digit of 10 of the part number is written to the upper four bits of PC2 and the digit of 1 of the part number is written to the lower four bits of PC2.

FIG. 31 shows a pack construction for the main area of the AAUX data. It is called a "source". When the header is equal to "01010000", such a pack construction is formed. A lock mode flag LF and an audio frame size AF are written in PC1. The lock mode flag LF shows a lock state of an audio sampling frequency annexed to the video data. When the lock mode flag LF is equal to "0", a lock mode is set and when the lock mode flag is equal to "1", an unlock mode is set. The AF size shows the number of audio samples in each frame. An audio channel mode, a pair flag PA, and an audio mode are written in PC2. The audio channel mode shows a 2-channel mode when its value is equal to "0", a 4-channel mode when it is equal to "1", and the reserve in case of others. The pair flag PA indicates an arbitrary channel of the pair channel when it is equal to "0" and an independent channel when it is equal to "1". The audio mode shows the contents of the audio data in each channel.

A 50/60 flag and an audio signal type STYPE are written in PC3. The 50/60 flag and the audio signal type STYPE discriminate the HD system of a field frequency 50 Hz, the HD system of a field frequency 60 Hz, the PAL system, and the NTSC system. An emphasis flag EF, a time constant flag TC of the emphasis, a sampling frequency SMP, and a quantization QU are written in PC4. The emphasis flag EF shows "ON" when it is equal to "0" and "OFF" when "1". The time constant flag TC of the emphasis is set to 50/15 $\mu$sec when it is equal to "1" and the reserve when "0". The sampling, frequency SMP is set to 48 kHz when it is equal to "0", 44.1 kHz when "1", 32 kHz when "2", and the reserve when "others". The quantization QU is set to 16-bit linear when it is equal to "0", and 12-bit nonlinear when "1", and the reserve when "others".

FIG. 32 shows a pack construction for the main area of the AAUX data. It is called a "source control". When the header is equal to "01010001". Such a pack construction is formed. The whole PC1 is set to the reserve. A recording start frame flag, a recording end frame flag, and a recording mode flag are written in PC2. The recording start frame flag indicates a recording start frame when it is equal to "0" and the other frames when "1". The recording end frame flag indicates a recording end frame when it is equal to "0" and the other frames when "1". The recording mode flag shows original when it is equal to "0", a 1-channel insert when "1", a 2-channel insert when "2", and an invalid record when "3". A direction flag DRF and a speed are written in PC3. The direction flag DRF shows the reverse direction when it is equal to "0" and the forward direction when "1", respectively. The speed specifies a reproducing speed of the input audio data. For instance, in case of a normal speed, "0100000" is recorded. A genre category is written in PC4. The genre category shows a genre of the source control pack of the AAUX data.

FIG. 33 shows a pack construction for the main area of the AAUX data. It is called a "time and date record". When the header is equal to "01010010", the pack construction is formed. A summer time flag DS, a 30-minute flag TM, and a time zone are shown in PC1. The summer time flag DS is set to a summer time when it is equal to "0" and a normal time when "1". The 30-minute flag TM shows a time difference from the GMT (Greenwich standard time) on a 30-minute unit basis. The flag TM shows "30 minutes" when it is equal to "0" and "0 minute" when "1". A date is shown in PC2. A week and a month are shown in PC3. A year is shown in PC4.

FIG. 34 shows a pack construction for the main area of the AAUX data. It is called a "time record". The pack has data concerning the recording time when the recording is executed to a tape. When the header is equal to "01010011", such a pack construction is formed. An S2 flag, an S1 flag, and the digit of 10 of the frame, and the digit of 1 of the frame are shown in PC1. An S3 flag, the digit of 10 of the second, and the digit of 1 of the second are shown in PC2. An S4 flag, the digit of 10 of the minute, and the digit of 1 of the minute are shown in PC3. An S6 flag, an S5 flag, the digit of 10 of the hour, and the digit of 1 of the hour are shown in PC4.

FIG. 35 shows a pack construction for the main area of the AAUX data. It is called a "binary group". When the header is equal to "01010100" such a pack construction is formed. Binary groups 2 and 1 are shown in PC1, binary groups 4 and 3 are shown in PC2, binary groups 6 and 5 are shown in PC3, and binary groups 8 and 7 are shown in PC 4, respectively. The pack is used when time codes such as SMPTE, EBU, or the like of the VCR for business affairs are recorded.

FIG. 36 shows a pack construction for the main area of the AAUX data and it is T.B.D.

FIG. 37 shows a pack construction for the main area of the VAUX data. It is called a "source". The "source" is defined when the upper four bits of the header are equal to "0110" and the lower four bits are equal to "0000". The digit of 10 of the television channel and the digit of 1 of the television channel are written in PC1. A black and white flag B/W, a color frame enable flag EN, a color frame ID code CLF, and the digit of 100 of the television channel are written in PC2. A source code as a source number of the input video data, a 50/60 flag, and a video signal type STYPE are written in PC3. The video signal type STYPE discriminates the HD system of the field frequency 50 Hz, the HD system of the field frequency 60 Hz, the PAL system, and the NTSC system together with the 50/60 flag. A tuner category comprising region numbers of Europe and Africa regions, north and south America regions, Asia and Oceania regions, and the like and satellite numbers are shown in PC4.

FIG. 38 shows a pack construction for the main area of the VAUX data. It is called a "source control" and this pack is constructed when the header is set to "01100001". PC1 has been reserved. A recording start flag indicative of the recording start position, a recording mode, a display mode DISP indicative of an aspect ratio or the like of the display are respectively arranged in PC2. A frame and field flag FF, a field ID flag FS, a frame change flag FC, an interlace flag IL, a still image flag ST, a still camera flag SC, and a broadcasting system BCSYS are respectively arranged in PC3. Those flags can be used as information indicating whether the still image has been recorded in the still image recording mode or not and whether the moving image has been recorded in the moving image recording mode or not. A genre category is written in PC4.

FIG. 39 shows a pack construction for the main area of the VAUX data. It is called a "date recording". This pack is constructed when the header is set to "01100010". A summer time flag DS, a 30-minute flag TM, and a time zone are shown in PC1. When the summer time flag DS is equal to 0, the time is set to the summer time. When it is equal to 1, the ordinary time is set. The 30-minute flag TM shows a time difference from the GMT (Greenwich standard time) on a 30-minute unit basis. When the flag TM is equal to 0, 30 minutes are shown. When it is equal to 1, 0 minute is shown. The day is shown in PC2. The week and the month are shown in PC3. The year is shown in PC4.

FIG. 40 shows a pack construction for the main area of the VAUX data. It is called "time recording". This pack is the data regarding the recording time when data is recorded onto the tape. It is constructed when the header is set to "01100011". An S2 flag, an S1 flag, the digit of 10 of the frame, and the digit of 1 of the frame are shown in PC1. An S3 flag, the digit of 10 of the second, and the digit of 1 of the second are shown in PC2. An S4 flag, the digit of 10 of the minute, and the digit of 1 of the minute are shown in PC3. An S6 flag, an S5 flag, the digit of 10 of the hour, and the digit of 1 of the hour are shown in PC4.

FIG. 41 shows a pack construction for the main area of the VAUX data. It is called "binary group". This pack is constructed when the header is set to "01100100". Binary groups 2 and 1 are shown in PC1. Binary groups 4 and 3 are shown in PC2. Binary groups 6 and 5 are shown in PC3. Binary groups 8 and 7 are shown in PC4. This pack is used when time codes such as SMPTE, EBU, and the like of the VCR for business works are recorded.

FIG. 42 shows a pack construction for the main area of the VAUX data. It is called "closed caption". This pack is used to add a title by using a vertical blanking period. This pack is constructed when the header is set to "01100101".

Figure 43:
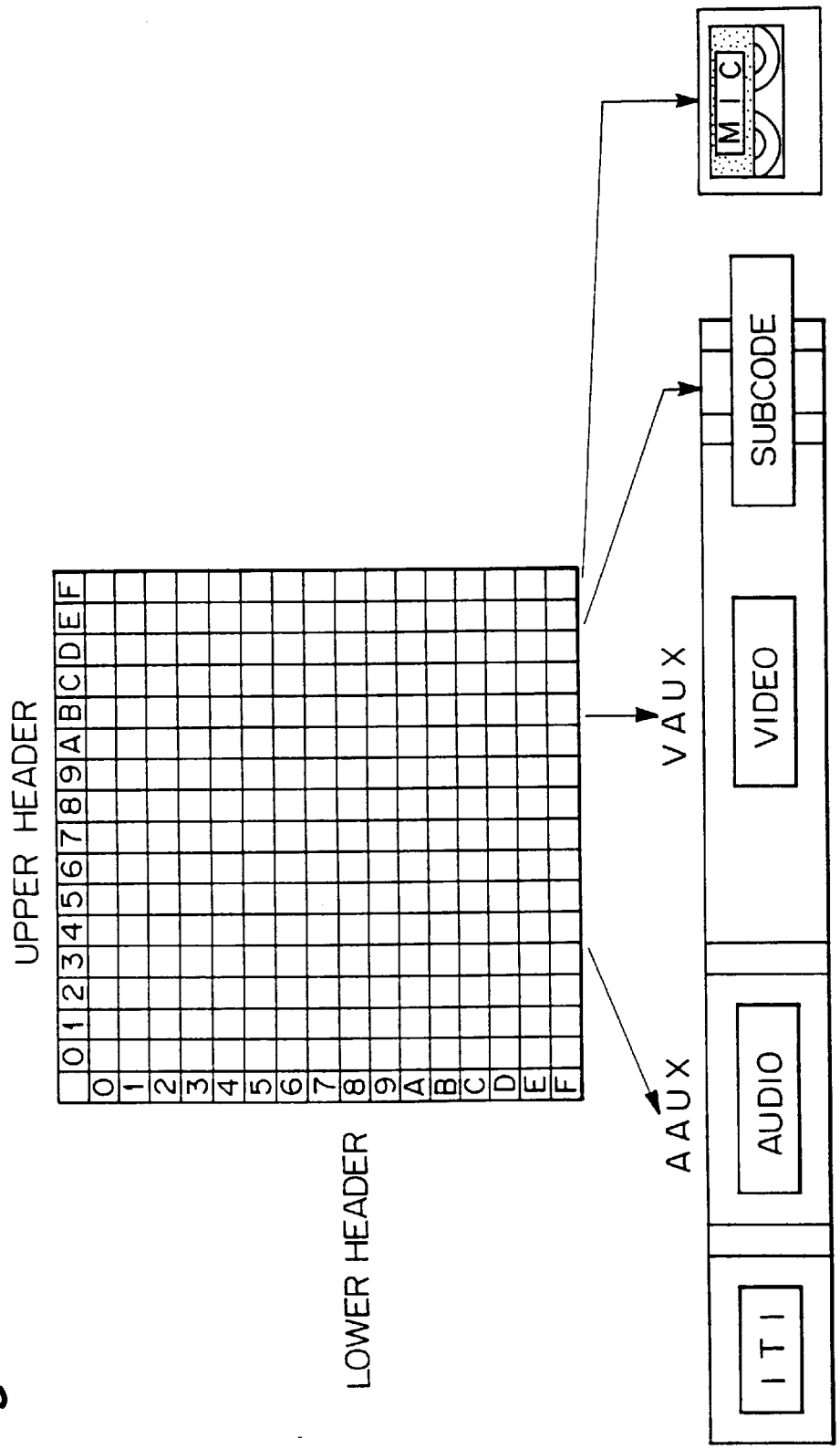
FIG. 43 is a diagram showing the relation between the pack header table and the recording medium.

FIG. 43 shows a recording medium which refers to the pack header table shown in FIG. 24. As shown in FIG. 43, the headers of the areas of the AAUX data, VAUX data, subcode, and MIC are managed by the header table.

(E) With respect to the recording of AAUX data and VAUX data

FIG. 44 is a diagram in which the AAUX data of nine packs is extracted and arranged in the track direction. Reference numerals (1 to 10) written in the lateral direction indicate the track numbers and reference numerals (0 to 8) written in the vertical direction indicate the pack numbers, respectively. In case of a system of 525 lines/60 Hz, one video frame is constructed by 10 tracks. In case of a system of 625 lines/50 Hz, one video frame is constructed by 12 tracks. The audio data and subcode are also recorded and reproduced on the basis of the one video frame.

As shown in FIG. 44, the values (hexadecimal notation) of the pack headers of 50 to 55 are recorded. The packs of 50 to 55 have been recorded to the tracks. That is, the same pack is recorded on ten tracks ten times. This portion is referred to as a main area. Since the essential items such as sampling frequency, the number of quantization bits, and the like which are necessary to reproduce the audio data are stored there, the same pack is recorded a number of times for the purpose of data protection. Due to this, the data in the main area can be reconstructed even for a scratch in the lateral direction, a one-side channel clog, or the like which is likely to occur in the tape transport.

All of the remaining packs other than the packs in the main area are connected in accordance with the order and are used as an optional area. As shown in a, b, c, d, e, f, g, h, . . . in FIG. 44, the packs are connected in the direction shown by arrows while skipping the packs in the main area. In one video frame, 30 packs (525 lines/60 Hz) or 36 packs (625 lines/50 Hz) are prepared for the optional area. The optional area can be also freely selected from the pack header table of FIG. 24 every digital VCR and recorded.

The optional area comprises: a common option (for example, character data); and a maker's option which doesn't have a commonness and whose contents can be uniquely set by each maker. Since the optional area is an option, only one of the common option and the maker's option can exist or both of them can exist or none of them can exist. In the case where no information exists, data is recorded by using a NO INFO pack without information. The application ID and both of the above areas are partitioned by the appearance of a maker code pack. The area after the maker code pack is set to the maker's optional area. When MIC is read out, the next pack header appears every five bytes or every variable length byte (character data) in accordance with the contents of the pack header. However, when FFh in the unused area is read out as a header, since it corresponds to the pack header of the pack without information (NO INFO pack), the controller can detect that there is no information after that.

Constructions of the main area, optional area, common option, and maker's option are common for all of the AAUX data, VAUX data, subcode, and MIC.

Figure 45:
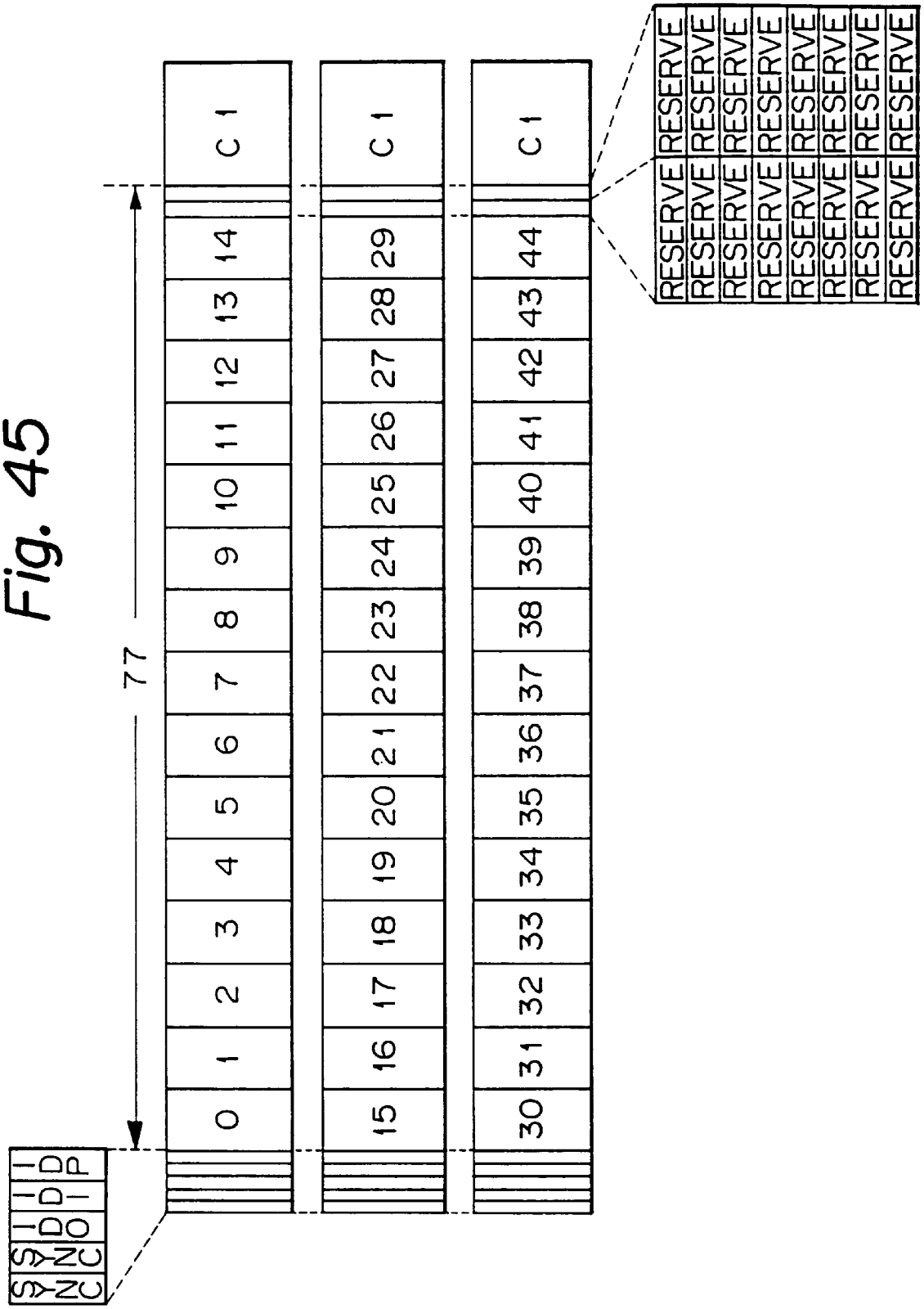
FIG. 45 is a diagram showing SYNC blocks which are used only for the VAUX data.
Figure 46:
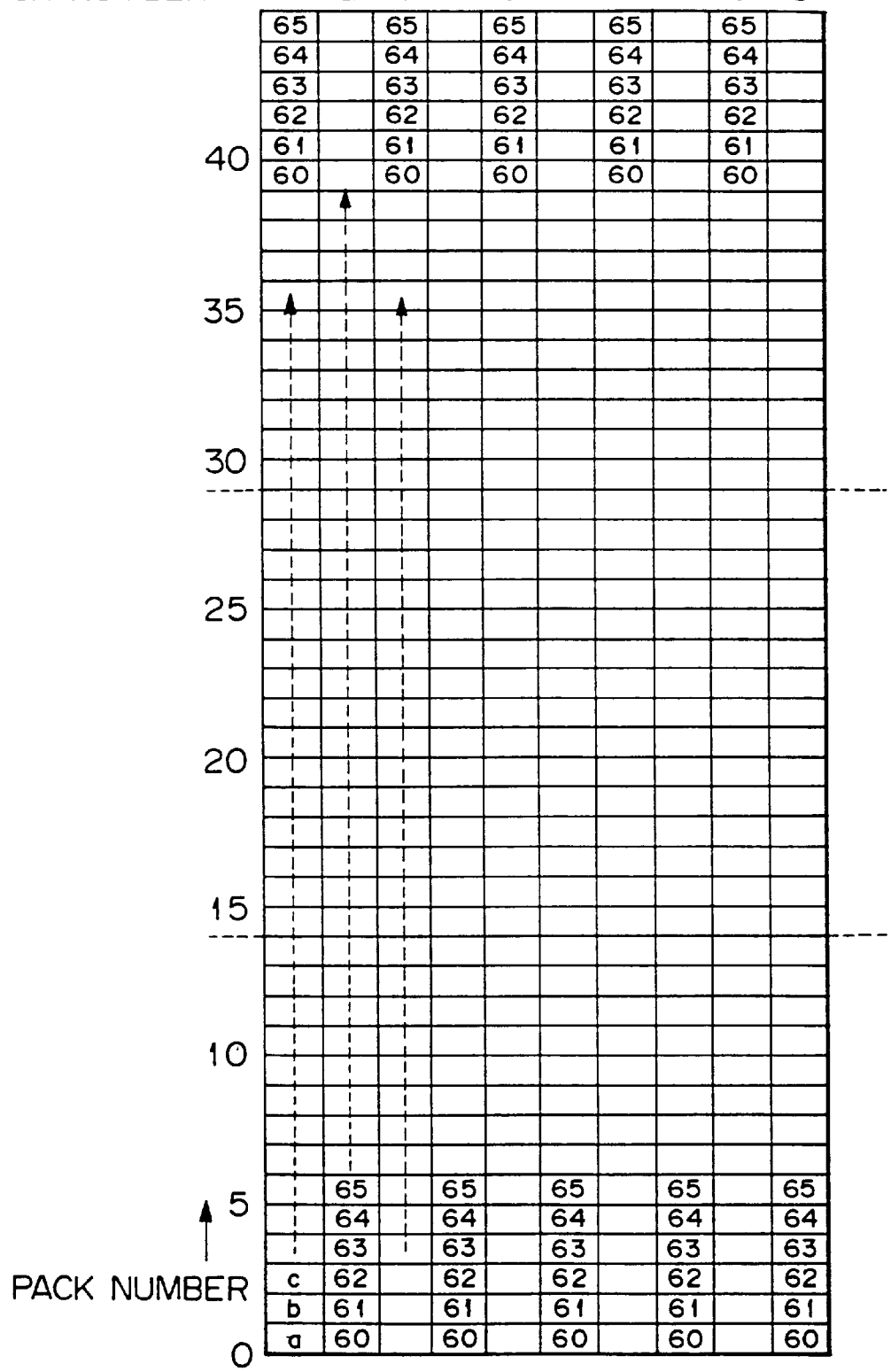
FIG. 46 is a diagram showing a state in which SYNC blocks which are used only for the VAUX data are arranged in the track direction.

FIG. 45 shows a state of sync blocks which are used only for the VAUX data. The upper two sync blocks in FIG. 45 correspond to the upper two sync blocks in FIG. 14. The lowest sync block in FIG. 45 corresponds to one sync block just before C1 in FIG. 14. When 77 bytes are divided on a pack unit basis of five bytes, two bytes remain. However, the remaining two bytes are reserved and are not used in particular. By allocating the numbers in a manner similar to the audio data, 45 packs of 0 to 4 are assured per track. 45 packs are extracted and arranged in the track direction. FIG. 46 shows such a state. Reference numerals of 60 to 65 in FIG. 46 indicate the values (hexadecimal notation) of the pack headers. The portion in which the pack headers are recorded is the main area. The pack headers are recorded on ten tracks ten times in a manner similar to the pack headers of the audio data. The essential items such as television system, picture aspect ratio, and the like which are necessary to reproduce the video data are mainly stored there. Due to this, the data in the main area can be also reconstructed even for a scratch, one-side channel clog, or the like which is likely to occur in the tape transport.

All of the remaining packs other than the packs of the main area are connected in accordance with the order and are used as an optional area. That is, as shown in a, b, c, d, e, f, g, h, . . . , the packs are connected in the direction shown by arrows while skipping the packs in the main area in a manner similar to the AAUX data. In one video frame, 390 packs (525 lines/60 Hz) or 468 packs (625 lines/50 Hz) are prepared for the optional area. The optional area is handled in a manner similar to the AAUX data.

(F) With respect to an ID

IDP in the ID section is a parity to protect ID0 and ID1 and the same system is used in each of the sectors of the audio, video, and subcode. By using the IDP, a reliability for ID is raised.

FIGS. 47A to 47C are diagrams showing data which is recorded into the ID portion. FIG. 47A shows the data regarding a presync, a postsync, and a C2 parity sync. ID1 indicates a location to store the sync number in the track. The numbers 0 to 168 are continuously recorded by the binary notation with respect to the sync from the presync of the audio sector to the post sync of the video sector. The track numbers in one video frame are recorded in the lower four bits of ID0. The numbers are recorded at a ratio of one number per two tracks. Both of them can be distinguished by the azimuth angle of the head. The contents of the upper four bits of ID0 are changed in accordance with the position of the sync.

FIG. 47B shows data regarding the syncs of the audio data and the syncs of the video data. Four bits of the sequence number are input there. This means that 12 kinds of numbers of 0000 to 1011 are allocated every video frame. It is possible to distinguish that the data derived in the variable speed reproducing mode is the data in the same frame or not.

In the presync, postsync, and sync of the C2 parity, the application ID and AP1 and AP2 are stored in the upper three bits of ID0. Therefore, AP1 is recorded eight times. AP2 is recorded 14 times. By writing a number of times and by further distributing the writing positions, the reliability of the application ID can be raised and it can be also protected.

FIG. 48 shows a data section of the subcode. Alphabets of capital letters show the main area. Alphabets of the small letters indicate the optional area. The contents of one pack are shown in one sync block of the subcode. As will be also obviously understood from FIG. 48, the contents of the former half portion differ from those of the latter half portion.

The data such as time code, recording year/month/day, and the like which is necessary for the high speed search is stored in the main area. Since it can be searched on a pack unit basis, such a search is called a pack search.

The optional area differs from the case like the AAUX data and VAUX data where they are all connected and used. This is because since the protection of the parity is weak, the contents are distributed to the upper and lower portions every track and the same data is recorded a number of times in the track of the former half and latter half portions, thereby protecting. Therefore, the data of six packs in each of the former and latter half portions can be used as an optional area. The above construction is common to both of the 525 lines/60 Hz system and the 625 lines/50 Hz system.

(G) With respect to a structure of the cassette with a memory

Figure 49A:
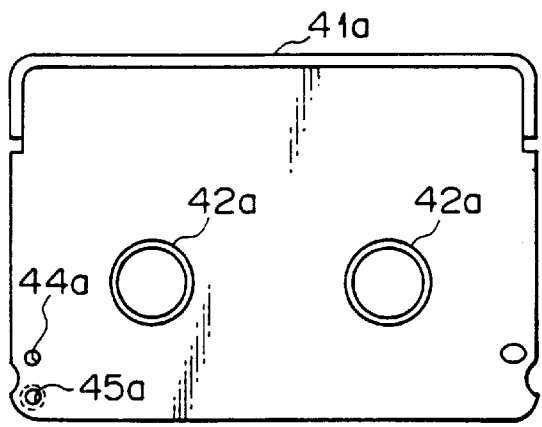
FIGS. 49A to 49D are external views of a cassette with a memory.
Figure 49B:
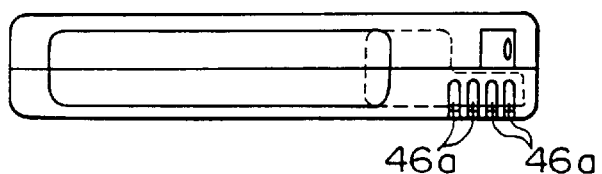
Figure 49C:
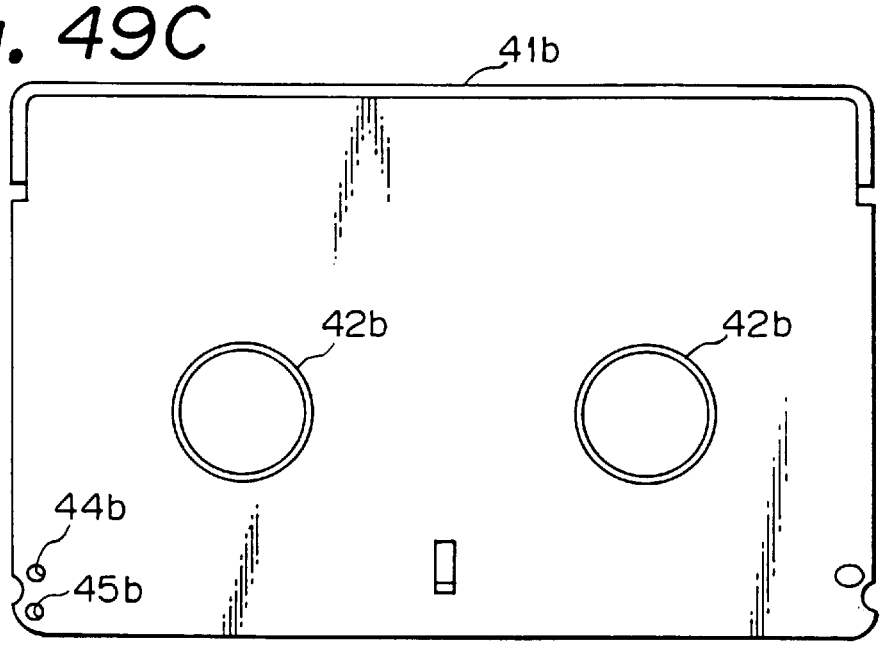
Figure 49D:
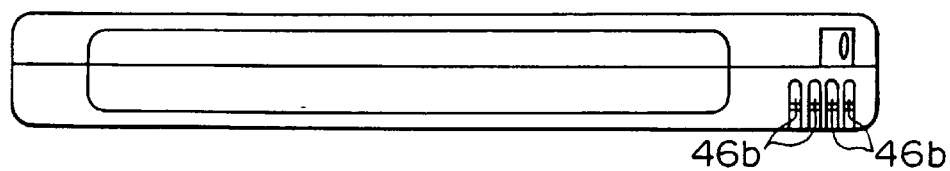

In the digital VCR to which the invention is applied, a cassette with a memory can be used. FIGS. 49A to 49D show external views of the cassette with a memory. There are cassettes with a memory of two kinds of sizes. FIG. 49A is a front view of a small cassette 41a with a memory. FIG. 49B is a side elevational view of the small cassette 41a with a memory. FIG. 49C is a front view of a large cassette 41b with a memory. FIG. 49D is a side elevational view of the large cassette 41b with a memory. The small cassette 41a with a memory is suitable for use in a camera integrated type VCR or the like. Fundamental structures of the cassettes 41a and 41b are almost similar.

Reel axis inserting ports 42a and 42b are provided in the cassettes 41a and 41b. A reel is arranged at the reel axis inserting port 42. A magnetic tape is wrapped around the reel. When the cassettes 41a and 41b are loaded into the VCR, tape protecting shutters 43a and 43b provided on one surface in the longitudinal direction are opened, so that the tapes are pulled out from the cassettes 41a and 41b. Reference holes 44a and 44b and erroneous erasure preventing holes 45a and 45b are provided at one corner of the cassettes 41a and 41b, respectively. A plurality of terminals 46a and 46b are provided on the side surfaces of the cassettes 41a and 41b. Confronting holes (openings for confronting the terminals with the outside) are formed in correspondence to the terminals 46a and 46b. The terminals are connected to memories (MIC) in the cassettes 41a and 41b. MIC is constructed by an EEPROM and a flash memory and inherent information of the cassette is recorded in the MIC.

Terminals corresponding to the terminals 46a and 46b are also provided on the VCR side. The inherent information of the cassette (tape length, tape remaining amount, the number of using times, whether the tape is a rental tape or not, TOC, etc.) is read out by the VCR through those terminals. The information is displayed or the operation is controlled. In order to enable the inherent information of the cassette to be read out even by a VCR which doesn't cope with the cassette with a memory, by short-circuiting the contacts between the terminals 46a and 46b and the terminals provided for the VCR or by opening or connecting the terminals through resistors, its state can be judged on the VCR side and the inherent information of the MIC can be read out.

(H) With respect to a data structure of an MIC

Figure 50:
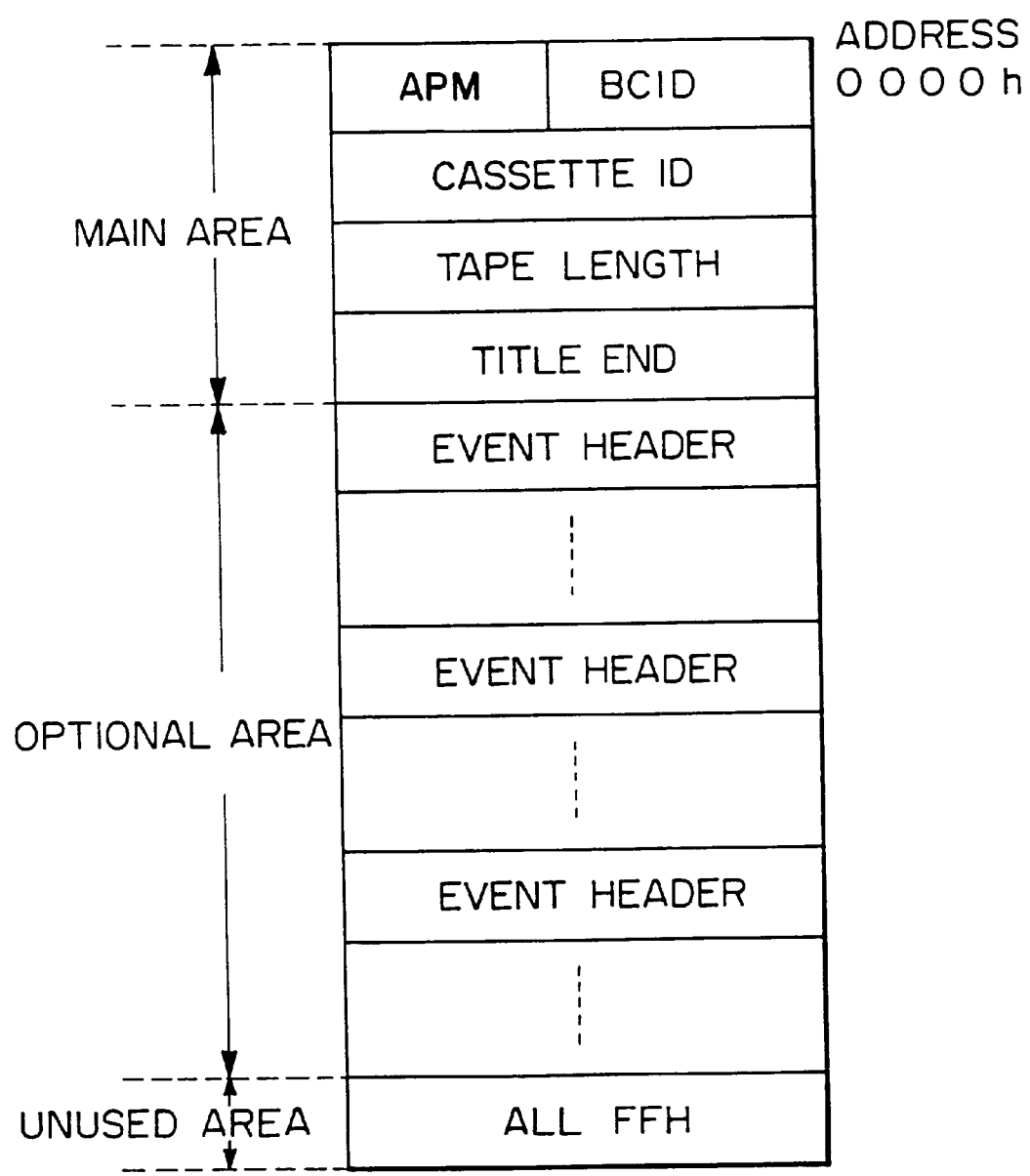
FIG. 50 is a diagram showing a data construction of MIC.

FIG. 50 shows a data construction of the MIC. The data structure of the MIC comprises a main area, an optional area, and an unused area. A data area in the MIC is divided into the main area and the optional area and the whole region except one byte of the head and FFh (unused area) is described by a pack structure. Only text data is stored by a pack structure of a variable length. The other data is stored by a pack structure of the fixed length of five bytes as those of the VAUX data, AAUX data, and subcode.

In the head address 0 of the main area of the MIC, there are three bits of APM (Application ID of MIC) as an application ID of the MIC and four bits of BCID (Basic Cassette ID). APM specifies the data structure of the MIC. When three bits of APM are equal to, for example, "111", this means that the tape is a new cassette tape. In case of "000", this means that the tape is a recorded cassette tape. BCID denotes a basic cassette ID. BCID has substantially the same contents as those of an ID board (IDB) for ID recognition (tape thickness, tape kind, tape grade) in a cassette without a memory. IDB is used for allowing the MIC reading terminals to have the same functions as those of a recognition hole of a cassette of the conventional 8 mm VCR.

After address 0000h, three packs of a cassette ID, a tape length, and a title end are sequentially recorded. More specific value of the tape thickness and the memory information about the MIC exist in the cassette ID pack. As for the tape length pack, the maker of the tape stores the tape length of the cassette by the number of tracks. A remaining amount of the magnetic tape can be calculated from the tape length pack and the next title end pack (recording final position information; it is recorded by the absolute track number). The recording final position information provide a convenient use efficiency in the case where a halfway portion is reproduced and stopped by the camera integrated type VCR and, after that, the tape position is returned to the original final recording position or in case of a timer reservation.

The optional area is constructed by an optional event. Although the main area is a fixed area of 16 bytes of address 0 to 15, the optional area is set to a variable length area after address 16. A length of area differs in dependence on the contents of the optional area. When an event (which will be explained hereinafter) is erased, the remaining events are densely preserved in the direction of address 16. After completion of the densely storing operation, FFh is written into all of the unnecessary data, thereby forming the unused area. The optional area is a selective area. The TOC, tag event information indicative of the point on the tape, character information such as a title or the like regarding the program, and the like are stored into the optional area.

An event is an individual information unit (for example, information about one program recorded) which was recorded in the MIC. The event comprises a main event and an optional event. The main event is recorded into the main area and comprises: the application ID and the recording final position information which are recorded by the VCR; and tape information (tape length, tape thickness, tape kind, and the like) which is recorded by the maker. The optional event is recorded in the optional area and comprises TOC information, index information, character information, reproduction control information, timer recording information, and the like.

Figure 51:
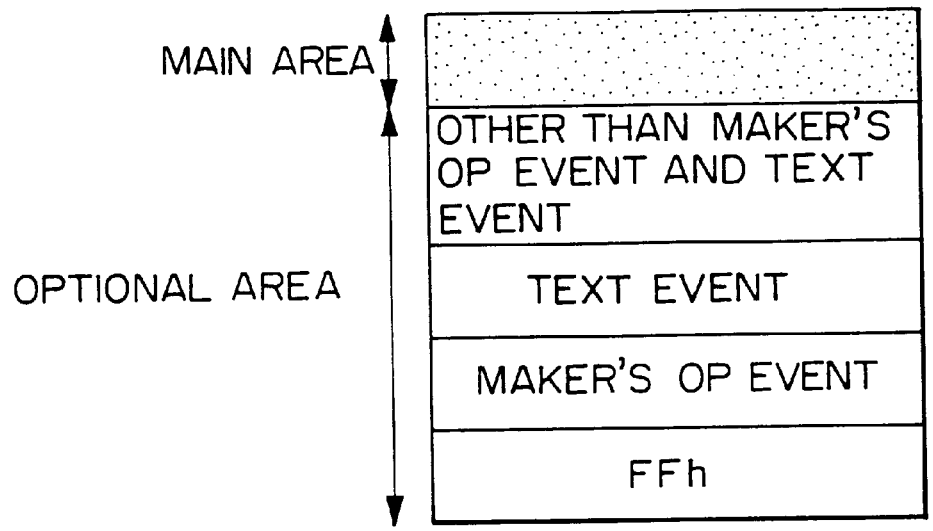
FIG. 51 is a diagram showing optional events which are recorded in an optional area of MIC.

FIG. 51 shows optional events which are recorded in the optional area of the MIC. The optional events are started from the event header and are finished before the next event header or the pack header without information. As mentioned above, the contents of the optional events are not fixed by the simple definition. The contents can be freely selected to a certain extent every setting.

The events other than the maker's optional event (event which is recorded by the maker) and the text event (character information corresponding to the event) are recorded in the first portion of the optional area. After that, the text event and the maker's event are recorded. In the case where the maker's optional event exists, the text event is located just before it. When the maker's optional event doesn't exist, the text event is located to the last of all of the other events. Due to this, data processes in the memory in case of adding or deleting the character information to/from the events can be easily executed.

The text event includes a text flag indicating whether the character information exists in the TOC information or not. When the text flag is equal to, for example, "0", it indicates that the text event exists. When the text flag is equal to "0", it indicates that no text event exists. All of the optional events other than the text event and the maker's optional event can be mixedly recorded in the optional area. Further, the TOC information is sequentially recorded in accordance with the generating order. The recording order can be made different from the order on the magnetic tape. After completion of the recording, the timer recording information is set to the TOC information by changing an event header (which will be explained hereinlater).

Figure 52:
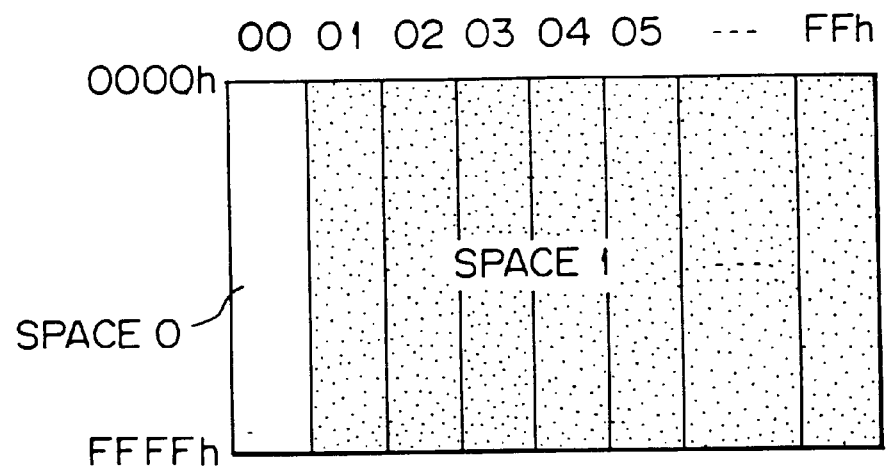
FIG. 52 is a memory map of MIC.

FIG. 52 shows a memory map of the MIC. A memory space of the MIC comprises a space 0 and a space 1. The space 0 is constructed by an EEPROM and the fundamental function like a TOC is recorded therein. The space 1 is constructed by a memory (for instance, flash memory) of a large capacity and data of a large capacity such as video data is recorded therein. The above memory has a bank structure as a whole. In order to raise a high speed accessing performance, for example, the memory of the space 1 has a construction such as a batch recording and reproduction of 16 kbytes.

Each bank has a capacity of 64 kbytes and up to 256 banks can be constructed. Therefore, the maximum size of memory space is equal to 128 Mbits. The memory which is used in the space 0 can be constructed by, for example, the EEPROM as mentioned above. The memory which is used in the space 1 is not limited to the flash memory but another memory can be also used so long as it has a large capacity. By using such a construction, there is no need to provide a buffer memory for the VCR.

Reference numerals written in the lateral direction show addresses of the banks. Reference numerals written in the vertical direction indicate memory addresses in the banks. A data structure of the space 0 comprises a main area and an optional area. The main area is constructed by 16 bytes of addresses 0 to 15. The remaining area is set to an optional area. The optional events include a tag event, a zone event, a title event, and the like, which will be explained hereinlater. The continuous use of the MIC is started from memory address 0. Two bytes of addresses 0 and 1 have the fundamental information (tape length, tape grade, etc.) of the MIC. The contents of address 0 show the application ID and BCID. The contents of address 1 show the kind of application (information to discriminate whether the cassette is used for the VCR or for another application).

(I) With respect to a discrimination of cassette

In addition to the foregoing cassette with a memory, there is a cassette without a memory. Such a cassette is provided with IDB for recognition mentioned above. There is a VCR which doesn't correspond to the cassette with a memory but can correspond to only the cassette without a memory. When the cassette with a memory is loaded into the VCR which is used only for the cassette without a memory as mentioned above, information (tape length, tape thickness, kind of tape, tape grade, etc.) about the cassette itself must be supported for any type of apparatus from a viewpoint of the problem of compatibility. Therefore, even in the VCR only for the cassette without a memory, at least only the BCID information of the cassette with a memory must be obtained.

Figure 53A:
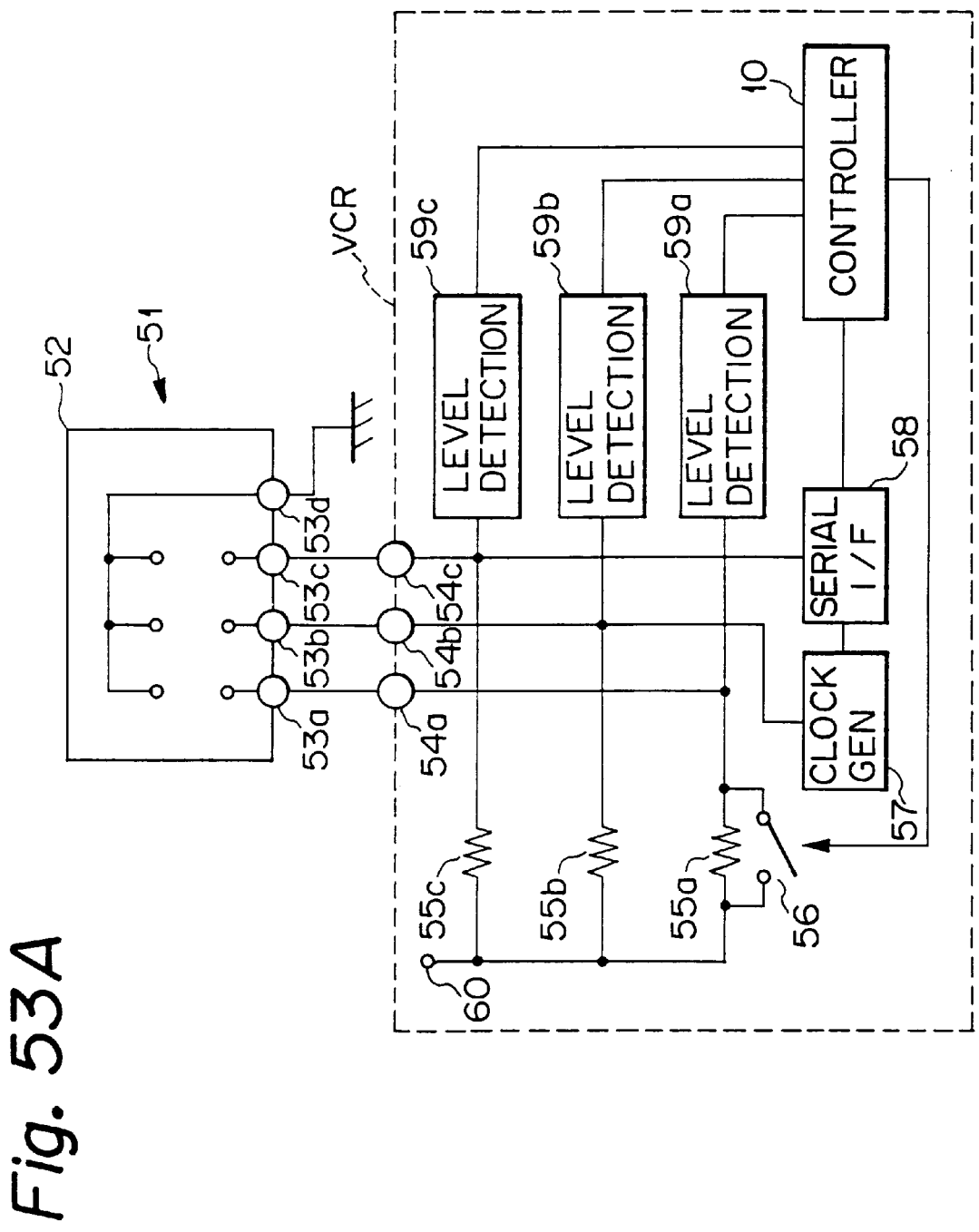
FIGS. 53A and 53B are circuit diagrams for judging a tape grade.
Figure 53B:
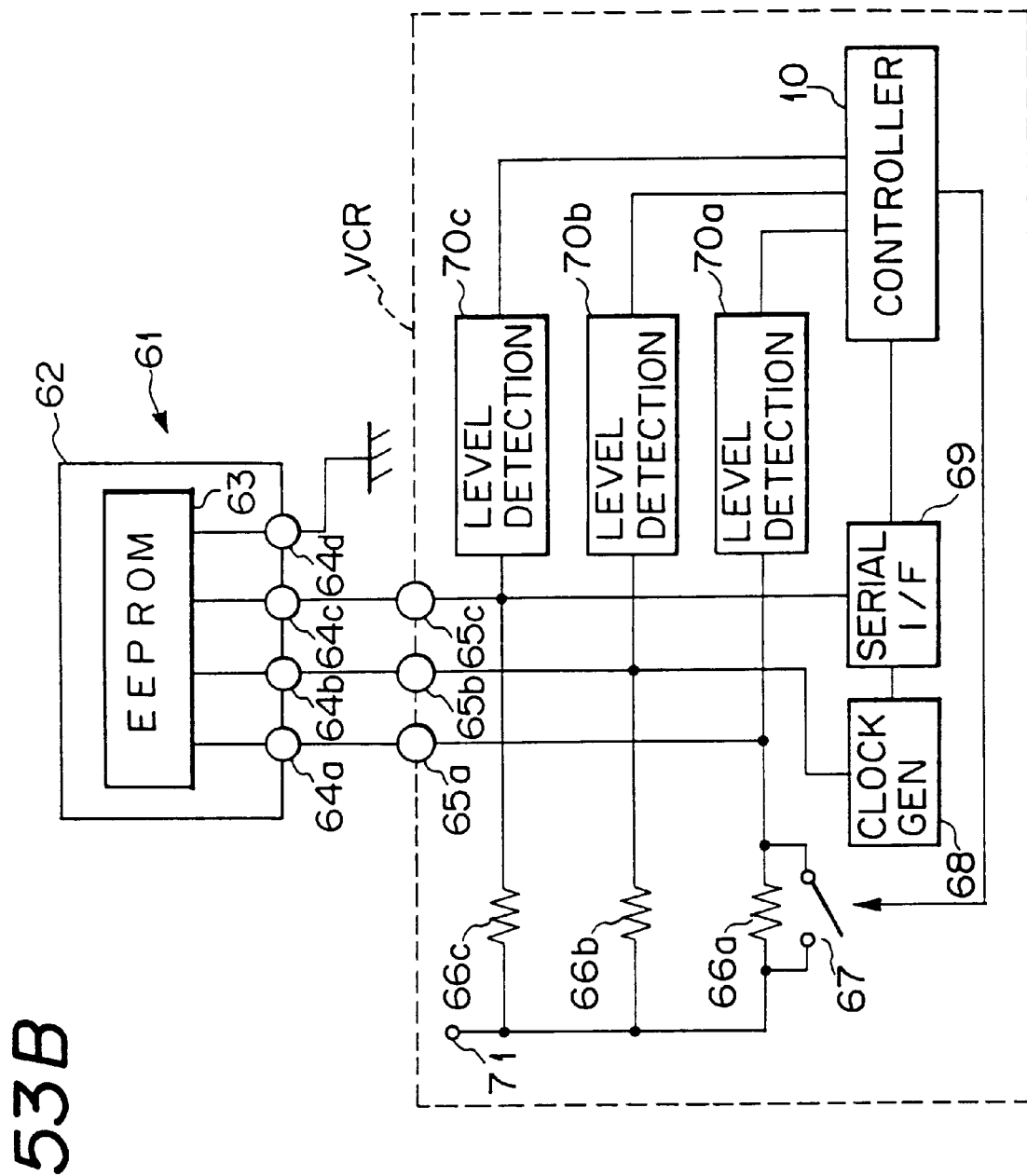

For this purpose, a circuit to discriminate the tape grade as shown in FIGS. 53A and 53B is provided. FIG. 53A shows the case where a cassette without a memory was loaded. An IDB 52 having, for example, four terminals 53a, 53b, 53c, and 53d are provided for a cassette 51 without a memory. The IDB 52 is connected to the VCR. Namely, the terminal 53a is connected to a terminal 54a, the terminal 53b is connected to a terminal 54b, and the terminal 53c is connected to a terminal 54c, respectively. The terminal 53d is connected to the ground.

The terminal 54a is connected to a power source 60 through a resistor 55a and is also connected to a level detecting section 59a. A switch 56 whose both ends are used as terminals is provided for the resistor 55a. The terminal 54b is connected to a clock generator 57 and a level detecting section 59b and is also connected to the power source 60 through a resistor 55b. The terminal 54c is connected to a serial interface 58 and a level detecting section 59c and is also connected to the power source 60 through a resistor 55c. The clock generator 57 is connected to the controller 10 through the serial interface 58. The level detecting sections 59a, 59b, and 59c are connected to the controller 10. A switch control signal is supplied from the controller 10 to the switch 56.

When the cassette 51 without a memory is loaded, its voltage is detected. That is, when a proper resistor is connected between the terminals provided in the IDB 52 or a circuit between the terminals is short-circuited or opened, the voltage detection is executed. The voltage detection value is expressed by, for example, a binary value and is set to a value other than all 1. Consequently, the loaded cassette is determined to be the cassette without a memory. Discrimination steps of the terminal voltage value of the IDB 52 are allocated as follows.

3.0 V~2.5 V: for digital VCR for business affairs
2.5 V~1.5 V: for digital VCR for industrial affairs
1.5 V~0.5 V: reserve
0.5 V~0 V: for data streamer As will be also understood from the above allocation, in the VCR for industrial affairs, the recording can be performed so long as the detection voltage is merely equal to or higher than the voltage (1.5 V) of ½ of the highest voltage. Therefore, the VCR for industrial affairs can always record to the tape for industrial affairs and the tape for business affairs as a selected article of the tapes for industrial affairs.

Discrimination steps of lower two bits of the BCID are allocated as follows.

11: for digital VCR for business affairs
10: for digital VCR for industrial affairs
01: reserve
00: for data streamer In case of the digital VCR for business affairs, it is also possible to further finely divide the voltage value and to discriminate the grade.

FIG. 53B shows the case where a cassette with a memory has been loaded. An MIC 62 is provided for a cassette 61 with a memory. The EEPROM 63 is provided in the MIC 62. Further, for example, four terminals 64a, 64b, 64c, and 64d are provided for the EEPROM 63. The MIC 62 is connected to the VCR. Namely, the terminal 64a is connected to a terminal 65a, the terminal 64b is connected to a terminal 65b, and the terminal 64c is connected to a terminal 65c, respectively. The terminal 64d is connected to the ground.

The terminal 65a is connected to a power source 71 through a resistor 66a and is also connected to a level detecting section 70a. A switch 67 whose both ends are used as terminals is provided for the resistor 66a. The terminal 65b is connected to a clock generator 68 and a level detecting section 70b and is also connected to the power source 71 through a resistor 66b. The terminal 65c is connected to a serial interface 69 and a level detecting section 70c and is also connected to the power source 71 through a resistor 66c. The clock generator 68 is connected to the controller 10 through the serial interface 69. The level detecting sections 70a, 70b, and 70c are connected to the controller 10. A switch control signal is supplied from the controller 10 to the switch 67.

When the MIC 62 is loaded, the voltage is detected. The voltage values which are supplied from the level detecting sections 70a, 70b, and 70c to the controller 10 are all set to 1. Due to this, a control signal is supplied from the controller 10 to the switch 67 and the switch 67 is turned on. A serial communication is started between the EEPROM 63 and the controller 10. An ACK signal is supplied from the EEPROM 63 to the controller 10.

By transmitting and receiving the information as mentioned above, information indicating whether the loaded cassette is a rental soft cassette tape or a cassette which was recorded by the user by himself or the like can be also known. In the case where the unrecorded cassette is loaded, information of its recordable time, tape remaining amount, and the like can be also known.

Figure 54:
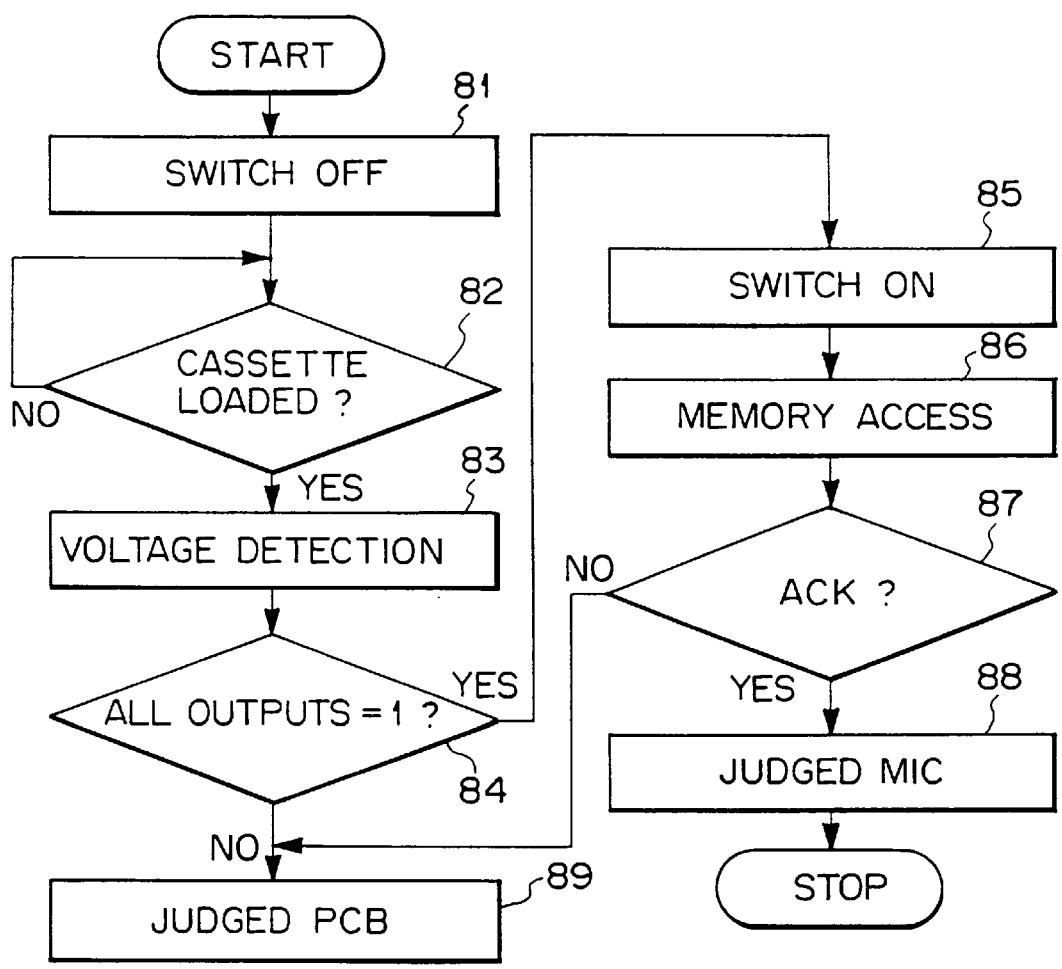
FIG. 54 is a flowchart for a detecting algorithm in the case where the cassette with a memory has been loaded.

FIG. 54 is a flowchart for a detection algorithm in the case where a cassette with a memory has been loaded. The switch is turned off in step 81. A check is made in step 82 to see if the cassette has been loaded or not. When the loading is detected, the voltage at each terminal is detected (step 83). In step 84, when all of the outputs from the terminals are equal to "1", the processing routine advances to step 85. The switch is turned on in step 85. The EEPROM 63 is accessed by the controller 10 (step 86). In step 87, when the ACK signal is generated from the EEPROM 63, the controller 10 judges that the loaded cassette is the cassette with a memory (step 88). The processing routine is finished.

In step 84, when all of the outputs from the terminals are not equal to "1" (in the case where "0" is generated from an arbitrary one terminal), the controller judges that the loaded cassette is the cassette without a memory (step 89). The processing routine is finished. When the ACK signal is not generated in step 87, the process in step 89 is executed.

FIG. 55 shows the contents [space 0 (EEPROM)] of the MIC for VCR in a new cassette tape. As mentioned above, "111" is recorded in APM by the maker in the new cassette tape. The BCID, cassette ID pack, tape length pack, and title end pack are recorded by the maker. The cassette ID pack is recorded in address 1, the tape length pack is recorded in address 6, and the title end pack is recorded in address 11, respectively. When the cassette tape is loaded into the VCR, the information in addresses 1 and 6 is read out by a microcomputer. Since the information in those addresses is fixed, by reading the information from those locations, it is possible to discriminate whether a communication line is good or not. The above constructions can be developed as they are in not only the digital VTR for consumer but also the analog VTR such as an 8 mm video tape recorder or the like while including the pack structure.

FIG. 56 shows the contents [space 0 (EEPROM)] of the MIC other than the cassettes for VCR in the new cassette tape. In FIG. 56, the information in address 1 is not equal to "00h". Therefore, it is judged that the loaded cassette tape is not the tape for VCR.

Figure 57:
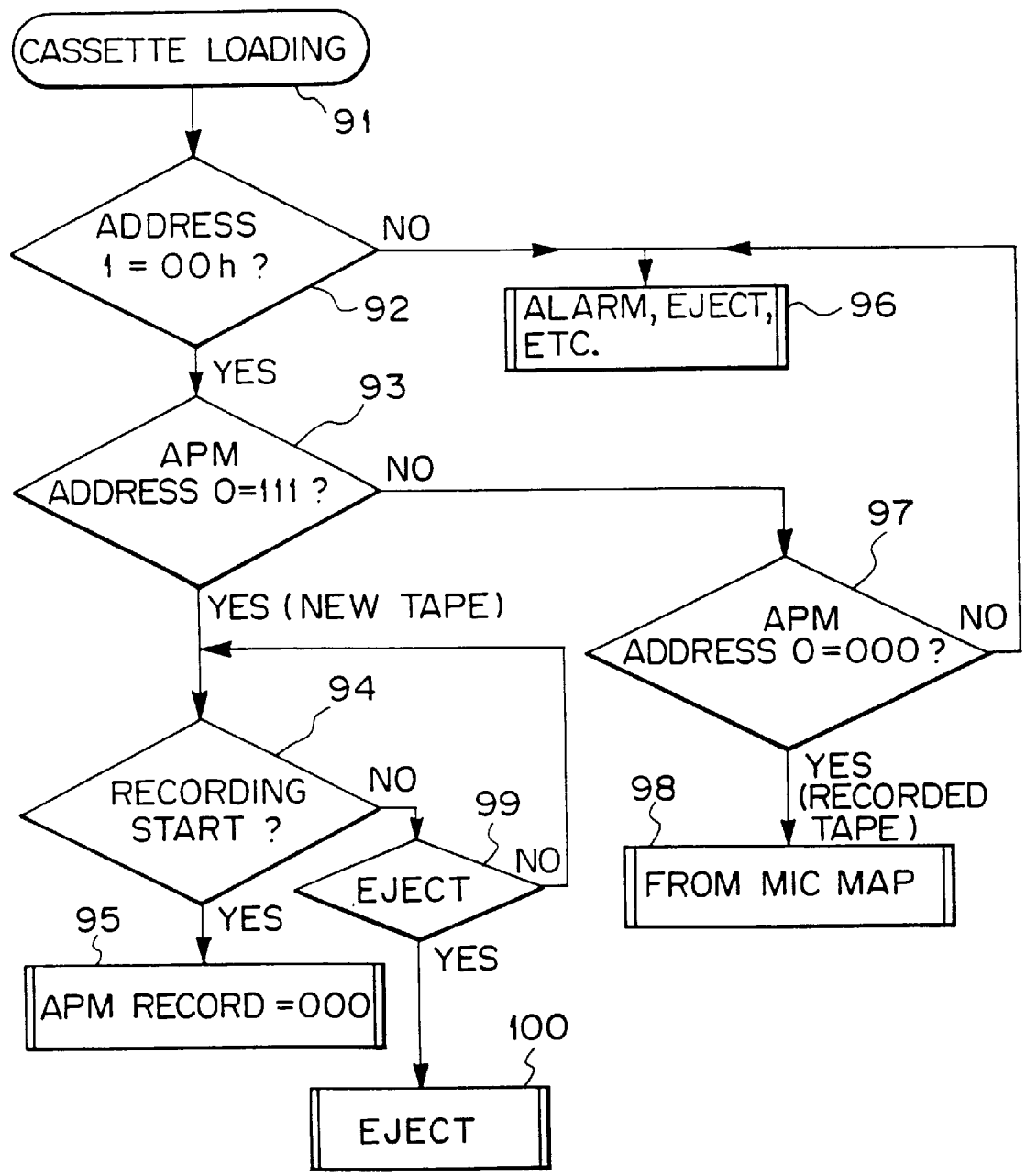
FIG. 57 is a flowchart regarding the recognition and recording of APM of a digital VCR for industrial affairs.

FIG. 57 is a flowchart regarding the recognition and recording of APM of the digital VCR for industrial affairs. When a cassette tape is loaded (step 91), a check is made to see if address 1 of MIC is equal to "00h" or not (step 92). When address 1 is equal to "00h", the cassette tape is determined to be the cassette tape for the VCR standard. A check is made in step 93 to see if APM in address 0 is equal to "111" or not. When APM=111, a check is made to see if the recording is started or not (step 94). In step 95, "000" is recorded as APM.

In step 92, when it is judged that address 1 of MIC is not equal to "00h", the process such as alarming, ejection, or the like is executed in step 96.

When it is judged in step 93 that APM in address 0 is not equal to "111", a check is made in step 97 to see if APM in address 0 is equal to "000" or not. When APM=000, an MIC map is formed in step 98.

In step 94, when it is judged that the recording is not started, a check is made in step 99 to see if the cassette tape is ejected or not. The ejecting process is performed in step 100. When the ejection is not demanded, the processing routine is returned to step 94.

(J) With respect to events

The tag event and zone event included in the optional events will now be described hereinbelow. The tag event indicates the position on the tape and comprises an index, an index skip, a photo (still image), and a reserve. The zone event indicates the area on the tape and comprises a zone skip, a repetitive reproduction, a slow reproduction, a special effect reproduction, and a reserve. A tape (A in each diagram) which is controlled on the basis of the information recorded in the optional events and the information (B in each diagram) recorded in the optional events are shown in FIGS. 58 to 64.

Figure 58B:
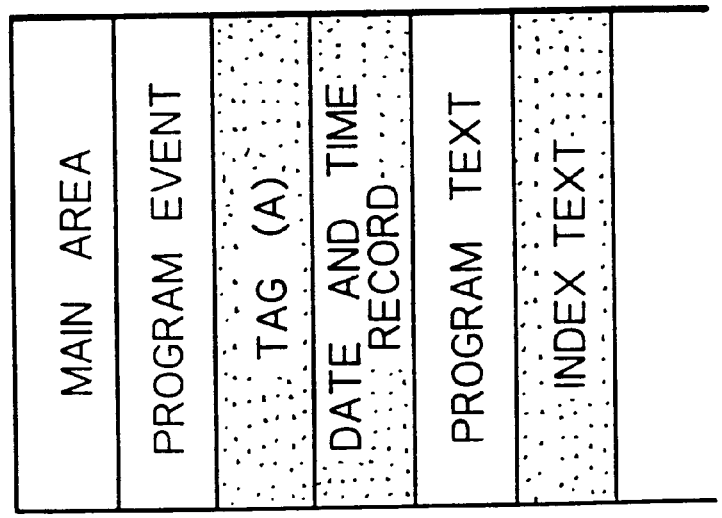
FIGS. 58A and 58B are diagrams which is used for explanation of a tag event.
Figure 58A:
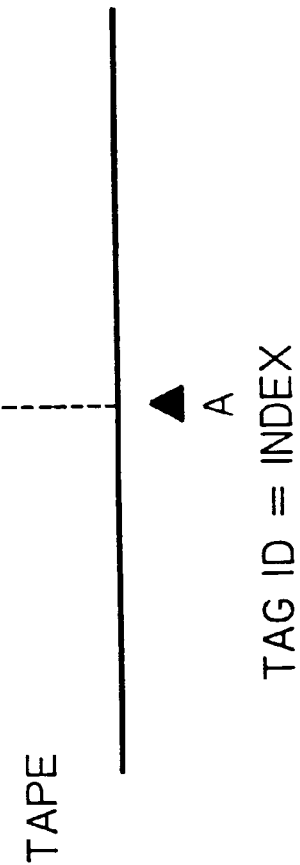

The tag event will now be described hereinbelow with reference to FIGS. 58A to 60B. FIGS. 58A and 58B show cases of recording an index as a tag ID. When an index is recorded in the tag (A) of the optional event, the index A is written at the position on the tape shown by a dotted line.

Figure 59B:
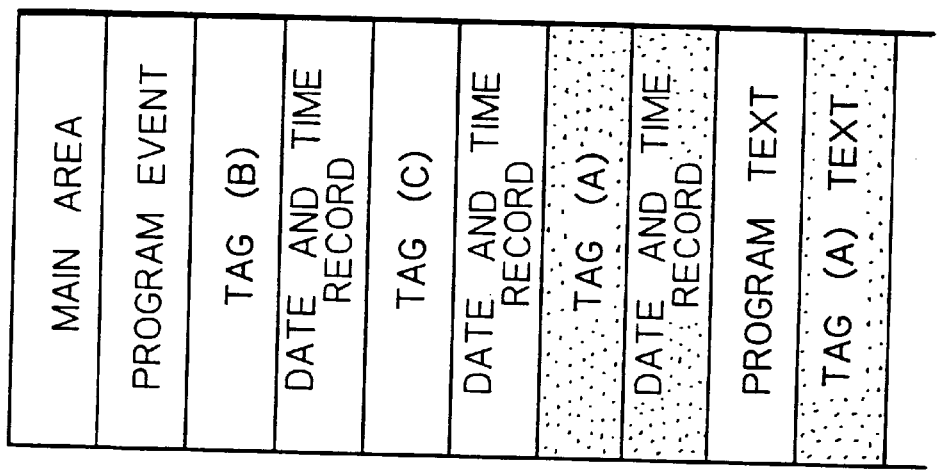
FIGS. 59A and 59B are diagrams which is used for explanation of the tag event.
Figure 59A:
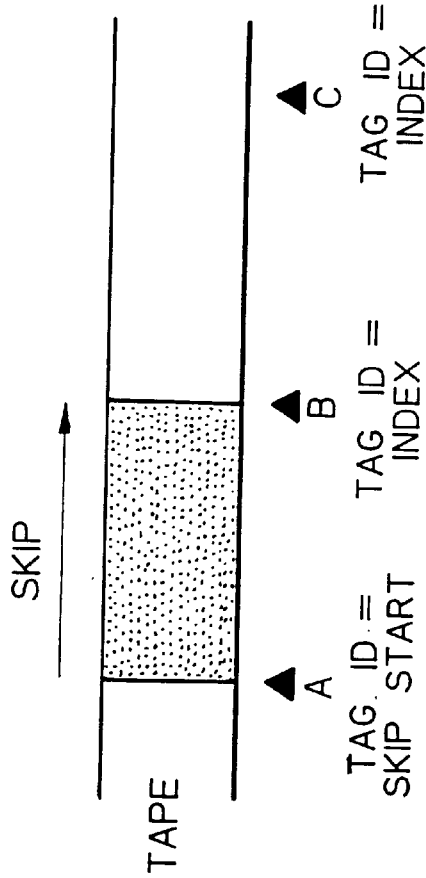

FIGS. 59A and 59B show cases where a skip start and an index are recorded in the optional events and the index skip is performed. An index is recorded into the tag (B) as a tag ID, an index is recorded into the tag (C) as a tag ID, and a skip start is recorded into the tag (A) as a tag ID, so that it is possible to skip from the tag (A) to the tag (B). The above processes can be realized without MIC.

Figure 60B:
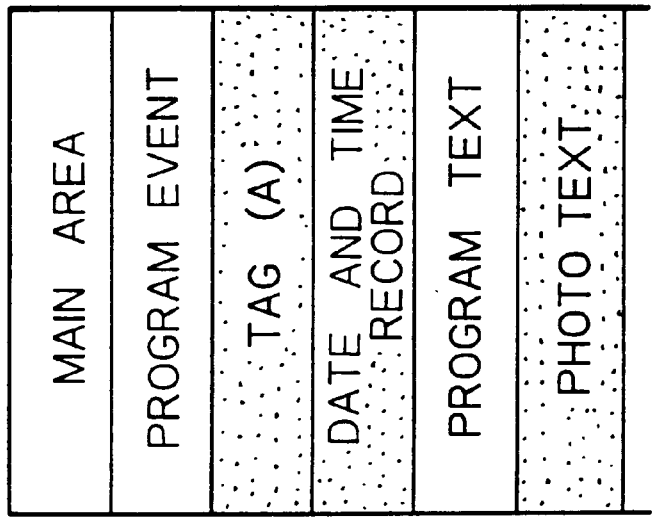
FIGS. 60A and 60B are diagrams which is used for explanation of the tag event.
Figure 60A:
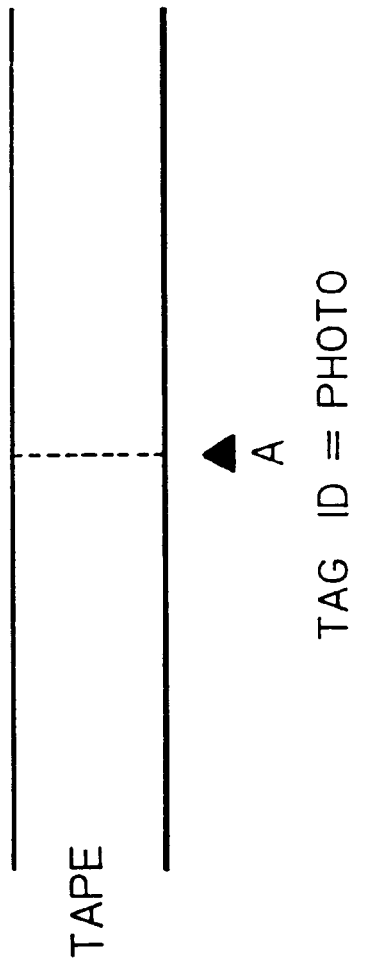

FIGS. 60A and 60B show cases of recording the photo (still image) as a tag ID and recording the position information in which the still image was recorded. When the photo (tag ID) is recorded into the tag (A), the photo A is written at the position on the tape shown by a dotted line.

Figure 61B:
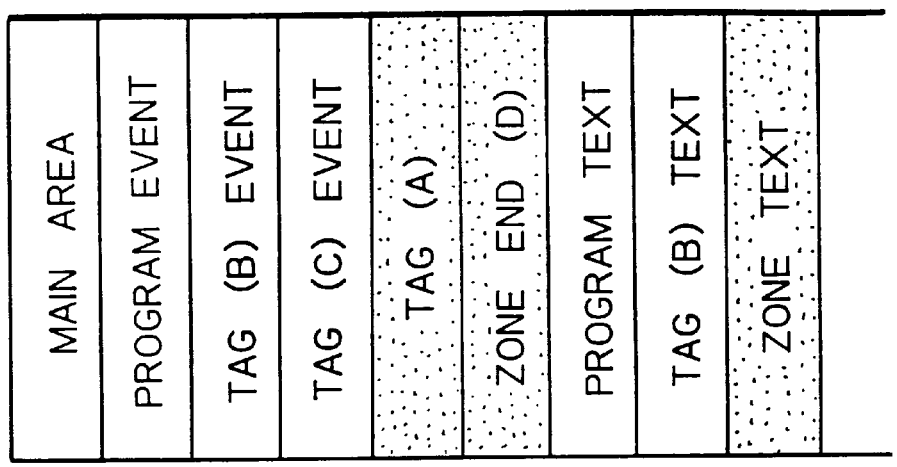
FIGS. 61A and 61B are diagrams which is used for explanation of a zone event.
Figure 61A:
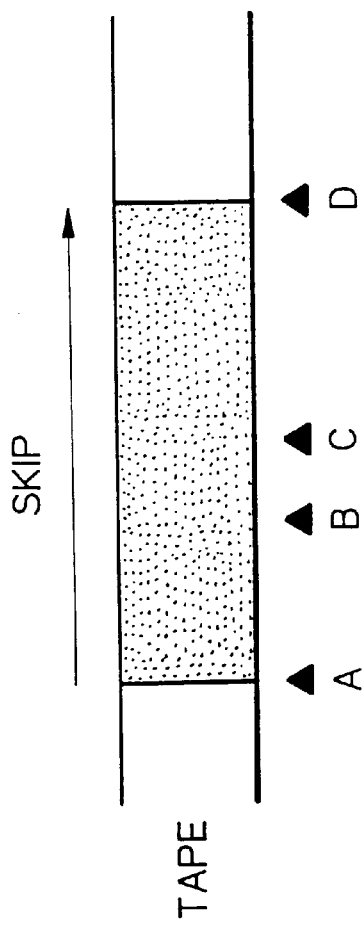

The zone event will now be described hereinbelow with reference to FIGS. 61A to 64B. FIGS. 61A and 61B show cases of recording the skip as a zone event and skipping the designated zone. After the tag (A) is recorded, when the skip is recorded as a tag control into the zone end (D), it is possible to skip from the tag (A) to the zone end (D). The above processes can be realized by MIC. The zone can be designated irrespective of the information of the subcode ID.

Figure 62B:
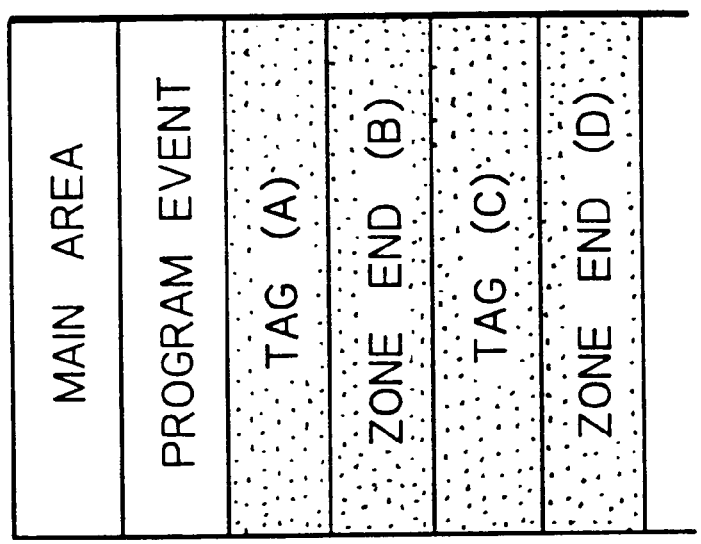
FIGS. 62A and 62B are diagrams which is used for explanation of the zone event.
Figure 62A:
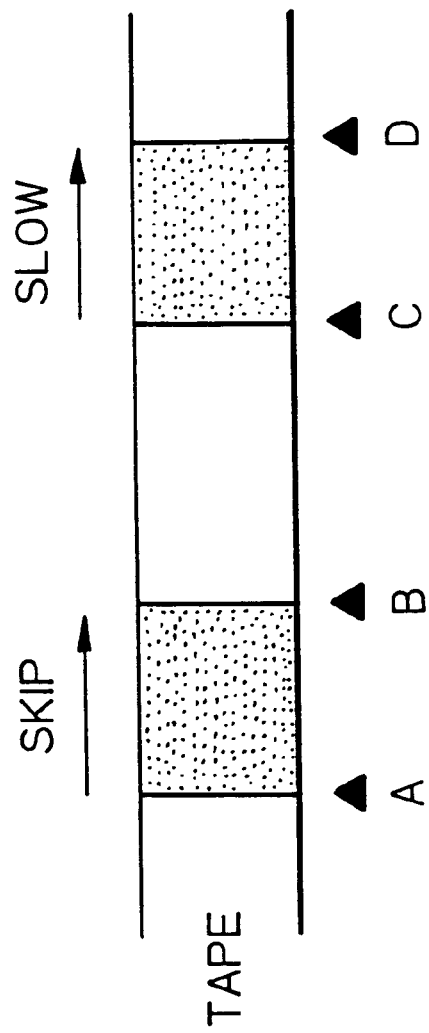

FIGS. 62A and 62B show cases of realizing the skip and special reproduction by recording the tag and the zone end into the optional events. After the tag (A) was recorded, the skip is recorded as a tag control into the zone end (B). After the tag (C) was recorded, the slow is recorded as a tag control into the zone end (D). Due to this, a portion between A and B shown on the tape is skipped and a portion between C and D is slowly reproduced.

FIGS. 63A and 63B show cases of reproducing the program 2, program 1, and program 3 in accordance with this order. After the tag (B) was recorded, the reproduction is recorded as a tag control into the zone end (C). After the tag (A) was recorded, the reproduction is recorded as a tag control into the zone end (B). After the tag (C) was subsequently recorded, the reproduction is recorded as a tag control into the zone end (D). Due to this, the tags (A), (B), (C), and (D) are recorded onto the tape. The program 2, program 1, and program 3 can be reproduced in accordance with this order.

FIGS. 64A and 64B show cases of executing the processes in accordance with the order of the reproduction of the zone 2, slow reproduction of the zone 1, and reproduction after the program 2. After the tag (C) was recorded, the reproduction is recorded as a tag control into the zone end (D). After the tag (A) was subsequently recorded, the slow is recorded as a tag control into the zone end (B). Further after that, after the tag (E) was recorded, the reproduction is recorded as a tag control into the zone end (F). Due to this, the above processes can be executed.

FIG. 65 shows the details of the event headers. As will be also understood from FIG. 65, as events, there are a tag, a zone, a title, a chapter, a part, a program, a reserve, a timer reservation, a text, and a maker's optional. The event header pack and the pack header are set to "tag" and "0Bh" in case of the tag; "tag" and "0Bh" in case of the zone; "title start" and "1Bh" in case of the title; "chapter start" and "2Bh" in case of the chapter; "part start" and "3Bh" in case of the part; "program start" and "4Bh" in case of the program; and "no event header pack" and "XBh" in case of the reserve.

As will be also obviously understood from the above description, the lower bits of the pack header are set to 1011 (B of the hexadecimal notation). That is, "Bh" in the pack header table (refer to FIG. 24) indicates the event header. With respect to the future development, any exception other than the timer reservation, text, and maker's optional, which will be explained hereinlater, are not admitted and lower four bits of the event header which will newly appear are certainly set to Bh. Due to this, even if a new event header exists in future, since it can be discriminated by the present control program, so that no problem will occur.

The following event header pack and pack header are set to "timer date record" and "02h" in case of the timer reservation; "test header" and "X8h" in case of the text; and "maker code" and "F0h" in case of the maker's optional. "X"in the pack header indicates a pack upper header. The event header of the character event is set to a TP header pack (07h) and a text header pack. Further, in the event headers other than the maker's optional event and the text event, a flag indicative of the presence or absence of the text event associated with it certainly exists.

As will be also understood from the above description, fundamentally, lower four bits of each pack header in the event header are set to "Bh". Referring now to the header table of FIG. 24, each content in the case where the lower four bits are set to "Bh" is equalized with each content in the case where lower four bits are set to "Ah". Each contents in the case where lower four bits are set to "Eh" is equalized with each content in the case where lower four bits are set to "Fh". By using the above construction, in the case where the cassette with a memory is applied, a header whose lower four bits are set to "Bh" and "Fh" can be used. In the case where the 8 mm video cassette or the like is applied, a header whose lower four bits are set to "Ah" and "Eh" can be used.

That is, by merely changing one bit of the lower header, the header of the cassette with a memory and the header of the 8 mm video tape or the like can be switched. Due to this, a common header table can be used even for the 8 mm video tape or the like. In the digital VCR, since the track number has been recorded every track, the track numbers are used for the tape length pack and the TOC information. However, in the camera integrated type VCR (8 mm video camera or the like), since there is no track number, a time code of HMS (hour/minute/second) is recorded.

(K) With respect to the generation and erasure of events

The generation and erasure of the optional events will now be described hereinbelow by using FIGS. 66 to 70. As mentioned above, in the case where there is no maker's option, the text event is located at the last position. A flag indicating whether the annexed text event exists or not is added. After completion of the event, the data is packed in the direction of the upper address. After completion of the packing work, FFh is written into the unnecessary data and such data is set into the unused data. Numeral 0 or 1 which is written to the side of the pack of each diagram denotes a text flag indicating whether there is a text or not.

Figure 66:
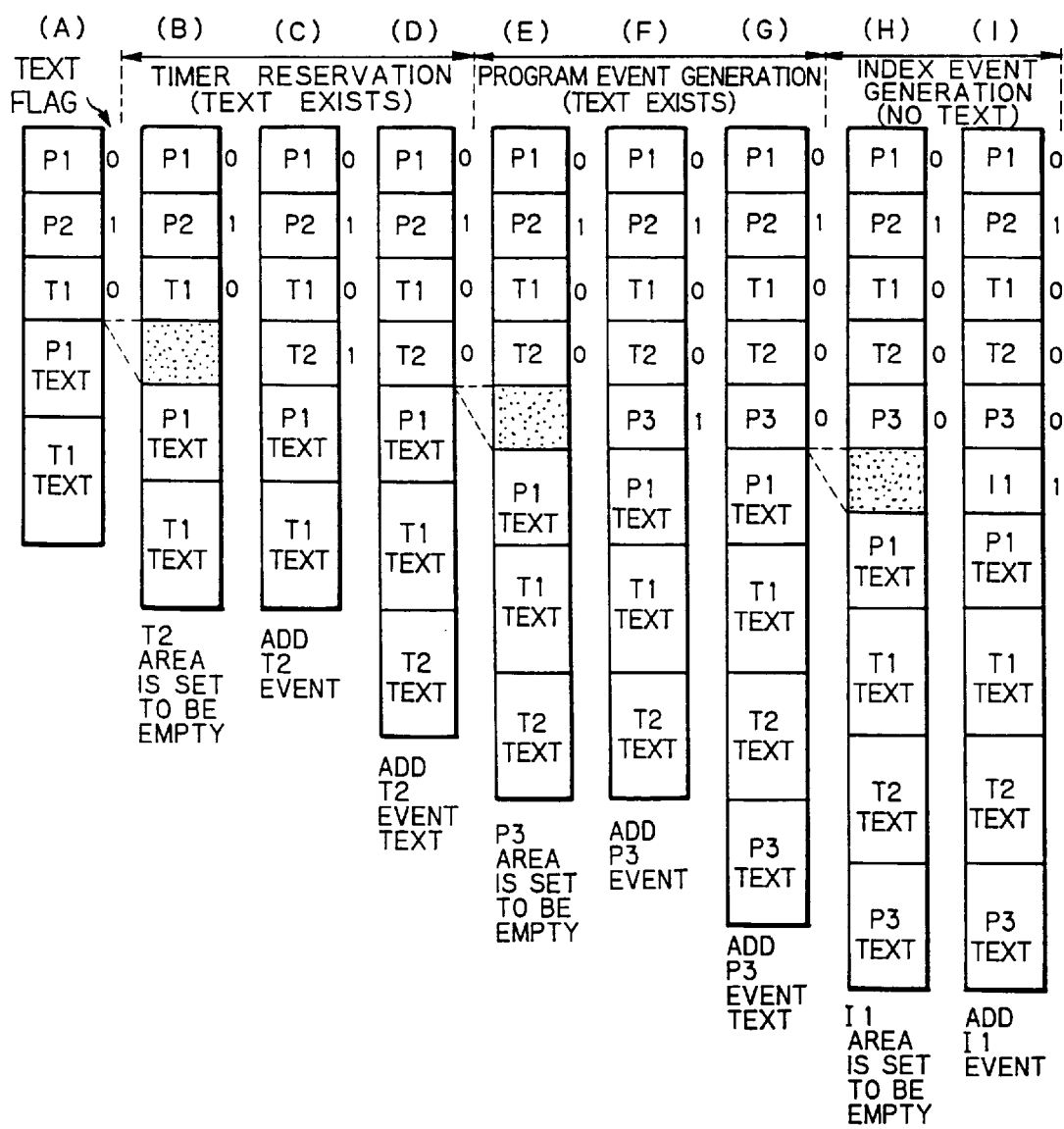
FIG. 66 is a diagram regarding the timer reservation, program event generation, and index event generation.
Figure 67:
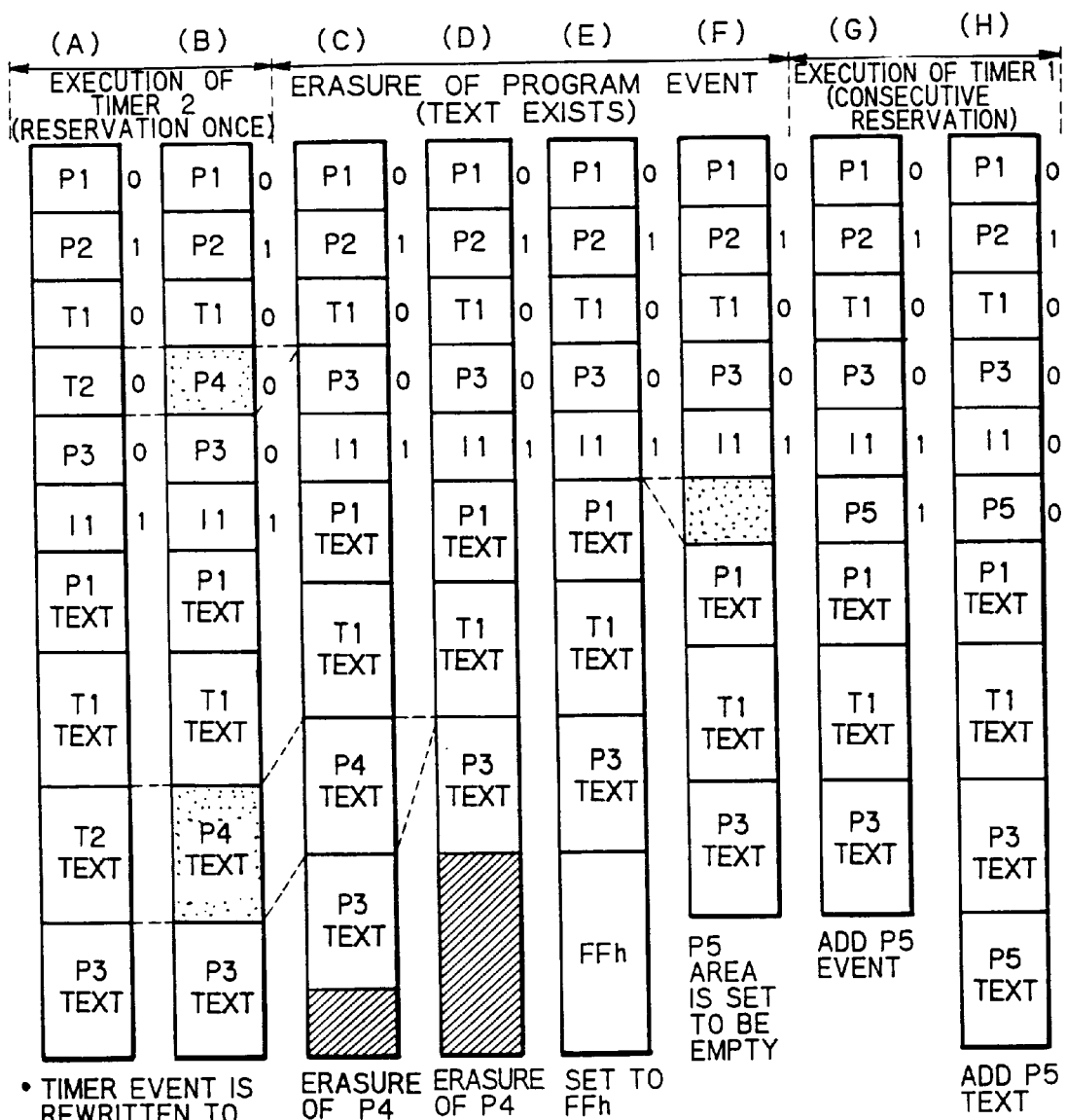
FIG. 67 is a diagram regarding the timer reservation, program event generation, and index event generation.

FIG. 66 is a diagram regarding the timer reservation, program event generation, and index event generation. The program event denotes the event about the recorded program information. As an initial state, a program event 1 (P1), a program event 2 (P2), a continuous timer reservation event 1 (T1), a text of the program event 1 (P1 text), and a text of the timer reservation event 1 (Ti text) are sequentially recorded in accordance with this order (FIG. 66A). The timer reservation is performed once. In the case where there is a text in the timer reservation, the areas of the P1 text and T2 text are shifted to the back position and the area of the timer reservation event 2 (T2) is assured between the T1 and P1 texts (FIG. 66B). The timer reservation event T2 is added into the above area (FIG. 66C). Further, the text (T2 text) regarding the timer reservation event is added to the last position (FIG. 66D).

In the case where the program event is generated and there is a text in the program event, the areas of the P1 text and T1 text are shifted to the back position and the area of the program event 3 (P3) is assured between the T2 area and the P1 text (FIG. 66E). The program event P3 is added into such an area (FIG. 66F). Further, the text (P3 text) about the program event P is added to the last position (FIG. 66G).

When the index event is generated and there is no text in the index event, the areas of the P1 text, T1 text, T2 text, and P3 text are moved to the back position and the area of the index event 1 (I1) is assured between the program event P3 and the P1 text (FIG. 66H). The I1 event is recorded in this area (FIG. 66I).

When reaching the time shown by the timer reservation event T2 from a state shown in FIG. 67A, the timer reservation event T2 is replaced to the program event 4 and the text (T2 text) of the timer reservation event is replaced to the text (P4 text) of the program 4. Such a replacement can be realized by merely changing the header. After that, the areas after the program event P3 are shifted in the direction of the upper address and the program event P4 is erased (FIG. 67C). After that, the P3 text is shifted in the direction of the upper address and the P4 text is erased (FIG. 67D). The data after the P3 text at the last position is set to FFh (FIG. 67E).

When reaching to the time shown by the timer reservation event T1, the P1 text, T1 text, and P3 text are shifted to the back position and the area for the program event 5 is assured (FIG. 67F). The program event P5 is added into this area (FIG. 67G). The P5 text as a text of P5 is added to the last position (FIG. 67H).

Figure 68:
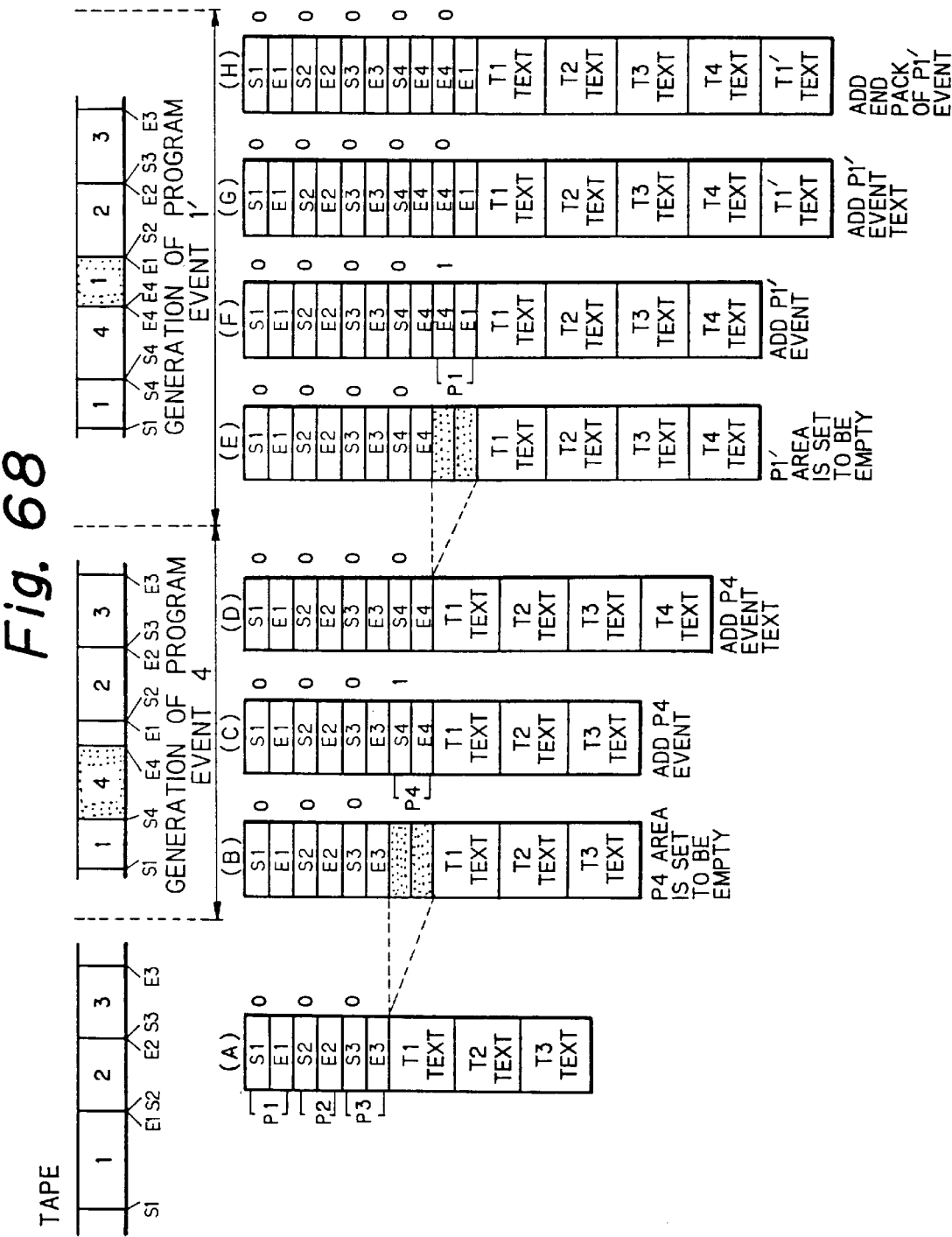
FIG. 68 is a diagram showing the case of recording another program into one program.

FIG. 68 shows a case of recording another program into one program. First, when it is now assumed that the program 1, program 2, and program 3 sequentially exist, as shown in FIG. 68A, a start pack of the program event 1 is set to S1, an end pack of the program event 1 is set to E1, a start pack of the program event 2 is set to S2, an end pack of the program event 2 is set to E2, a start pack of the program event 3 is set to S3, and an end pack of the program event 3 is set to E3. The text (T1 text) of the program 1, the text (T2 text) of the program 2, and the text (T3 text) of the program 3 are sequentially added (FIG. 68A).

When the program 4 is recorded into the program 1, processes in FIGS. 68B to 68D are executed. Namely, the T1 text, T2 text, and t3 text are moved to the back position, the area for the program event P4 is provided, and the start pack S4 and end pack E4 of P4 are inserted. The T4 text as a text of P4 is added to the last position. To generate a program event P1' of a remaining program 1' of the program, processes in FIGS. 68E to 68H are executed. Namely, the T1 text, T2 text, T3 text, and T4 text are shifted to the back position and the areas for the start pack E4 and end pack E1 of the program event P1' are formed. The packs E4 and E1 corresponding to such an area are inserted. After that, the T1' text as an event text of P1' is added. The end pack of the P1' is added at last.

Figure 69:
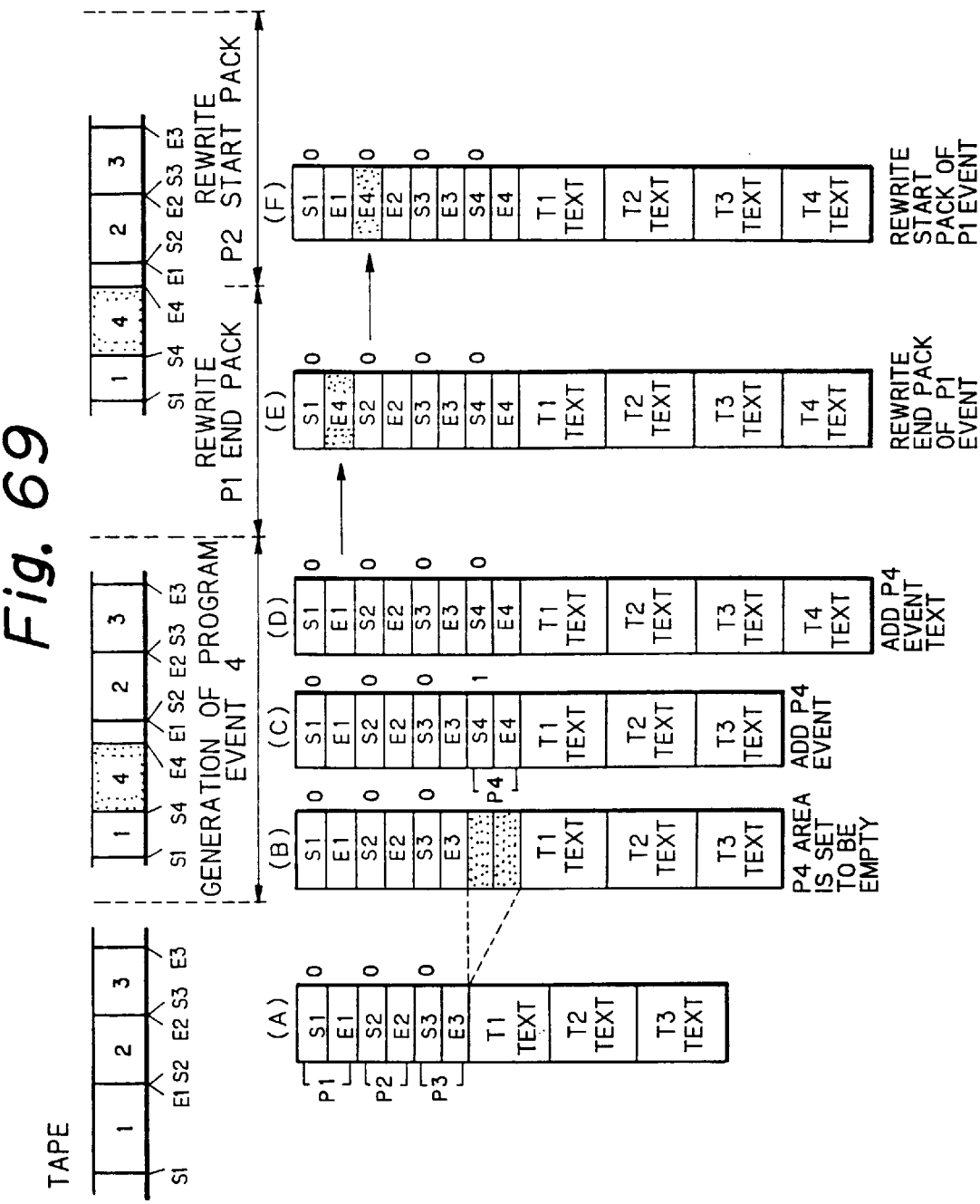
FIG. 69 is a diagram regarding the generation of events in the case where another program has been recorded so as to exist in both of two programs and the rewriting of an end pack and a start pack.

FIG. 69 is a diagram regarding the generation of events and the rewriting of an end pack and a start pack in the case where another program was recorded so as to exist over two programs. First, when it is assumed that the program 1, program 2, and program 3 sequentially exist in accordance with this order, the start pack of the program event P1 is set to S1, the end pack of the program event P1 is set to E1, the start pack of the program event P2 is set to S2, the end pack of the program event P2 is set to E2, the start pack of the program event P3 is set to S3, and the end pack of the program event P3 is set to E3. The text (T1 text) of the program event P1, the text (T2 text) of the program event P2, and the text (T3 text) of the program event P3 are sequentially added.

In order to record the program 4 so as to exist over the programs 1 and 2, processes in FIGS. 69B to 69D are executed. Namely, the T1 text, T2 text, and T3 text are shifted to the back position and the area for the program 4 is provided. A start pack S4 and an end pack E4 of a program event P4 are inserted into such an area. After that, the T4 text as a text of the program event P4 is added to the last position. The end pack of the program event P1 and the start pack of the program event P2 are rewritten (FIGS. 69E and 69F).

Figure 70:
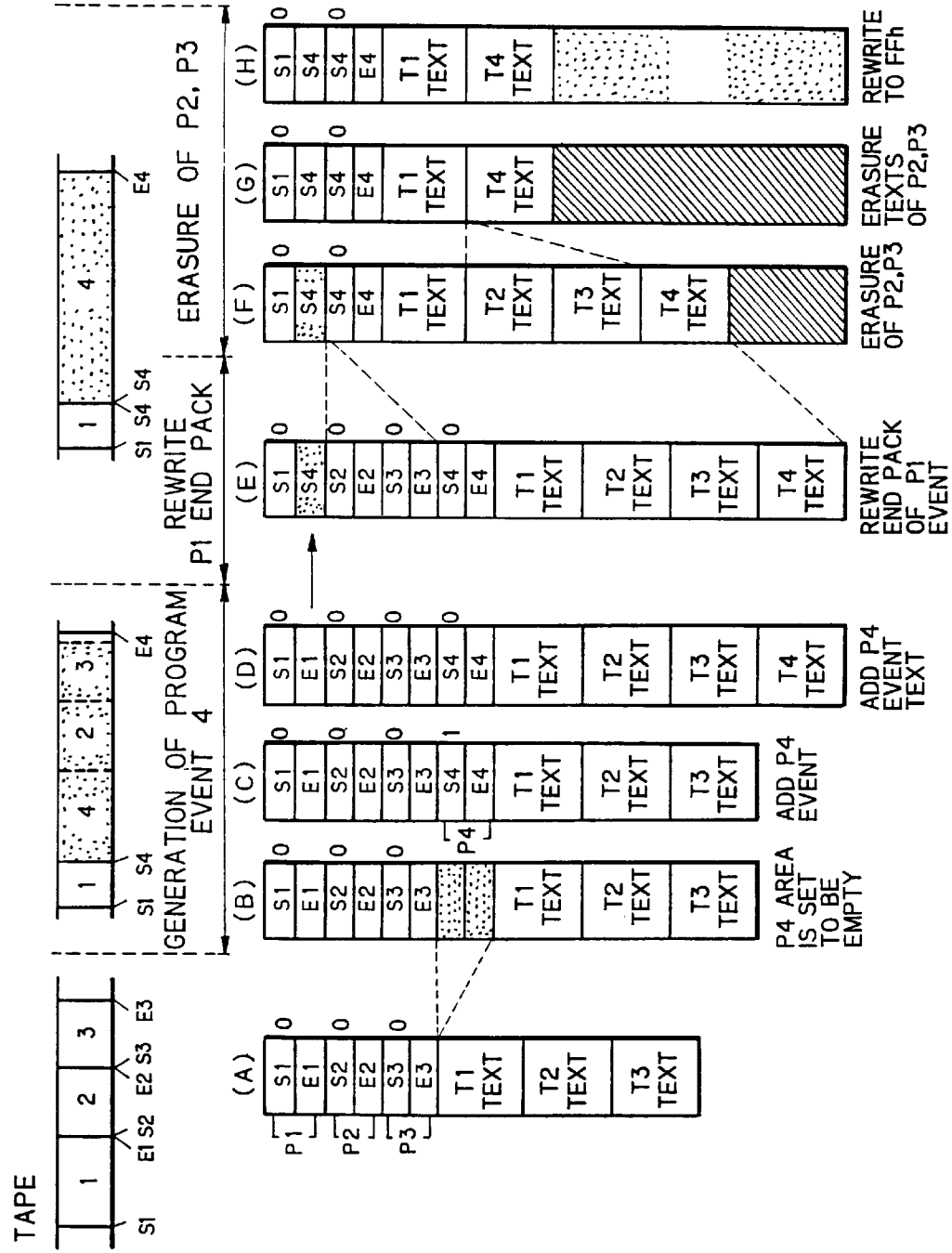
FIG. 70 is a diagram showing the case of recording another program from the halfway of a program 1 and erasing all of the subsequent programs.

FIG. 70 shows a case where another program is recorded from the halfway of the program 1 and all of the subsequent programs are erased. First, when it is assumed that the program 1, program 2, and program 3 sequentially exist in accordance with this order, the start pack of the program 1 is set to S1, the end pack of the program 1 is set to E1, the start pack of the program 2 is set to S2, the end pack of the program 2 is set to E2, the start pack of the program 3 is set to S3, and the end pack of the program 3 is set to E3. The text (T1 text) of the program event 1, the text (T2 text) of the program event 2, and the text (T3 text) of the program event 3 are sequentially added. The program event P4 is recorded from the halfway of the program 1.

Processes in FIGS. 70B to 70D are executed. That is, the T1 text, T2 text, and T3 text are shifted to the back position and the area for the program event P4 is provided. The start pack S4 and end pack E4 of the program event 4 are inserted into such an area. The T4 text as a text of the program event P4 is added to the last position. A rewriting process of the end pack of the program event P1 is executed (FIG. 70E). The program events P2 and P3 are erased (FIG. 70F). After the texts of the program events P2 and P3 were erased (FIG. 70G), the last position is rewritten to FFh (FIG. 70H).

As will be also understood from the above description, in the optional area, the text event is arranged after the other events (other than the maker's optional event), the events other than the text event are arranged in accordance with the generation order, and further a flag to discriminate whether there is character information regarding the event is added to each event header. Due to this, the generation, erasure, and the like of the new event on the MIC can be executed by merely a block transfer of the memory. The change in pack (becomes the program event) after the timer reservation was executed can be performed by merely rewriting the pack header. Similar processes are also applied with respect to the text event.

As for the program event, the program start pack is set to the event header (01001011 in the header table). The program start pack and program end pack indicative of the positions of the recording start point and end point of the program on the tape certainly exist. In case of wanting the recording of the other recording year/month/day, source information, etc., each pack is added and recorded in front of the next event header.

(L) With respect to the case of recording a plurality of text events

Figure 71:
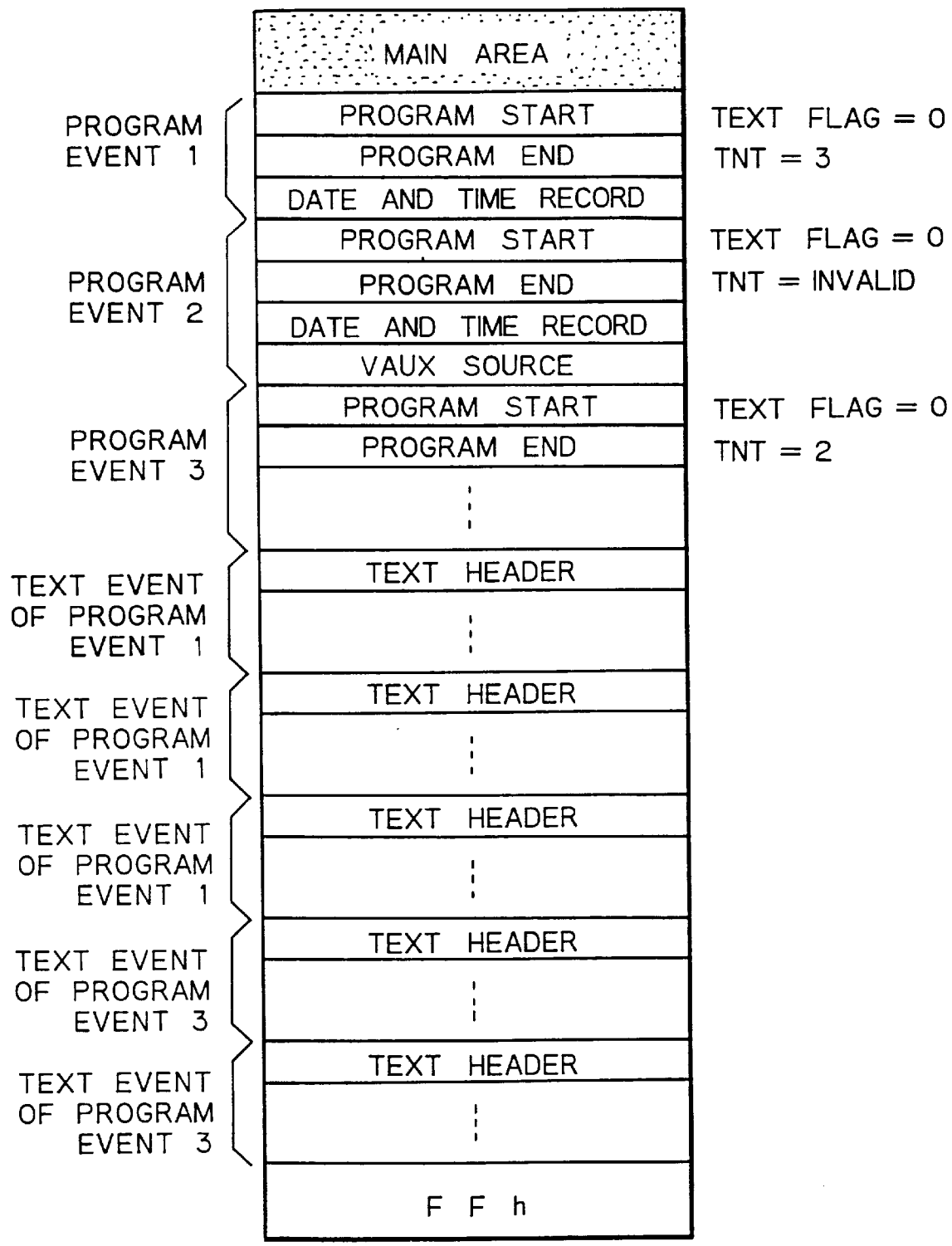
FIG. 71 is a diagram in case of recording a plurality of character information regarding one recorded program.

The case of recording a plurality of character information (program title, name of broadcasting station, etc.) regarding one recorded program will now be described. Since the text pack has a variable length construction, it can be realized. An array of the program events provided with the areas for storing information TNT (Total Number of TEXT events) indicating how many text events corresponding to the program events exist in the program end pack which is certainly used in the program event is shown below. In FIG. 71, the program event 1, program event 2, program event 3, text event of the program event 1, text event of the program event 1, text event of the program event 1, text event of the program event 3, text event of the program event 3, and FFh are sequentially recorded in the optional area in accordance with this order.

The text flag "0" exists in the program start pack of the program event 1. Thus, the program end pack is made effective. On the other hand, for example, when the text flag of the program start pack is set to "1", the program end pack is made invalid. "TNT=3" exists in the program end pack. The text events of the number designated by the TNT correspond to the program event 1. Thus, a plurality of text events can be made correspond to one event. Therefore, a plurality of character information such as program title, broadcasting station name, and the like can be added to the one recorded program. A similar construction is also applied onto the tape.

Figure 72:
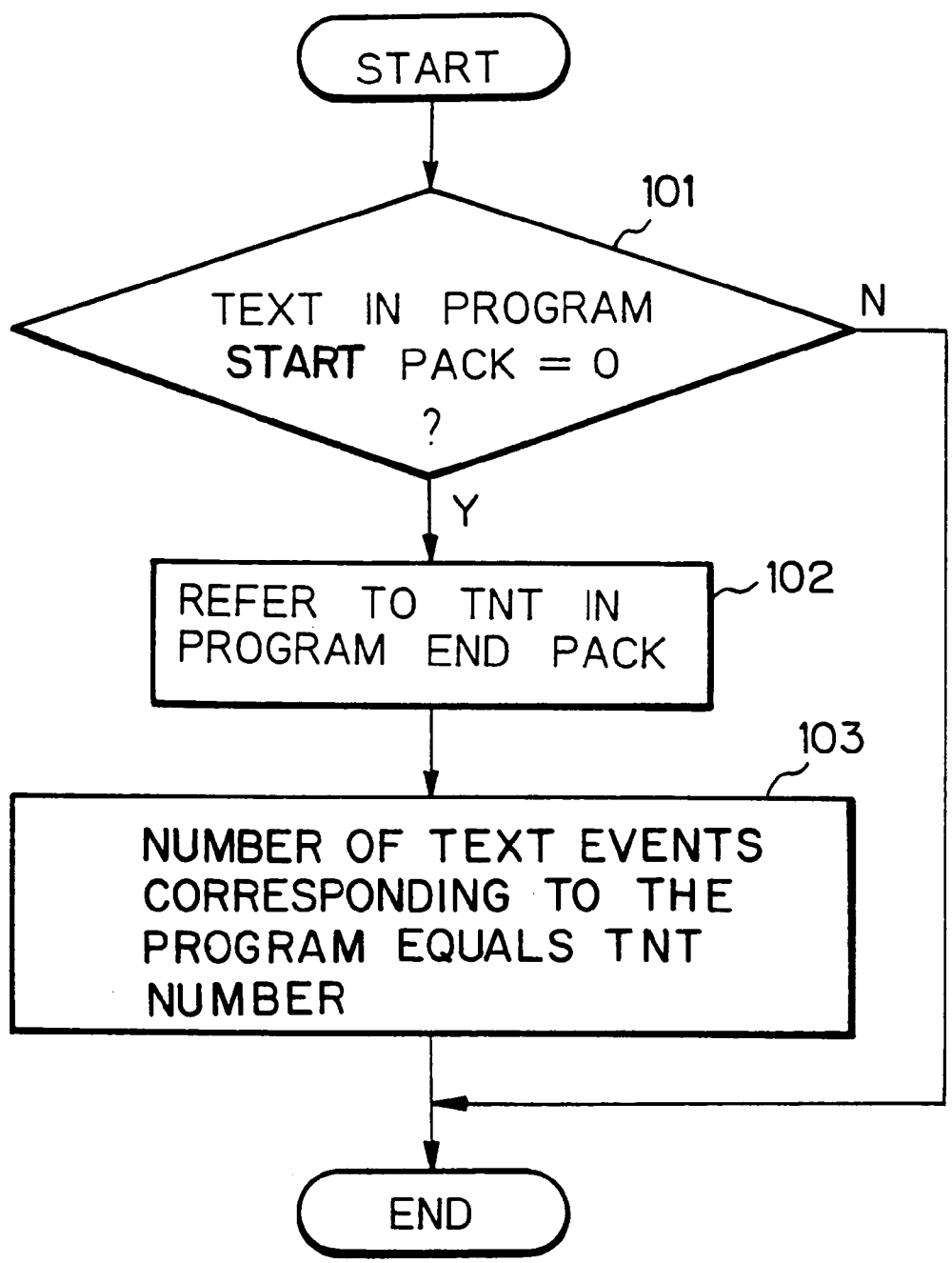
FIG. 72 is a flowchart in case of recording a plurality of character information regarding one recorded program.

FIG. 72 is a flowchart for processes which are realized by FIG. 71. In FIG. 72, a check is made to see if the text flag in the program start pack is equal to "0" or not (step 101). When the text flag="0", the TNT in the program end pack is referred (step 102). The text events of the number shown in the TNT are made correspond to the program events (step 103) and the processing routine is finished. In step 101, when the text flag=1, the processing routine is finished as it is.

FIG. 73 shows a data array of variable length text packs. In FIG. 73, the header of each pack is equal to "48h". Due to this, the start of the pack can be recognized. The packs indicative of the numbers of bytes of the character information which the packs have are stored after the header. In FIG. 73, there are "0Eh" and "03h" and this means that the character information (TDP) indicates 14. Subsequently, there are packs "00h" and "20h" indicative of the text types and they indicate that the text types are set to "NAME" and "STATION". Next, there is a pack "46h" indicative of the text code. After that, the character codes are stored. The number of character codes is specified by the pack which is located after the header and indicates TDP.

FIG. 74 shows program text header packs in the case where TDP=n. In FIG. 74, TDP is expressed by a binary number by the least significant bit of PC2 to the least significant bit of PC1. OPN (optional number) is recorded in the remaining three bits among the lower bits of PC2. The text type is recorded in the upper four bits. OPN is used as follows. For example, In England, £ (OPN=000) which is expressed by the ASCII code is converted like # (OPN=001) in Germany by changing OPN. The text code is recorded in PC3. The text data 1, text data 2, . . . are sequentially recorded from PC4 and the text data n is recorded into PC(n+3).

(M) With respect to a tag recording

In case of recording video data and audio data by a digital VCR, camera integrated type VCR, or the like by using a cassette with a memory, at a recording start time point, flags to discriminate that the time point is the recording start point are recorded into the VAUX data and AAUX data by an amount of, for example, one second with respect to the video data and one frame with regard to the audio data. Those flags are referred to as a video recording start flag and an audio recording start flag, respectively. By recording such flags, noises which are generated in the case where the tag recording was performed can be eliminated or the starting position of the recording can be searched.

Figure 75A:
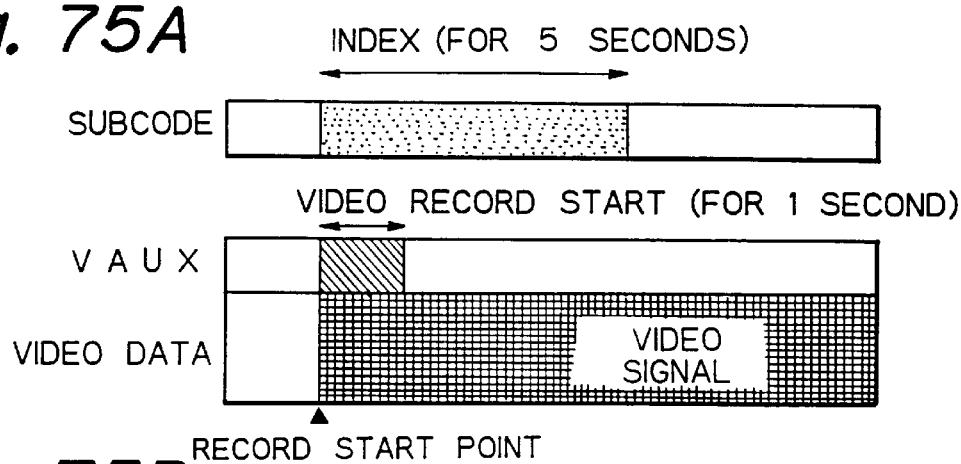
FIGS. 75A to 75C are diagrams showing a recording pattern of a tape.

FIG. 75A shows a recording pattern of the tape in the case where the recording has been performed by the VCR. In FIG. 75A, an index is recorded into the subcode for five seconds from the recording start point, so that the high speed search can be performed. The video recording start flag is recorded in the VAUX data for one second.

Figure 75B:
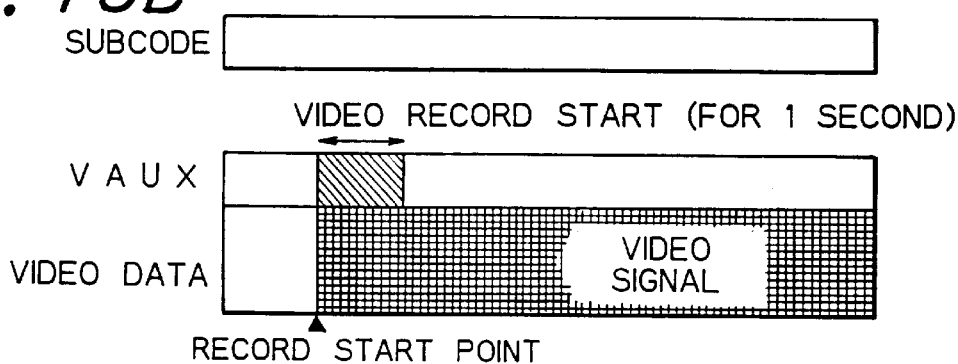

FIG. 75B shows a recording pattern of the tape in the case where the recording has been performed by the video deck. In FIG. 75B, the video recording start flag is recorded into the VAUX data for one second from the recording start point.

Figure 75C:
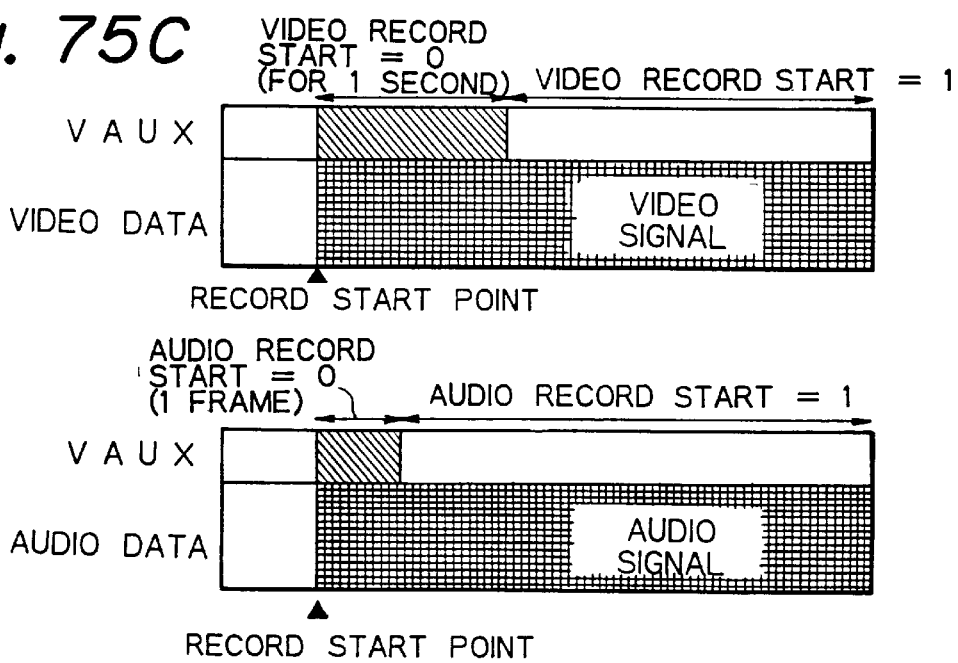

FIG. 75C shows a recording pattern of the tape in the case where the VAUX data and AAUX data are recorded. In FIG. 75C, the video recording start flag is recorded into the VAUX data for one second from the recording start point. The audio recording start flag is recorded into the AAUX data for one frame from the recording start point.

Means for recording the video recording start flag and the audio recording start flag is realized by recording (negative logic) "0" into the recording start flags in the VAUX data source control pack (refer to FIG. 38) and AAUX data source control pack (refer to FIG. 32) to store control information of the video data and audio data for a predetermined time from the recording start point.

Figure 76:
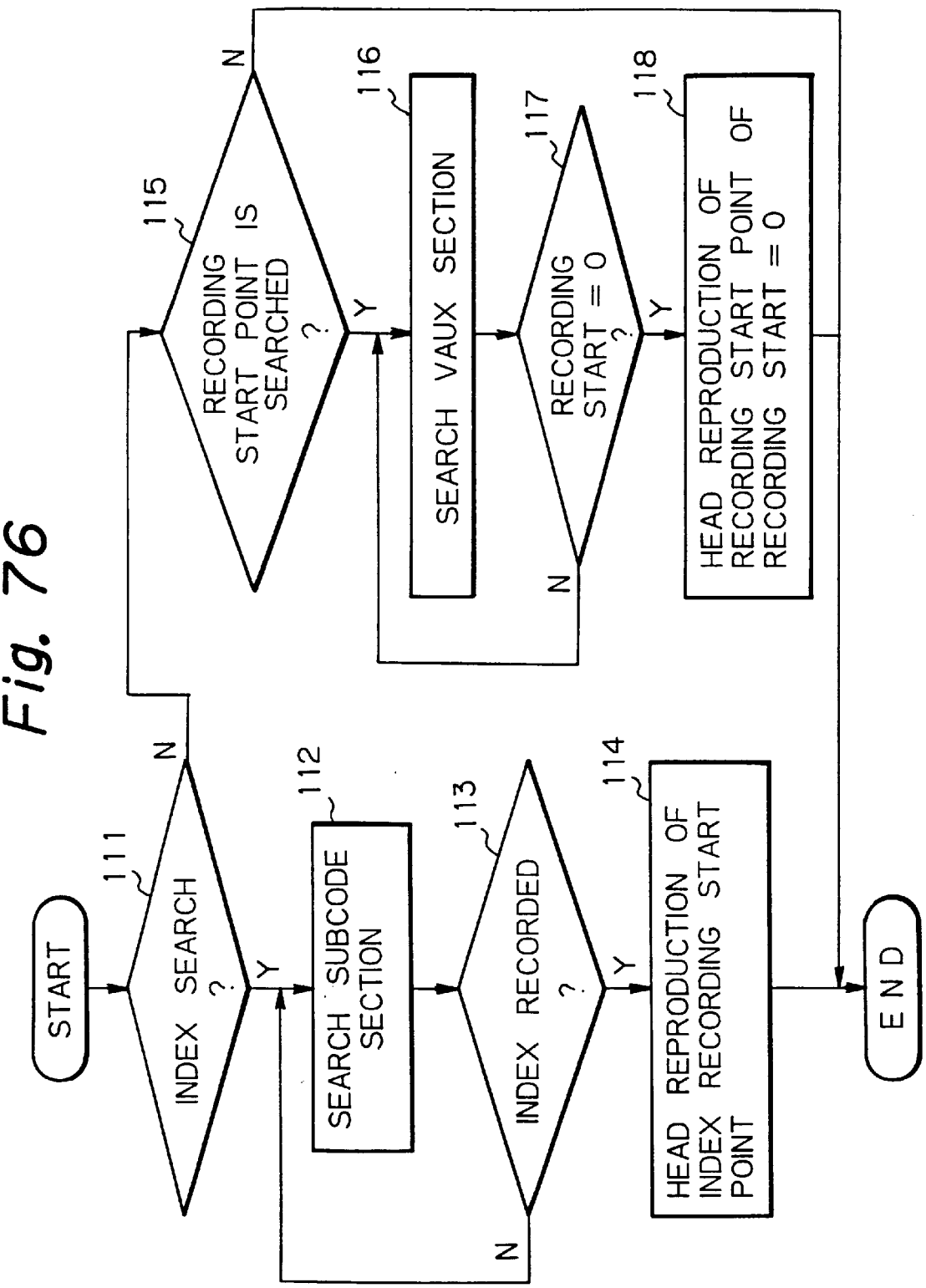
FIG. 76 is a flowchart in case of reproducing video data.

FIG. 76 is a flowchart in case of reproducing the video data. In FIG. 76, a check is made to see if the control mode has been set into the index search or not (step 111). In case of the index search, the subcode is searched (step 112). A check is made to see if the index has been recorded in the subcode or not (step 113). When no index is recorded, the processing routine is returned to step 112. In the case where the index has been recorded, the head reproduction is executed from the recording start point of the index in step 114. The processing routine is finished.

In step 111, when it is judged that the control mode is not the index search, the processing routine advances to step 115. In step 115, a check is made to see if the control mode has been set to the search of the recording start point or not. When it is not the search of the recording start point, the processing routine is finished as it is. On the other hand, when it is judged that the control mode is the search of the recording start point, the VAUX data is searched in step 116. After that, a check is made in step 117 to see if the recording start flag is equal to "0" or not. If it is not equal to "0", the processing routine is returned to step 116. On the other hand, when it is equal to "0", the head reproduction is executed from the recording start point of "recording start flag=0" (step 118). The processing routine is finished.

Figure 77:
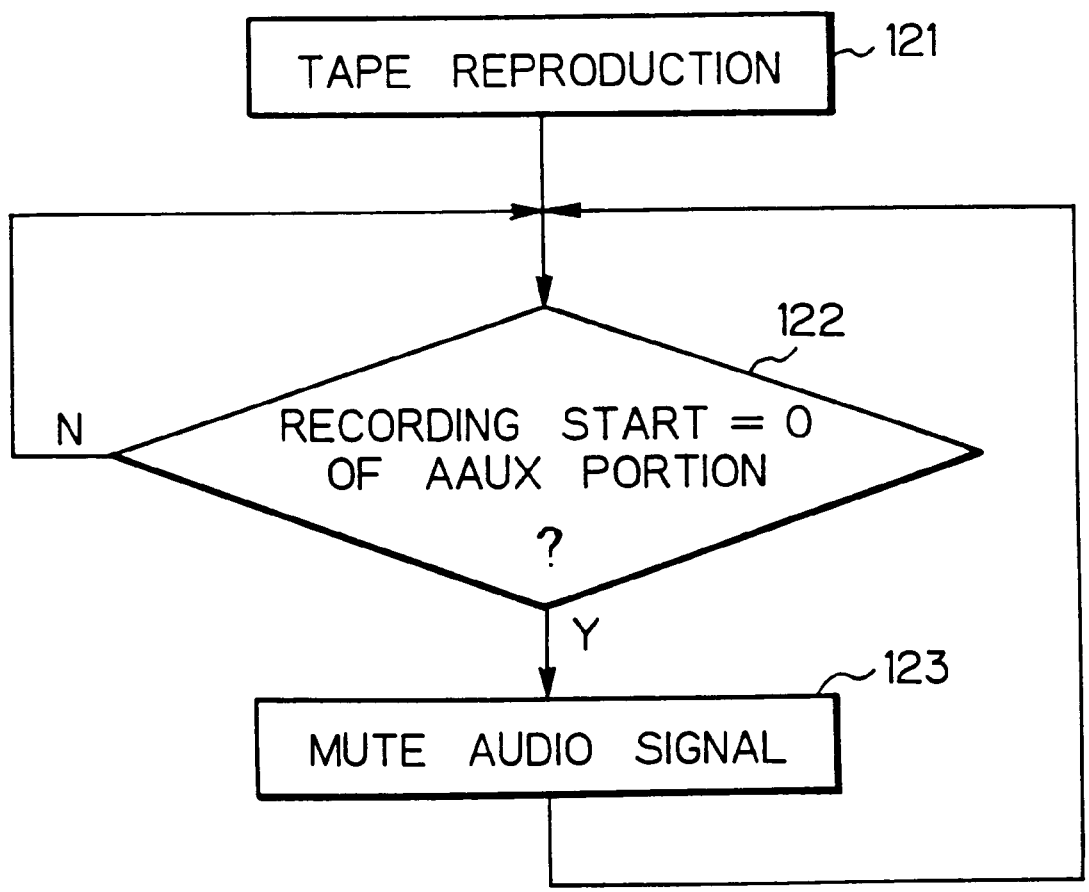
FIG. 77 is a flowchart in case of reproducing audio data.

FIG. 77 is a flowchart in case of reproducing the audio data. When the tape is reproduced in step 121, a check is made to see if the recording start flag of the AAUX data is equal to "0" or not (step 122). If it is not equal to "0", the process in step 121 is repeated. In step 122, when the recording start flag is equal to "0", the audio data is muted (step 123). After that, the processing routine is returned to step 122.

According to the invention, by setting the relation between the text event and the character information into one to a plural number, a plurality of character information can be added to the recording video image.

According to the invention, by properly setting the recording order of the events, data processes in case of adding or deleting character information can be easily executed.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A cassette having a magnetic record medium on which video data and audio data are digitally recorded and a memory having stored therein at least program data packs of a fixed length and additional information packs of a variable length, each of said program data packs including data indicating the number of said additional information packs pertaining to the respective program data pack, and said program data packs including data relating to said video data and audio data recorded on said record medium; wherein each of said fixed length packs and said variable length packs includes a header made up of a multiple of bits, said header having one or more indicators of the contents of said pack including an indicator of whether or not said pack is a fixed length pack or a variable length pack, and wherein said bits of said header are partitioned into groups, each group corresponding to a level in a hierarchical header.

2. The cassette of claim 1, wherein said additional information packs each include character information relating to said program data.

3. A cassette having a magnetic record medium on which video and audio data are recorded and a memory in which digital data is stored, said memory having a main area having a fixed length pack structure in which cassette-type information is stored and an optional area having fixed length packs in which table-of-contents information are stored and variable length packs in which character information are stored, said character information pertaining to events of the table-of-contents information stored in said optional area, and being stored after all of the other information in said optional area; wherein each of said fixed length packs and said variable length packs includes a header made up of a multiple of bits, said header having one or more indicators of the contents of said pack including an indicator of whether or not said pack is a fixed length pack or a variable length pack, and wherein said bits of said header are partitioned into groups, each group corresponding to a level in a hierarchical header structure.

4. The cassette claim 3, wherein a text flag indicative of the presence of character information pertaining to a particular event stored in said optional area is stored in said particular event.

5. The cassette of claim 3, wherein said events stored in said optional area are sequentially stored in said optional area in said memory in accordance with the order the events are generated.

6. The cassette of claim 3, wherein said optional area further includes timer recording information, and wherein said timer recording information stored in said optional area is changed to program data pertaining to the particular program recorded by a recording device corresponding to said timer recording information.

7. Apparatus for recording video and audio data on a record medium in a cassette and for storing digital data in a memory of said cassette, comprising:

means for recording video and audio data on said record medium;

means for storing event data in said memory, said event data relating to said video and audio data and including character pack number data and being stored in fixed length packs in said memory, and for storing character data in variable length packs pertaining to said event data in said memory after said event data, said character pack number data indicating a number of variable length packs having therein said character data pertaining to said event data; wherein each of said fixed length packs and said variable length packs includes a header made up of a multiple of bits, said header having one or more indicators of the contents of said pack including an indicator of whether or not said pack is a fixed length pack or a variable length pack, and wherein said bits of said header are partitioned into groups, each group corresponding to a level in a hierarchical header structure.

8. The apparatus of claim 7, wherein said means for storing is operable to store a plurality of event data, each of said event data pertaining to a respective event, and to store all of said character data after all of said event data in said memory.

9. The apparatus of claim 8, wherein each said event data includes a respective text flag indicating the existence of character data in said memory pertaining to said respective event data.

10. The apparatus of claim 8, wherein said plurality of event data is sequentially stored in said memory in order of occurrence independent of the order of the video and audio data recorded on said record medium to which the plurality of event data refer.

11. The apparatus of claim 7, wherein said event data corresponds to a timer record operation, and said means for storing is operable to replace said event data stored in said memory corresponding to said timer record operation with an event data corresponding to said video and audio data after said means for recording records said video and audio data on said record medium in accordance with said timer record operation.

12. The apparatus of claim 7, wherein said event data includes a text flag indicating the existence of character data in said memory pertaining to said event data.

* * * * *